US008401905B2

(12) United States Patent
Houle

(10) Patent No.: US 8,401,905 B2
(45) Date of Patent: Mar. 19, 2013

(54) METHOD AND SYSTEM FOR DETERMINING THE RELATIVE PRIORITY OF IN-PROCESS WORK AND FOCUSING PROCESS IMPROVEMENTS

(75) Inventor: Dale T. Houle, Milford, CT (US)

(73) Assignee: Avraham Y. Goldratt Institute, LP, New Haven, CT (US)

( * ) Notice: Subject to any disclaimer, the term of this patent is extended or adjusted under 35 U.S.C. 154(b) by 171 days.

(21) Appl. No.: 12/865,238

(22) PCT Filed: Jan. 5, 2009

(86) PCT No.: PCT/US2009/030163
§ 371 (c)(1),
(2), (4) Date: Aug. 5, 2010

(87) PCT Pub. No.: WO2009/099686
PCT Pub. Date: Aug. 13, 2009

(65) Prior Publication Data
US 2010/0306003 A1    Dec. 2, 2010

(51) Int. Cl.
*G06Q 10/00* (2006.01)
(52) U.S. Cl. .................... 705/22; 705/26.2; 705/7.11
(58) Field of Classification Search ............... 705/22
See application file for complete search history.

(56) References Cited

U.S. PATENT DOCUMENTS

| | | | | | |
|---|---|---|---|---|---|
| 5,818,716 | A | * | 10/1998 | Chin et al. | 700/100 |
| 5,826,238 | A | * | 10/1998 | Chen et al. | 705/7.22 |
| 5,841,677 | A | * | 11/1998 | Yang et al. | 702/176 |
| 6,501,473 | B1 | * | 12/2002 | Hayes et al. | 345/440 |
| 7,171,375 | B2 | * | 1/2007 | Clarke | 705/7.14 |
| 7,415,393 | B1 | * | 8/2008 | Pena-Mora et al. | 703/1 |
| 2003/0130756 | A1 | * | 7/2003 | Baweja et al. | 700/100 |
| 2004/0059649 | A1 | * | 3/2004 | Sakuma et al. | 705/28 |
| 2005/0154625 | A1 | * | 7/2005 | Chua et al. | 705/7 |
| 2005/0261921 | A1 | | 11/2005 | Chien | |
| 2005/0261925 | A1 | | 11/2005 | Alan | |
| 2006/0235734 | A1 | | 10/2006 | Houle | |
| 2007/0058650 | A1 | * | 3/2007 | Ricketts | 370/412 |

OTHER PUBLICATIONS

SLIM: Short Cycle Time and Low Inventory in Manufacturing at Samsung Electronics, Leachman et al., Department of Industrial Engineering and Operations Research, University of California at Berkeley, Berkeley, California 94720-1777, INTERFACES vol. 32, No. 1, Jan.-Feb. 2002.*
Scheduling with priority dispatching rules and drum0buffer-rope in a recoverable manufacturing system, Daniel, V. Guide, R. Jr., International Journal of Production Economics, Volume (Year): 53 (1997), Issue (Month): 1 (November), pp. 101-116.*
A simulation based optimization approach to supply chain management under demand uncertainty, June Young Jung, Gary Blau, Joseph F. Pekny, Gintaras V. Reklaitis, David Eversdykb, Computers & Chemical Engineering, vol. 28, Issue 10, Sep. 15, 2004, pp. 2087-2106.*

* cited by examiner

*Primary Examiner* — Peter Choi
*Assistant Examiner* — Darlene Garcia-Guerra
(74) *Attorney, Agent, or Firm* — Raymond A. Nuzzo

(57) ABSTRACT

A method and system tor determining the relative priority of items moving in a predefined process flow, wherein the method comprises selecting a particular item that is in a predefined process flow, utilizing transaction data that was provided at regular Reporting Intervals and at Reporting Points, providing a planned movement of the selected item along the predefined process flow, processing the transaction data to determine the item's actual movement along the predefined process flow, determining the difference between the actual movement and the planned movement, providing a total planned Time Buffer for the movement of the item along the predefined process flow, using the determined difference to compute the actual amount of downstream Time Buffer Remaining in relation to the total planned Time Buffer, and utilizing the differences between actual and planned completions at both the Reporting Point and Item level to focus local improvements in relation to global outcomes.

45 Claims, 37 Drawing Sheets

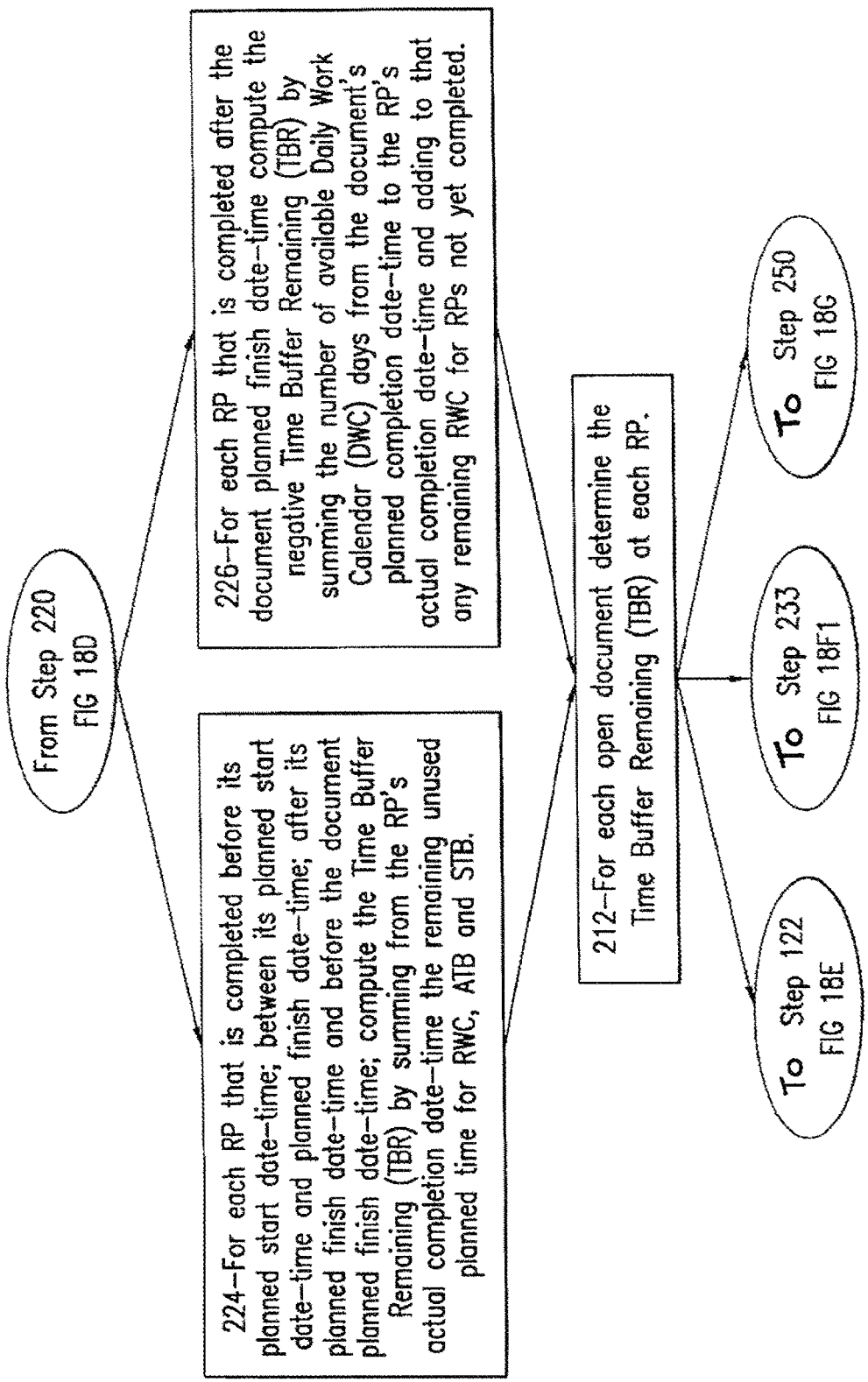
FIG.18D1

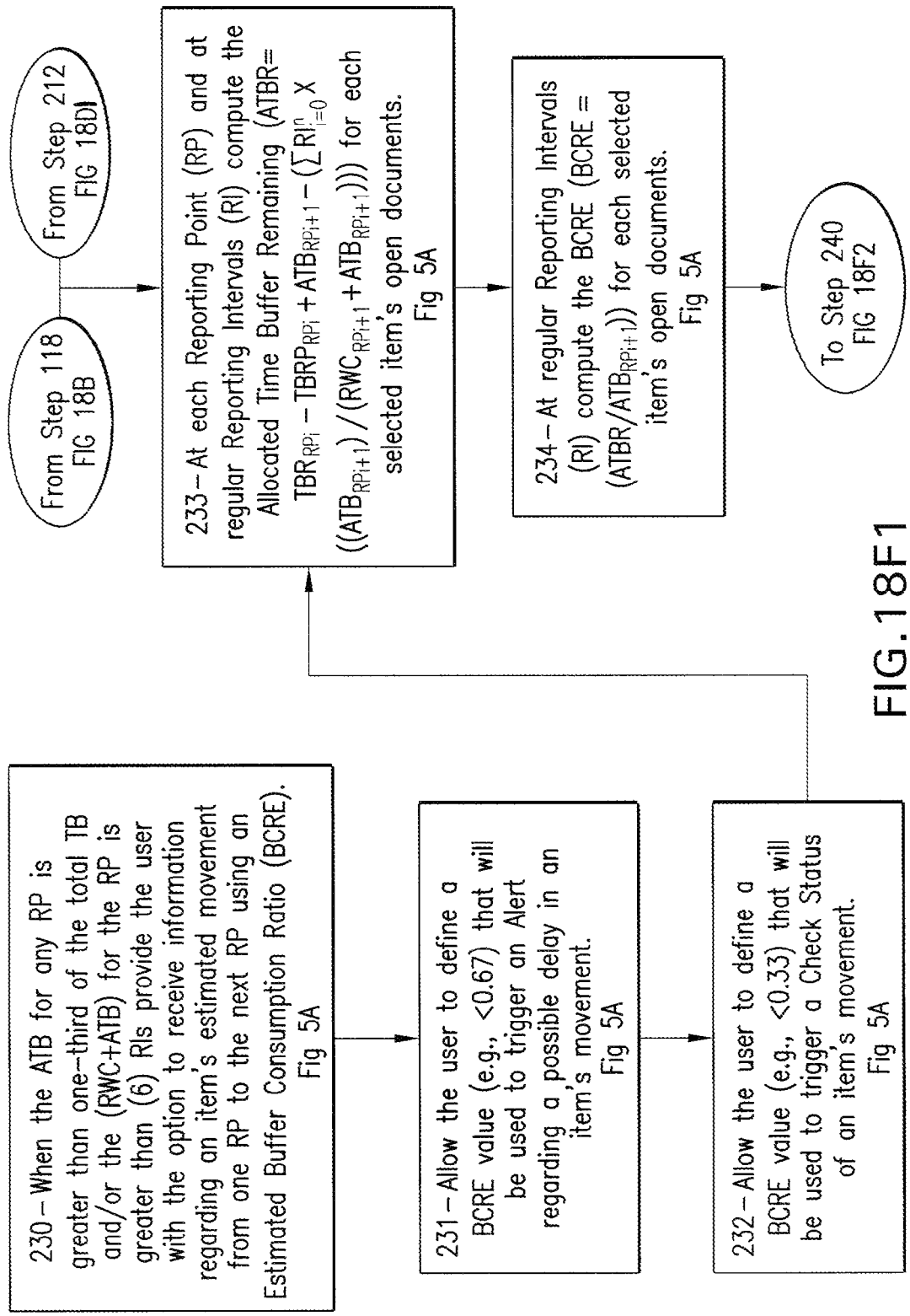

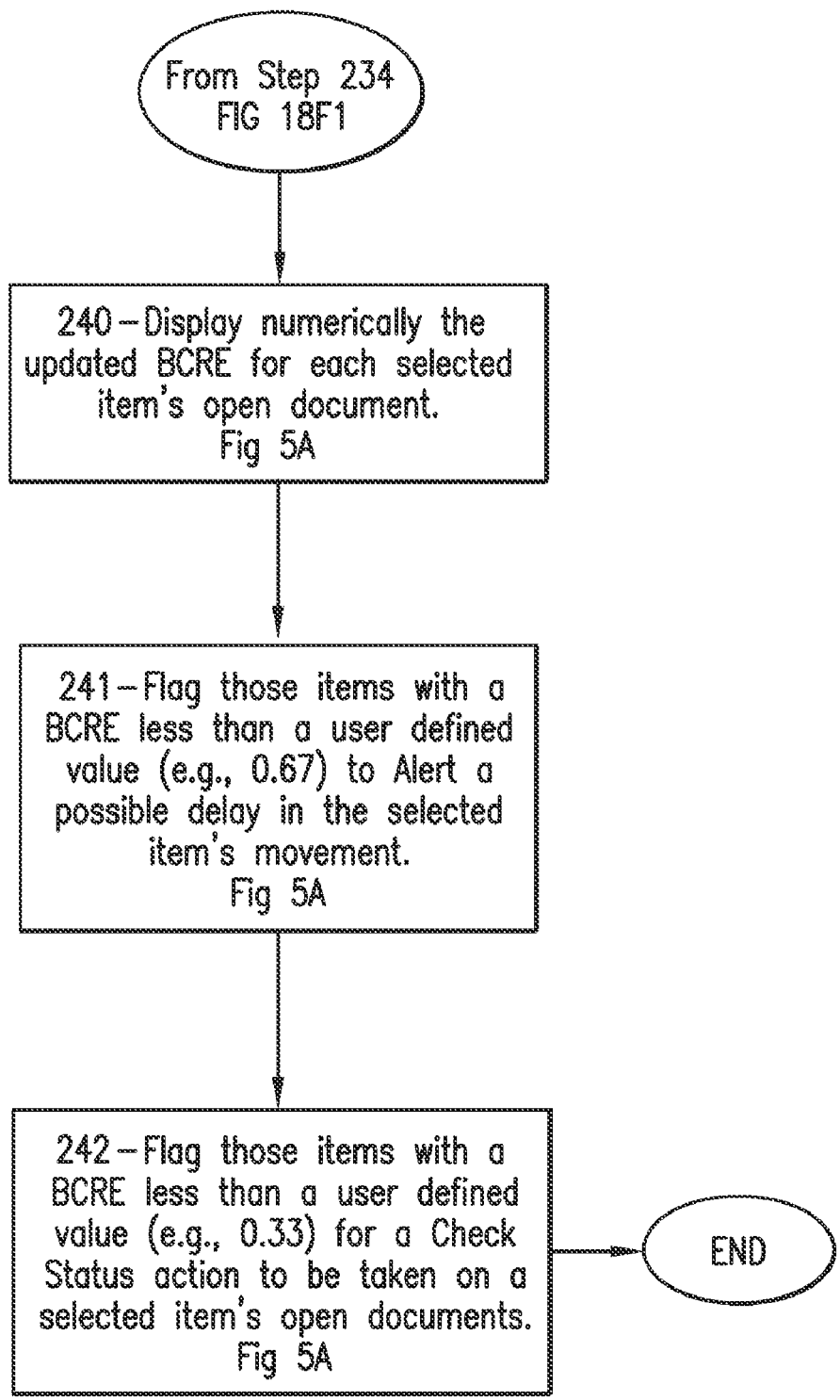
FIG.18F2

METHOD AND SYSTEM FOR DETERMINING THE RELATIVE PRIORITY OF IN-PROCESS WORK AND FOCUSING PROCESS IMPROVEMENTS

CROSS-REFERENCE TO RELATED APPLICATIONS

This application claims the benefit of U.S. Provisional Application No. 61/026,840, filed Feb. 7, 2008, and U.S. Provisional Application No. 61/061,307, filed Jun. 13, 2008.

TECHNICAL FIELD

The present invention generally relates to a method and system for determining the relative priority of items moving in a predefined process flow and is the identification of those steps in a predefined process flow providing the greatest opportunities for improvement.

BACKGROUND ART

Within a predefined process flow, there are times when the actual movement of an item from one Reporting Point (RP) to another Reporting Point (RP) is slower than the planned movement of the item. Such a situation requires identification of the cause of the delay and implementation of corrective measures and/or focused improvement efforts so as to prevent such delays from occurring in the future.

The premise of a predefined process flow incorporates the perspective of a fully integrated logistics process and the relevant elements associated with the processing and movement of material and its related information. This perspective is exemplified with regards to production processes in the publication entitled *The Goal, A Process of Ongoing Improvement*, by Eliyahu M. Goldratt and Jeff Cox, First Edition, 1984, Third Revised Edition, 2004, The North River Press Publishing Company. This perspective is further exemplified with regard to integrated process flows involving production and distribution as well as repair and distribution in the programs entitled "Supply Chain Technical Expert" and the "Supply Chain Deployment Expert" which are taught by the Avraham Y. Goldratt Institute, New Haven, Conn., all of which utilize the Theory of Contraints (TOC) as an overarching framework for assessing and managing process flows.

What is needed is a method and system that identifies delays in the movement of a predetermined item in a predefined process flow and provides information that allows a user to take appropriate corrective measures and/or make adjustments to particular steps of the predefined process flow.

DISCLOSURE OF THE INVENTION

Thus, in order to address the deficiencies and problems discussed above, the method of the present invention, in one embodiment, comprises the steps of selecting an item that is to be reviewed or managed, utilizing transaction data that relates to the selected item and which was captured at regular Reporting Intervals (RI) at each Reporting Point (RP), and processing the provided transaction data with a processing resource to reveal an item's actual movement along a predefined process flow as compared to its planned movement along that same predetermined process flow. The method further includes the steps of determining the difference between the actual movement of the selected item and the planned movement of the selected item. The difference between actual-to-planned movement at regular Reporting Intervals (RI) and at each Reporting Point (RP) is used to determine the actual amount of downstream Time Buffer Remaining (TBR) in relation to the total planned Time Buffer (TB). The method effects comparison of the actual amount of downstream Time Buffer Remaining (TBR) to the planned amount of downstream Time Buffer Remaining (TBRP) at each Reporting Point (RP) and computation of the ratio TBR/TBRP: The ratio yields a Buffer Recovery Percent (BRP) for the selected item. The Buffer Recovery Percent (BRP) is determined for every item as it moves in a predefined process flow from one Reporting Point (RP) to another Reporting Point (RP). Relative priorities are assigned to all the items wherein the item with the lowest Buffer Recovery Percent (BRP) has the highest priority.

In another embodiment of the method of the present invention, the method further comprises the steps of computing an Estimated time Buffer Consumption Ratio (BCRE) based on the estimated amount of downstream Allocated Time Buffer Remaining (ATBR) at each Reporting Interval (RI) and the total Allocated Time Buffer (ATB) between Reporting Points (RP). Such a computation is represented by the formula:

$$BCRE = ATBR/ATB$$

The present invention addresses the scenario wherein within a predetermined process flow, an item's actual movement may be slower than planned movement thereby requiring a need to (i) create an alert for a possible delay in an item's actual movement and, (ii) an action to check status of the item's actual movement for a possible delay. In order to address such a situation, the method of the present invention, in a further embodiment, comprises the steps of allowing the user to input an "Alert" threshold value, and a "Check Status" threshold value, identifying an item in the predefined process flow that has an Estimated Buffer Consumption Ratio (BCRE) that approaches the "Alert" threshold value and then subsequently approaches the "Check Status" threshold value is thereby initiating action to "Check Status" of the item's actual movement.

In another embodiment of the method of the present invention, the method further comprises the steps of computing an actual time Buffer Consumption Ratio (BCRE) based on the actual amount of downstream Time Buffer Remaining (TBR) and the total planned Time Buffer (TB), and computing a Planned time Buffer Consumption Ratio (BCRP) based on the Planned amount of downstream Time Buffer Remaining (TBRP) in relation to the total planned Time Buffer (TB). Such computations are represented by the formula:

$$BCR = TBR/TB, \text{ and}$$

$$BCRP = TBRP/TB$$

In a related aspect, the present invention is directed to a computer program for performing a method that determines the relative priority of in-process work in an electronic data system comprising a computer readable medium and computer program instructions recorded on the computer readable medium and executed by a processor, for performing the steps of selecting a particular item that is in a predefined process flow, utilizing transaction data that ii relates to the particular item and its movement through the predefined process flow, extracting from the transaction data particular transaction data that was provided at a regular Reporting Intervals (RI) and at each Reporting Point (RP), providing data that represents a planned movement of the selected item along the predefined process flow, processing the extracted transaction data to determine the selected item's actual movement along the predefined process flow and comparing the actual movement of the selected item to the planned movement of the selected item through the predefined process flow, determining the difference between the actual movement of the selected item and the planned movement of the selected item, providing a total planned Time Buffer (TB) for the movement of the selected item along the predefined process flow, computing the actual amount of downstream Time Buffer Remaining (TBR) in relation to the total planned Time Buffer (TB) using the determined difference, comparing the actual amount of downstream Time Buffer Remaining (TBR) to the Planned amount of downstream Time Buffer Remaining (TBRP) at regular Reporting Intervals (RI) and at each Reporting Point (RP) and computing the ratio TBR/TBRP wherein the ratio yields a Buffer Recovery Percent (BRP) for the selected item, determining the Buffer Recovery Percent (BRP) for every item as it moves in a predefined process flow from one Reporting Point (RP) to another Reporting Point (RP), and assigning relative priorities to all the items wherein the item with the lowest Buffer Recovery Percent (BRP) has the highest priority.

The present invention addresses the scenario wherein within a predetermined process flow, an item's actual movement is slower than planned movement thereby requiring a need to (i) plan for recovering excessive Time Buffer (TB) consumption and, (ii) put the plan to Recover Time Buffer (RTB) into action. In order to address such a situation, the method of the present invention, in a further embodiment, comprises the is steps of allowing the user to input an "Assess and Plan" threshold value, and an "Action" threshold value, identifying an item in the predefined process flow that has Buffer Recovery Percent (BRP) that approaches the "Assess and Plan" threshold value and then subsequently initiating time buffer recovery assessment and planning. The method also identifies an item in the predefined process flow that has a Buffer Recovery Percent (BRP) value that approaches the "Action" threshold value thereby initiating the plan to Recover Time Buffer (RTB). The plan to Recover Time Buffer (RTB) is generally accomplished by following the adjusted priorities and/or applying more, better or faster resources to work on the remaining workload within the process flow in which the excessive buffer consumption has occurred. In certain circumstances, the action taken to Recover Time Buffer (RTB) is accomplished by the release of an additional unit of work from the upstream Physical inventory Buffer (PB) from which the downstream process flow draws or from the upstream work-in-process when the upstream Physical inventory Buffer (PB) is zero (i.e., Not-In-Stock). This particular type of action to Recover Time Buffer (RTB) is implemented when (i) the user deems it to be the appropriate course of action, (ii) there is currently inventory available in the upstream Physical Buffer (PB), or (iii) there is an upstream process flow with work-in-process that feeds that upstream PB when the PB is zero (i.e., Not-In-Stock), and (iv) the decision is made to reach back into the upstream process flow and expedite a part that is in-process. Thus, this change in priorities of the upstream work-in-process is accomplished by lowering that specific item's BRP through an adjustment in the item's TBR based on using the TBR and TBRP in both the downstream and upstream process flows. Such an adjustment is represented by the formula:

$$BRPA_{US} = (TBR_{US} + TBR_{DS})/(TBRP_{US} + TBRP_{DS})$$

wherein:
$BRPA_{US}$ is the Adjusted upstream Buffer Recover Percent;
$TBR_{US}$ is the current upstream Time Buffer Remaining;
$TBR_{DS}$ is the current downstream Time Buffer Remaining;
$TBRP_{US}$ is the current upstream Planned Time Buffer Remaining; and
$TBRP_{DS}$ is the current downstream Planned Time Buffer Remaining.

The conditions for adjusting the upstream BRP include a Not-In-Stock (NIS) condition in the Physical Buffer (PB) which the upstream process feeds and the downstream process is fed from. However, in a further embodiment of the invention, a user may choose to adjust the BRP using a Not-In-Stock Physical Buffer Factor ($PBF_{NIS}$), described in the ensuing description, in place of or in addition to the $BRPA_{US}$.

A further embodiment of the method of the present invention addresses the scenario wherein the quantity of inventory issued from the Physical Buffer (PB), over a series of Reporting Intervals (RI), will add up to produce a cumulative Reporting Interval Demand ($RID_{RI}$) pattern that exceeds the cumulative Maximum Reporting Interval (RIM) Demand ($RID_{RIMax}$) pattern derived from historical data. In one embodiment, the historical data is generated by the method described in commonly owned U.S. Patent Application Publication No. 20060235734 entitled "Method and System for Determining Buffer Inventory Size", referred to herein as "Enterprise Buffer Sizing Tool" or EBST. Thus, in one embodiment, the method of the present invention uses EBST to establish the cumulative Maximum Reporting Interval (RIM) Demand ($RID_{RIMax}$) during the Time-to-Reliably Replenish (TRR) starting from a TRR equal to one (1) Reporting Interval (RI) and computing the maximum quantity issued, incrementing the TRR by one (1) Reporting Interval (RI) and computing the maximum for two (2) Reporting Intervals (RI), and repeating this process until the number of Reporting Intervals (RI) equals the specified TRR. These foregoing method steps establish a Physical Buffer Pattern (PBP) based on accumulating the Maximum Reporting Interval (RIM) Demand ($RID_{RIMax}$) for each Reporting Interval (RI) throughout the TRR which can be viewed from the perspectives of the Physical Buffer Patterns (PBP) in terms of Demand (PBDP), Issue (PBIP) and Replenish (PBRP). The Physical Buffer Pattern (PBP) is used as a point of reference from which actual issues of inventory per Reporting Interval (RI) can be tracked and variances recorded. Thus, inventory issue data is collected from a data source that relates to the selected item. The method of the present invention processes the issue data captured at regular Reporting Intervals (RI) with a processing resource to determine a selected item's actual Physical Buffer Pattern (PBP) through time and comparing the actual PBP to the historical PBP to identify variances. Such variances are used to identify changes in demand patterns that require further analysis so as to determine the cause of such changes and, if necessary, establish an updated historical PBP.

The method of the present invention also addresses the variability in demand wherein some items experience large infrequent (RI=1) $RID_{1Max}$ demands whose occurrences need to be anticipated and some items experience cumulative demand during the Time-To-Reliable-Replenish (TRR) in excess of the Physical Buffer (PB) resulting in a Not-In-Stock (NIS) situation. The actual quantities issued for each Reporting Interval (RI) are sorted in order of descending quantity and then summed together to determine the quantity of Reporting Interval (RI) issues that are needed to produce a total quantity issued that is greater than or equal to the Maximum, historical one (1) Reporting Interval (RIM) Demand (issue) quantity ($RID_{1Max}$). Next, a Physical Buffer Factor (PBF) is computed. The computed PBF is based on the ratio of the number of Reporting Interval (RI) issues (required to produce a total quantity issued that is greater than or equal to the Maximum, historical one (1) Reporting Interval (RI) Demand (issue) quantity ($RID_{1Max}$)) to the total number of Reporting Intervals (RI) in the TRR. When the PBF decreases below a user defined level, it is used to create an adjustment in the BRPs of those items closest to completing the predefined process flow totaling a quantity that is greater than or equal to the Maximum, historical one (1) Reporting Interval (RIM) Demand ($RID_{1Max}$) less the on-hand quantity in the Physical Buffer (PB) by multiplying their current BRP by the PBF and computing an Adjusted BRP (BRPA). The user can decide to apply this PBF process to anticipate Maximum Reporting Interval (RIM) Demand ($RID_{RIMax}$) for one (1) RIM, two (2) RIM, etc. by selecting which RIM (i.e., x=1–n) is to be used to determine the anticipated $RID_{RIMax-x}$ (i.e., x=1–n) quantity. An additional user defined Not-In-Stock PBF ($PBF_{NIS}$) is applied to the BRP within a process flow when the quantity available to issue is zero and there is a request for a quantity of items to be issued.

The method of the present invention also addresses the variability in the process flow wherein some items in work experience excessive delays resulting in a negative BRP. Such excessive delays can be partially compensated for by increasing the rate of movement of the remaining items still in work by adjusting their current BRP. Such an adjustment is accomplished by multiplying the current BRP by a value computed by the formula:

$$PBF_{-BCR}=((PB-\# \text{ of items with a BRP}<0)/PB).$$

The method of the present invention also provides Time Buffer (TB) and Physical Buffer Pattern (PBP) Trend Information to focus improvement efforts and to allow for a readjustment of the Time Buffer (TB) size and/or the Physical Buffer (PB) size. In order to accomplish this task, the method effects obtaining, storing and evaluating transaction data and issue data for each item in work including the following data for that item:

BCR: Buffer Consumption Ratio;
BCRP: Planned Buffer Consumption Ratio;
BCRD: Difference between BCR and BCRP;
BCRV: BCR Variance;
PBPV: Physical Buffer Pattern Variance.

For each Reporting Point (RP) the $BCRD_{RP}$ and $BCRV_{RP}$ are computed in accordance with the following formula:

$$BCRD_{RPi}=(BCR_{RPi}-BCRP_{RPi})$$

$$BCRV_{RPi}=(BCRD_{RPi}-BCRD_{RPi-1}).$$

In accordance with the invention, this foregoing data is used to establish trends for each Reporting Point (RP) in the predefined process flow related to Allocated Time Buffer (ATB) consumption in order to ascertain opportunities for reducing Allocated Time Buffers (ATB) if there is a lack of use of allocated time buffers ($\Sigma BCRV_{RP}>0$), process improvements if there is an overuse of allocated time buffers ($\Sigma BCRV_{RP}<0$), as well as for the entire process flow related to planned Time Buffer (TB) consumption in order to ascertain opportunities for increasing or decreasing specific Time Buffers (TB) in accordance with the intended Safety Time Buffer (STB) to maintain a balanced flow ($\#BCR_{Finish}>(STB/TB)$ as compared to the $\#BCR_{Finish}<(STB/TB)$ as compared to $\#BCR_{Finish}<0$), and ascertaining changes in the demand patterns for each item that are based on the magnitude and number of Physical Buffer Pattern Variances (PBPV) occurring for each item's Maximum Reporting Interval (RIM) Demand ($RID_{RIMax}$) in accordance with which $RID_{RI}$ first experienced the PBPV. This enables adjustments to be made to the Physical Buffer Pattern (PBP) so as to maintain an updated PBP from which to ascertain changes in demand patterns and on which to base the Physical Buffer Factor (PBF) used for anticipating a Maximum Reporting Interval (RIM) Demand quantity ($RID_{RIMax}$). For each item's Open Documents at each Reporting Interval (RI) the Physical Buffer Pattern Variance ($PBPV_{RIM-RI}$) for each Maximum Reporting Interval (RIM) Demand ($RID_{RIMax}$) is computed in accordance with the following formula:

$$PBPV_{RIM-RI}=((\Sigma_1^{RIM}RID_i)_{RIM-RI}-(RID_{RIMax})).$$

The computations related to the following $PBPV_{RIM-RI}$ conditions are captured for further analysis and possible changes to the perimeter of Physical Buffer Pattern (PBP) and Physical Buffer (PB) size ($PBPV_{RIM-RI}<0$ would indicate a variance within the perimeter of a PBP and could lead to a decrease in the perimeter, where as ($PBPV_{RIM-RI}>0$ and ($RID_{RIMax}+PBPV_{RIM-RI})<PB$) would indicate a variance beyond the perimeter of the PBP but not beyond the Physical Buffer (PB) size and could lead to an increase in the PBP perimeter, and ($PBPV_{RIM-RI}>0$ and ($RID_{RIMax}+PBPV_{RIM-RI})>PB$) would indicate a variance beyond the Physical Buffer (PB) (i.e., a Not-In-Stock) and could lead to an increase in the Physical Buffer (PB) size).

Other objects, features and advantages of the present invention will be apparent from the ensuing description.

BRIEF DESCRIPTION OF THE DRAWINGS:

The foregoing features of the present invention will become more readily apparent and may be understood by referring to the following detailed description of an illustrative embodiment of the present invention, taken in conjunction with the accompanying drawings, in which.

BEST MODE FOR CARRYING OUT THE INVENTION

The ensuing description makes reference to FIGS. 1-18N of the drawings. The graphs and tables that are shown in FIGS. 1-16 are exemplary and are presented to facilitate understanding of the invention.

Figure 17:
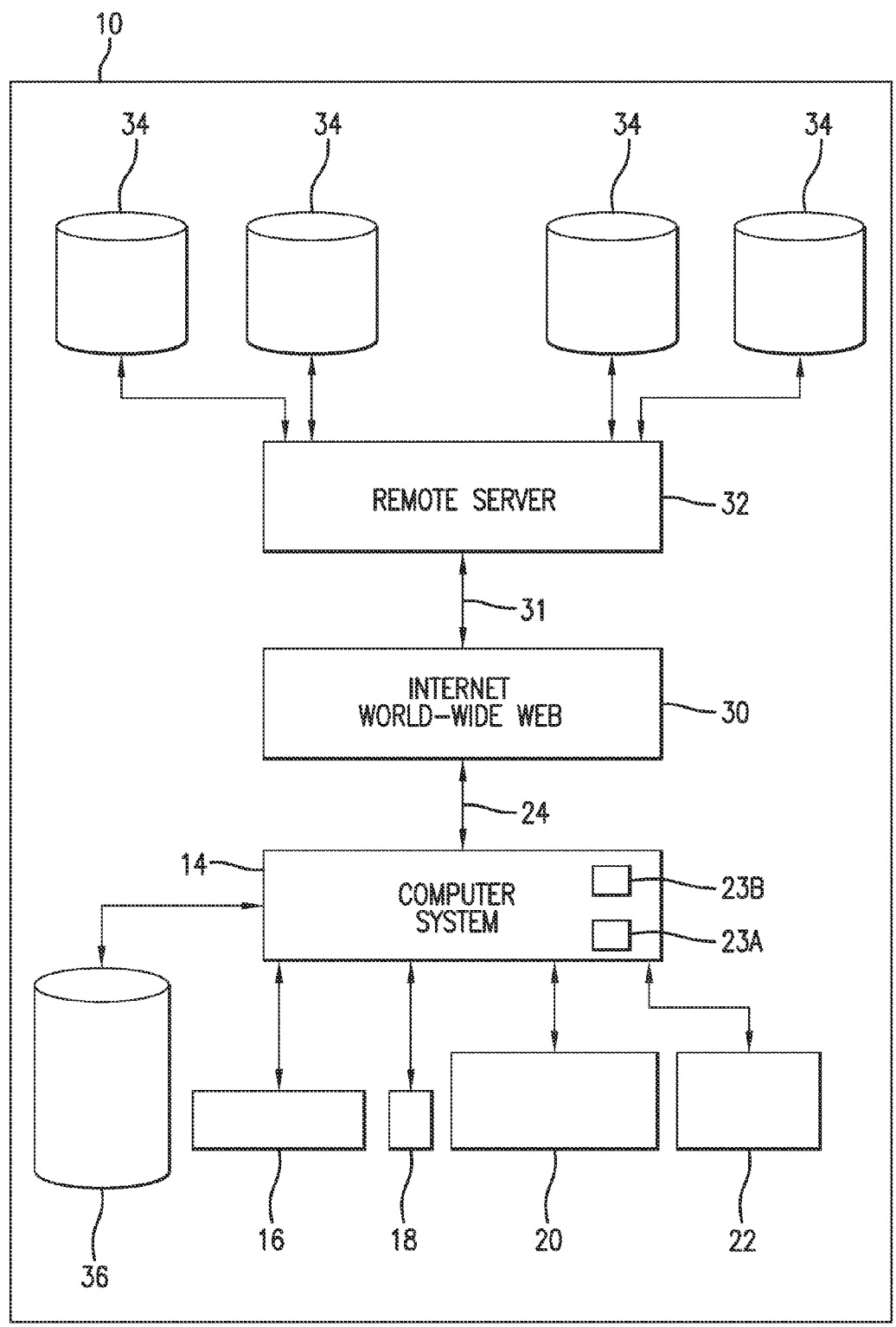
FIG. 17 is a block diagram of a computer network, in accordance with one is embodiment of the invention, with which the method of the present invention can be implemented.

Referring to FIG. 17, there is shown network 10 that can be used to implement the method of the present invention. Network 10 comprises an end user computer system 14 having input devices such as keyboard 16, mouse 18, display device 20 and printing device 22. Computer system 14 can be configured as a personal computer, workstation, server system, and minicomputer or mainframe computer. Computer system 14 includes processor or CPU 23A and memory 23B. The processor 23A executes program instructions in order to carry out the functions of the present invention. The processor of computer system 14 is a microprocessor, such as an Intel Pentium® processor, but may also be a minicomputer or mainframe computer processor. Memory 23B stores program instructions that are executed by processor 23A. Memory 23B also stores data that is used and processed by processor 23A. Memory 23B may include electronic memory devices, such as random-access memory (RAM), read-only memory (ROM), programmable read-only memory (PROM), electrically erasable programmable read-only memory (EEPROM), flash memory, etc. and electromechanical memory, such as magnetic disk drives, tape drives, optical disk drives, etc. which may use an integrated drive electronics (IDE) interface, or enhanced IDE (EIDE), or ultra direct memory access (UDMA), or a small computer system interface (SCSI) based interface, or fast-SCSI, or wide SCSI, or fast and wide SCSI, etc., or a fiber channel-arbitrated loop (FC-AL) interface.

Computer system 14 also includes input/output interfaces, and network adapters. Display device 20 can be configured as a CRT or LCD monitor.

Computer system 14 is in electronic data communication with data link 24. Data link 24 can be configured as any type of medium capable of transmission of data signals. Thus, data link 24 can be configured as a dedicated land line, phone lines, broadband cable, etc. Data link 24 can also be configured as a wireless system such as a satellite uplink and down link system. Data link 24 is also in data communication with internet or world-wide-web 30. Network 10 includes data link 31 which is in data communication with internet 30. Data link 31 can have the same configuration as data link 24. Network 10 further includes remote server 32 that is in data communication with internet 30 via data link 31. Although one server 32 is shown, it is to be understood that more than one it server can be utilized.

Network 10 further includes data bases 34. Each data base 34 stores transaction data that relates to a specific item that is in a predefined process flow. The specific item can be a part, component or product, or it can be particular step in an overall process, i.e. manufacturing process. The transaction data comprises data that is collected at regular Reporting Intervals (RI) at predetermined Reporting Points (RP). In a preferred embodiment, the specific item is monitored at each predetermined Reporting Point (RP) at regular Reporting Intervals (RI). Data base 34 also stores data that represents the planned movement of the specific item through the predefined process flow.

In a preferred embodiment, if the specific item is a part, component or product, data base 34 also stores data pertaining to demand requirements for that particular part, component or product. Such data includes requisition data such as the date the requisition is placed and completed, the time for the requisition to be completed if a part is issued from other than the shelf (a Not-In-Stock-Situation), or the time for the shelf to be replenished (i.e. Time To Reliably Replenish or TRR) if the part was issued from the shelf. The requisition data may also include component or part serial numbers, and project codes. The data bases 34 may include other data as well such as production, repair and/or maintenance history of all parts or components. As used herein, the terms "parts", "components", and "products" are used interchangeably and are collectively referred to herein as "item" or "items".

Referring to FIG. 17, network 10 may also include data base 36 which is located on the same premises as computer system 14. Data base 36 may be configured to store the same data stored in data bases 34 and/or store any resulting analysis and data generated by the implementation of the method of the present invention on computer system 14.

The first portion of the method of the present invention is directed to Time Buffer Management. In accordance with the invention, Time Buffer Management, as implemented by the method of the present invention, can be used in the following three areas: (a) day-to-day focus and decision making, (b) buffer trend analysis to resize current Time Buffers (TB) and Physical Buffers (PB), and (c) buffer trend analysis for the purpose of focusing improvement efforts.

Figure 18A:
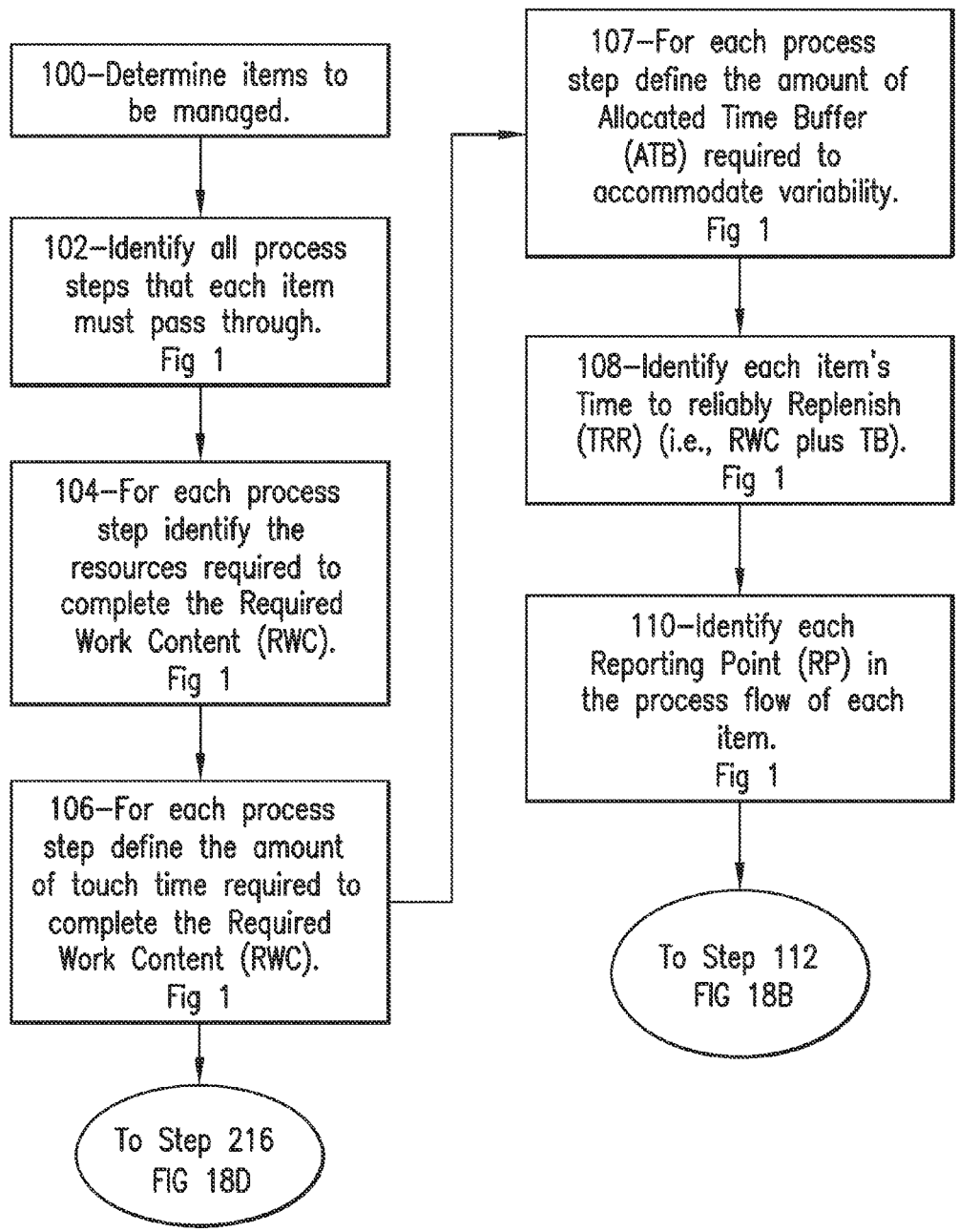
FIGS. 18A-18N are flow diagrams of the method of the present invention.

Referring to FIG. 18A, in one embodiment, step 100 is the first step of the method of the present invention. Step 100 entails determining, selecting or specifying the item that is to be reviewed or managed. The user inputs data representing the selected item into computer system 14 via keyboard 16 and/or mouse 18. This step also retrieves data from database 34 and/or database 36 which relates to the selected item. In this particular case, the data retrieved from database 34 and/or database 36 consists of transaction data that pertains to the selected item's movement through a predefined process flow. The predefined process flow can be an entire supply chain, manufacturing process, or a portion thereof, wherein an item (e.g. raw material, component, part, product, etc.) passes through a series of process steps to undergo some type of processing. The process step can be a physical step, such as machining raw material, or it can be a procedural-type step such as quality inspection and/or the application of serial numbers and codes or it can be transportation.

The data retrieved from the databases 34 and 36 may also include "demand data" that relates to the selected item. The term "demand data" as used herein refers to all data that pertains to requisitions for the selected item between the supplier and the consumer. Typically, an item for which demand data is to be reviewed is an item that is subject to variable demand patterns and/or problems in establishing a reliable and/or desirable Time-to-Reliably-Replenish (TRR).

Figure 1:
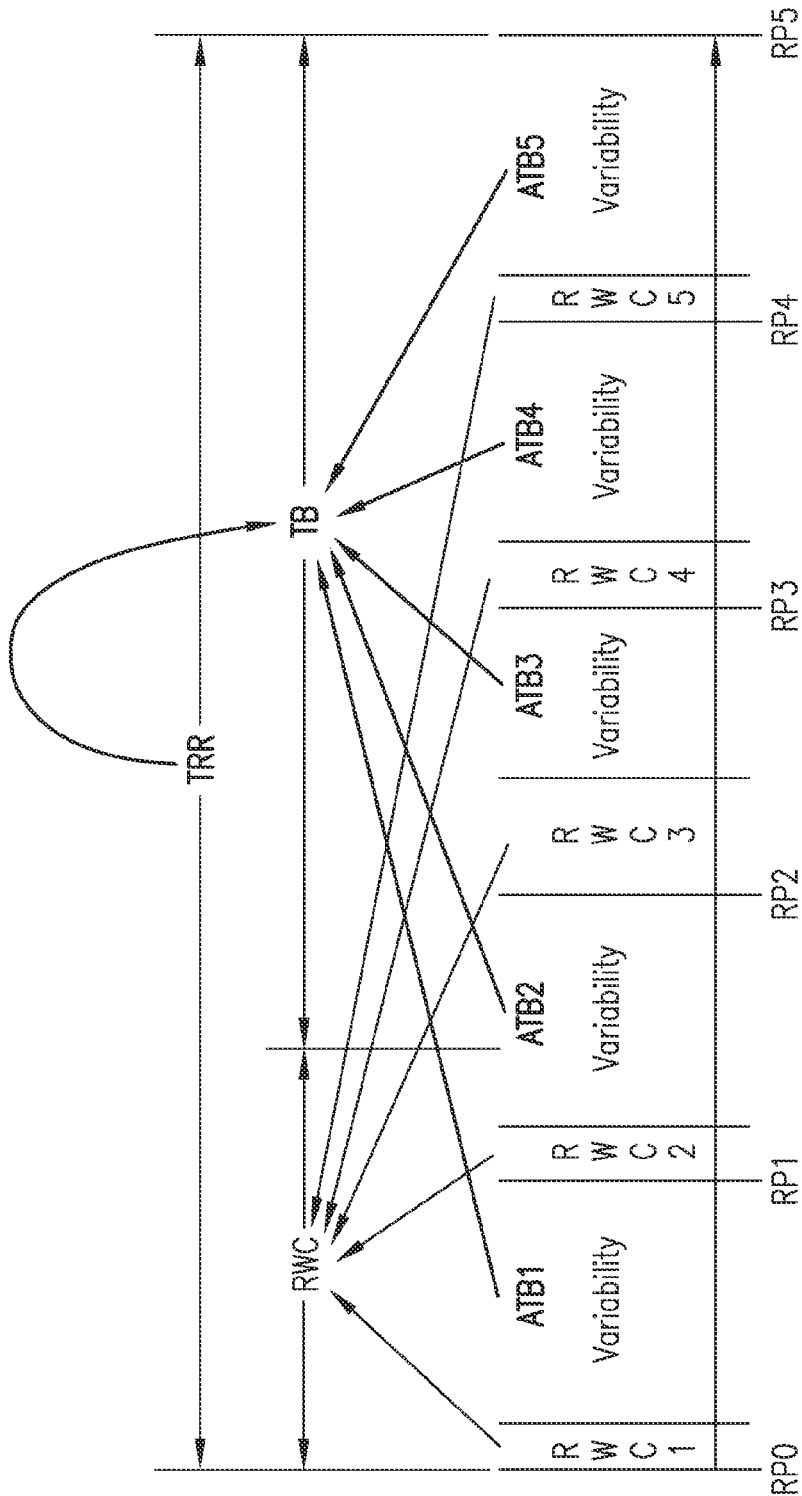
FIG. 1 is an exemplary graph illustrating the implementation of particular steps of the method of the present invention, including identifying each Reporting Point (RP) in each item's predefined process flow, the resources and time needed to complete the Required Work Content (RWC) for each Reporting Point (RP), the amount of Allocated Time Buffer (ATB) required to address the variability associated with the completion of each item's Required Work Content ($RWC_{RP}$) associated with each Reporting Point (RP) along a predetermined process flow and each item's Time-to-Reliably Replenish (TRR)

Referring to FIGS. 1 and 18A, step 102 identifies all process steps through which each selected item must pass. Each process step is a single step that is part of an overall process that produces or provides a processed item. Examples include machining pieces of raw material, conformal coating, painting, component assembly, transportation, etc.

Step 104 identifies the resources required to complete the Required Work Content (RWC). The RWC is the total required work needed to completely perform all process steps in the overall process.

Referring to FIGS. 1 and 18A, step 106 defines, for each process step, the amount of touch time required to complete the Required Work Content (RWC). Thus, this step defines the amount of touch time required to complete each step in the process. This step also computes the total touch time required to complete all process steps. This computed total time is therefore the total amount of touch time required to complete the RWC.

After step 106, the method then shifts to two portions of the method simultaneously. The first portion starts at step 107 and the second portion starts at step 216. The portion of the method starting with step 107 is discussed first and the portion of the method starting with step 216 is discussed later in an ensuing description.

Referring to FIGS. 1 and 18A, step 107 defines, for each process step, the amount of Allocated Time Buffer (ATB) required accounting for the variability associated with completing the Required Work Content (RWC). Thus, this step defines the amount of Allocated Time Buffer (ATB) required at each step in the process. This step also computes the total Time Buffer (TB) required to complete all process steps. This computed total time is therefore the total amount of Time Buffer (TB) required to account for the variability associated with completing the RWC.

Step 108 identifies each selected item's Time-To-Reliably Replenish (TRR). The TRR can be a known value, already stored in database 34 or database 36. In one embodiment, the TRR is computed using the method described in commonly owned U.S. Patent Application Publication No. 20060235734 entitled "Method and System for Determining Buffer Inventory Size", the disclosure of which published application is hereby incorporated by reference.

Referring to FIGS. 1 and 18A, step 110 identifies each Reporting Point (RP) in each selected item's predefined process flow. As shown in FIG. 1, there are multiple Reporting Points RP1, RP2, RP3, RP4, etc. In a preferred embodiment, transaction data, such as the transaction data retrieved in step 100, is based on data collected at the Reporting Points RP1, RP2, RP3, RP4, etc.

Figure 2:
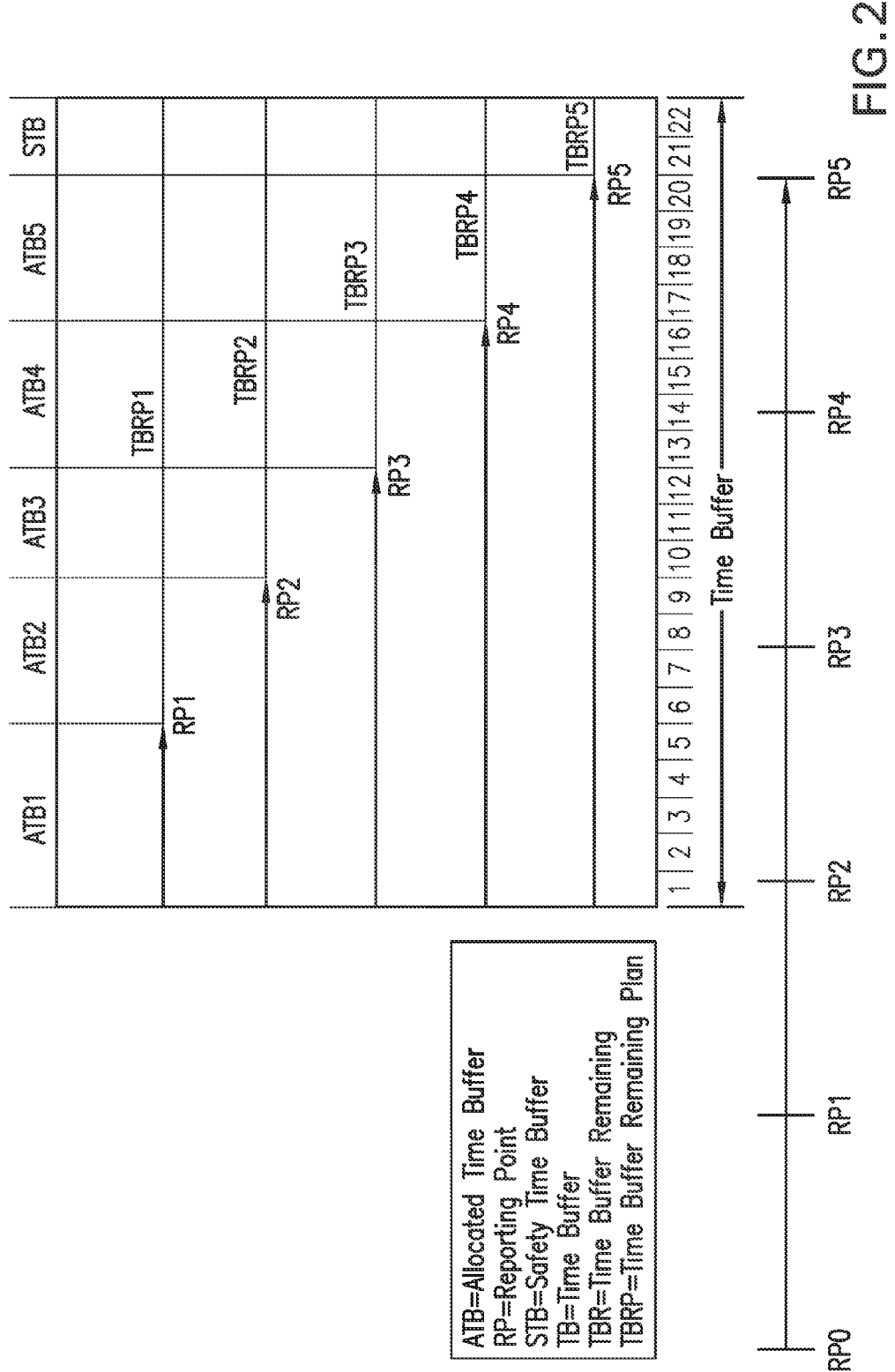
FIG. 2 is an exemplary graph illustrating the method steps of determining (i) the amount of Allocated Time Buffer (ATB) that each item's process steps will receive, (ii) the Safety Time Buffer (STB) for each item's overall process, and (iii) the Planned Time Buffer Remaining (TBRP) at each Reporting Point (RP)
Figure 18B:
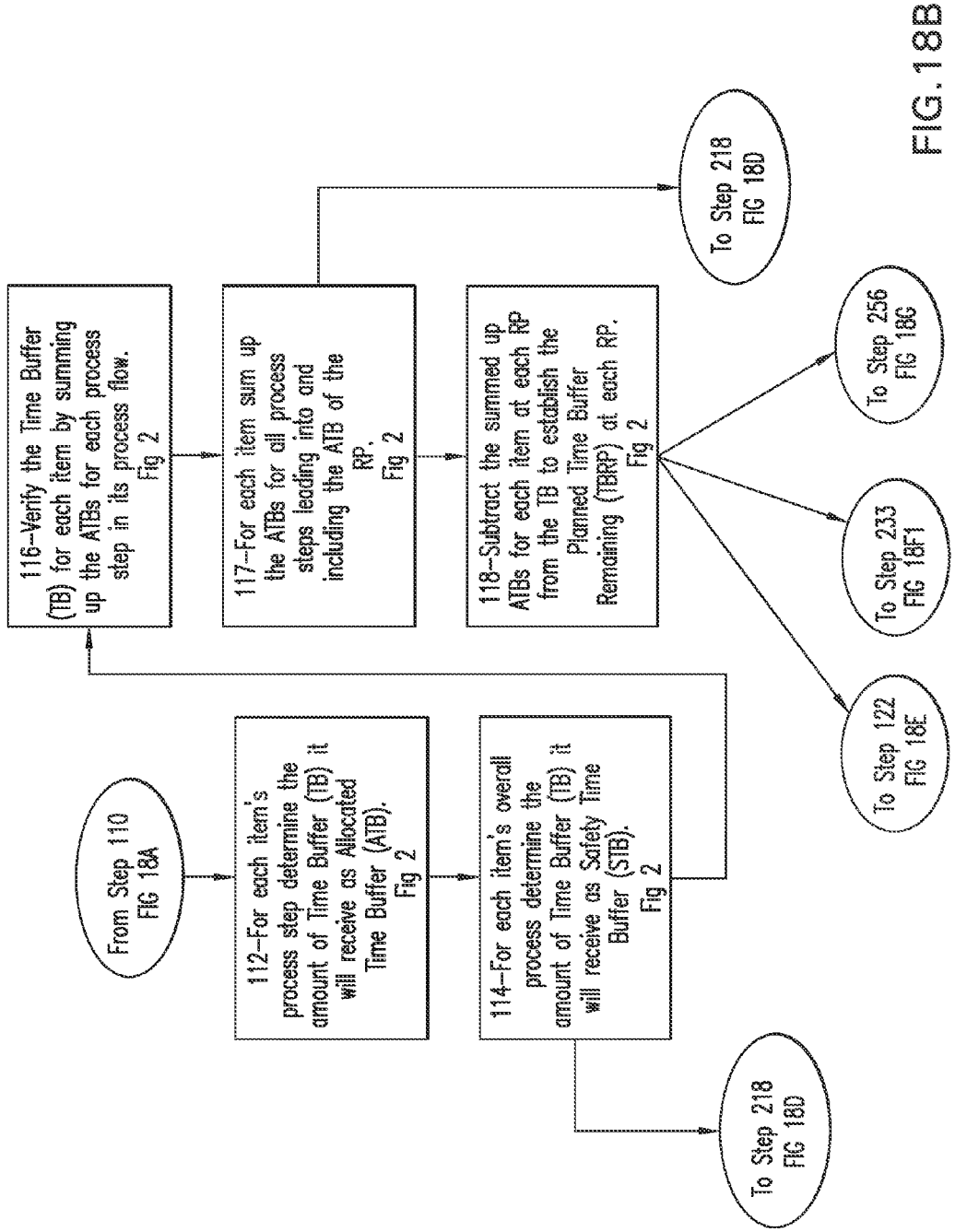

Referring to FIGS. 2 and 18B, the next step of the method is step 112. This step determines, for each process step through which the selected item moves, the amount of Time Buffer (TB) that the process step will receive as Allocated Time Buffer (ATB). Thus, theoretically, each process step should be completed within its Allocated Time Buffer (ATB).

Referring to FIGS. 2 and 18B, step 114 determines, for each selected item's overall process, the amount of Time Buffer (TB) it will receive as a Safety Time Buffer (STB). As an example, FIG. 2 shows an overall process having five (5) process steps and five (5) Reporting Points RP1, RP2, RP3, RP4 and R5. Each process step has an Allocated Time Buffer (ATB) assigned thereto. For example, the first process step has ATB1 which is five (5) units. The entire (5) process steps in total are allocated twenty (20) time units. The overall process is allocated a Safety Time Buffer (STB) of two (2) units. Therefore, the Time Buffer (TB) for the entire process is twenty two (22) units.

After step 114, the method then shifts to two portions of the method simultaneously. The first portion starts at step 116 and the second portion starts at step 218. The portion of the method starting with step 116 is discussed first and the portion of the method starting with step 218 is discussed later in an ensuing description.

Step 116 verifies the Time Buffer (TB) for a selected item's overall process by summing the Allocated Time Buffers (ATB) for each process step in the predefined process flow.

Step 117 effects a summation of all the ATBs for all process steps leading into and including the Reporting Point (RP).

After step 117, the method then shifts to two portions of the method simultaneously. The first portion starts at step 118 and the second portion starts at step 218. The portion of the method starting with step 118 is discussed first and the portion of the method starting with step 218 is discussed later in an ensuing description.

Step 118 determines the Planned Time Buffer Remaining (TBRP) at each Reporting Point (RP). This is accomplished, for each Reporting Point (RP), by subtracting the value representing the summation of the ATBs from each of the preceding Reporting Points (RP), which was determined in step 117, from the Time Buffer (TB) to establish the Planned Time Buffer Remaining (TBRP) at each Reporting Point (RP).

After step 118, the method then shifts to three portions of the method simultaneously. The first portion starts at step 122, the second portion starts at step 233, and the third portion starts at step 256. The portion of the method starting with step 122 is discussed first and the portions of the method starting with steps 233 and 256 are discussed at a later point in the ensuing description.

Figure 18C:
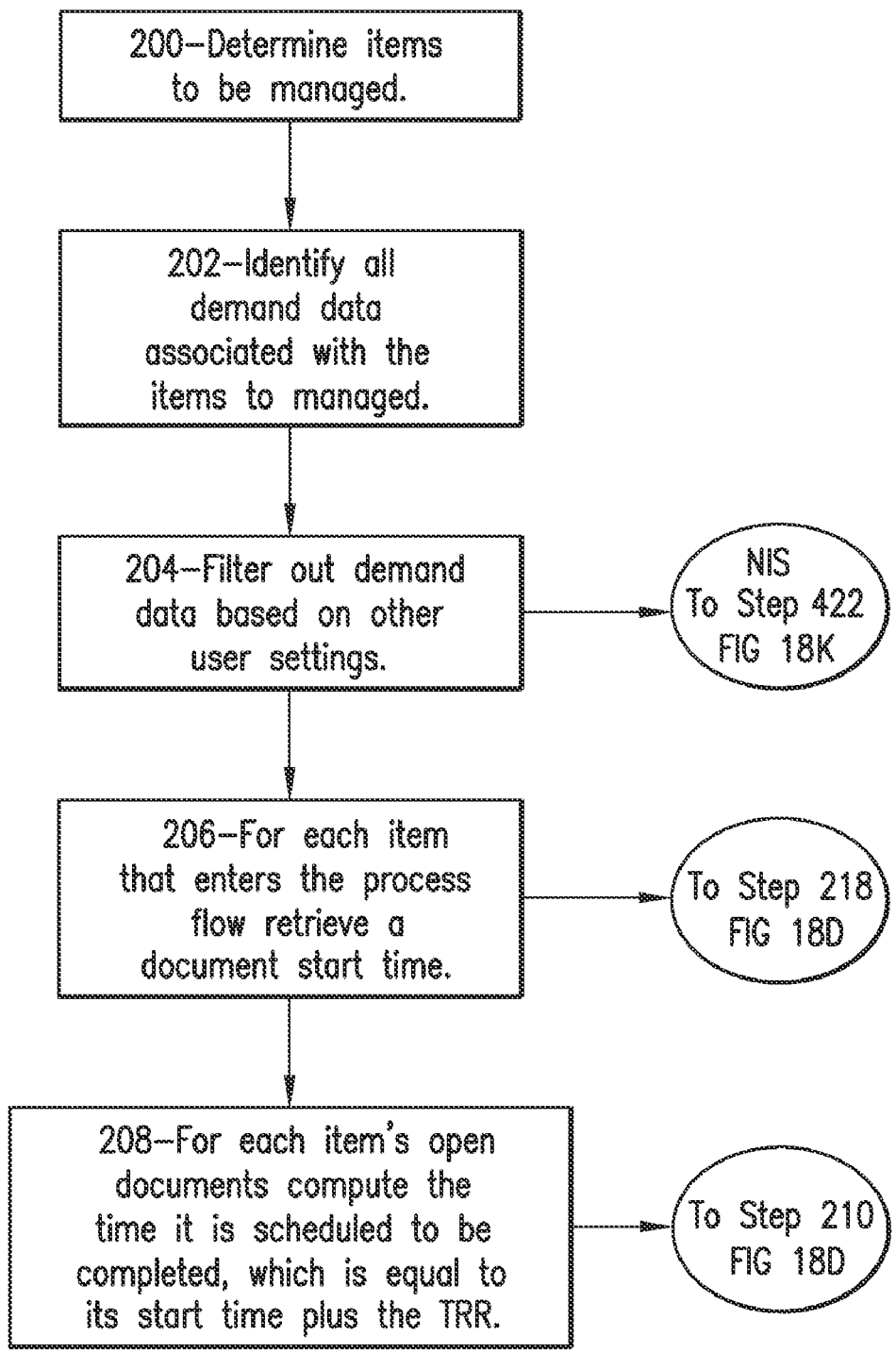
Figure 18D:
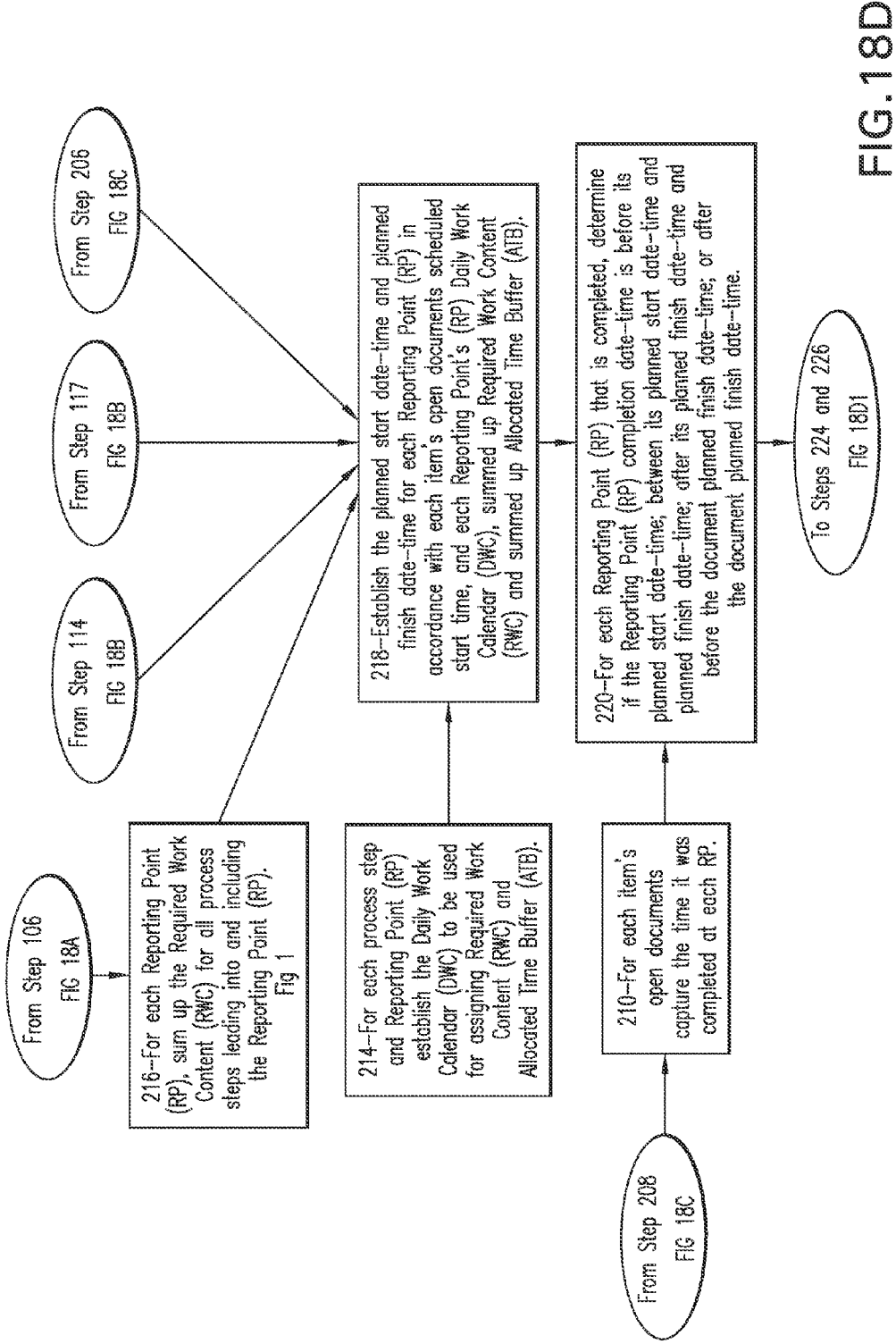

An important factor of Time Buffer Management resides in the monitoring of the movement of items in the "Time-Domain" concurrent with their movement through a predefined process flow. The process for monitoring an item's movement in the "Time-Domain" begins with steps 200-212 which are shown in FIGS. 18C, 18D and 18D1.

In step 200, it is determined which items are to be managed or reviewed. Thus, the user would enter some identifying data into computer system 14 via keyboard 16 that identifies a particular item to be managed.

Step 202 identifies all demand data associated with the selected items.

In step 204, the user inputs desired filter settings into computer system 14. In response, computer system 14 processes the demand data for the item in question and filters out demand data based on the user's filter settings. One function of step 204 is to segregate demand for stock replenishment actions from the demands made from stock at the wholesale, retail or local repair/production process level. In the event an item selected to be managed is Not-In-Stock (NIS), or has a history of NIS occurrences, the method shifts to another portion of the method that determines a Physical Buffer Factor (PBF) and re-sizes Physical Buffers (PB). Specifically, the information developed in steps 200, 202 and 204 is routed to step 422 which is part of the method to re-size the Physical Buffer (PB) and relates to the Physical Buffer Factor (PBF). The portion of the method of the present invention that relates to the Physical Buffer Factor (PBF) commences at step 500 (see FIG. 18M) and is described later in the ensuing description. The portions of the method of the present invention that relate to the re-sizing of Physical Buffers (PB) commence at step 300 (see FIG. 18I) and step 422 (see FIG. 18K) and are described later in the ensuing description.

Step 206 retrieves a document start time for each item that enters the process flow.

After step 206, the method then shifts to two portions of the method simultaneously. The first portion starts at step 208 and the second portion starts at step 218. The portion of the method starting with step 208 is discussed first and the portion of the method starting with step 218 is discussed later in an ensuing description.

Step 208 computes, for each item's Open Documents, the amount of time within which it is scheduled to be completed. This amount of time is equal to the item's start time plus the TRR associated with that item. The TRR can be a known value previously generated by the method described in the aforementioned US Patent Application Publication 20060235734.

After step 208, the method continues with step 210 shown in FIG. 18D. In step 210, for each item's Open Documents, this step retrieves the time it was completed at each Reporting Point (RP).

In FIG. 18 D and step 214, for each process step and Reporting Point (RP) a Daily Work Calendar (DWC) is established which is used for assigning Required Work Content (RWC) and Allocated Time Buffer (ATB).

Referring to FIGS. 1 and 18D, step 216 sums up for each Reporting Point (RP) the Required Work Content (RWC) for all process steps leading into and including the Reporting Point (RP). As described in the foregoing description, step 216 also receives data and information provided by step 106.

In FIG. 18D and step 218, the planned start date-time and planned finish date-time for each Reporting Point (RP) is established in accordance with each item's open documents scheduled start time, and each Reporting Point's (RP) Daily Work Calendar (DWC), summed up Required Work Content (RWC) and summed up Allocated Time Buffer (ATB). As described in the foregoing description, step 218 also receives data and information provided by steps 114, 117, 206, 214, and 216.

After step 218, the method continues with step 220 shown in FIG. 18D. In step 220, for each Reporting Point (RP) that is completed, the step determines if the Reporting Point (RP)

completion date-time is before its planned start date-time; between its planned start date-time and planned finish date-time; after its planned finish date-time and before the document planned finish date-time; or after the document planned finish date-time. This step also receives the data and information provided by step 210.

After step 220, the method continues simultaneously with steps 224 and 226 shown in FIG. 18D1. In step 224, for each RP that is completed before its planned start date-time; between its planned start date-time and planned finish date-time; after its planned finish date-time and before the document planned finish date-time; the Time Buffer Remaining (TBR) is computed by summing from the RP's actual completion date-time the remaining unused planned time for RWC, ATB and STB. In step 226, for each RP that is completed after the document planned finish date-time, the negative Time Buffer Remaining (TBR) is computed by summing the number of available Daily Work Calendar (DWC) days from the document's planned completion date-time to the RP's actual completion date-time and adding to that any remaining RWC for RPs not yet completed.

In step 212, for each item's Open Documents, this step determines the Time Buffer Remaining (TBR) at each Reporting Point (RP) from the information made available from steps 224 and 226.

After step 212, the method shifts to steps 122, 233 and 250 simultaneously. Step 122 is described in the ensuing description after the description of steps 120 and 121. Steps 233 and 250 are described in the ensuing description after the description of steps 120-127.

Figure 3:
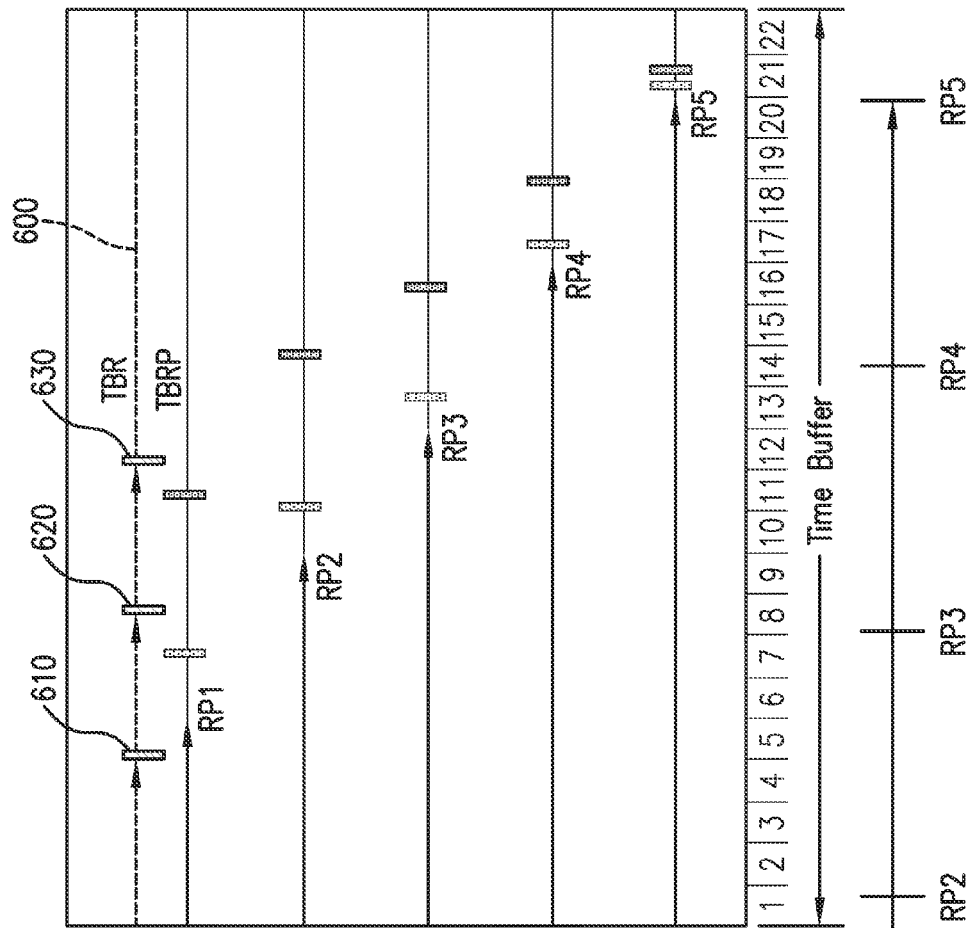
FIG. 3 is an exemplary graph illustrating several steps of the method of the present invention, including the steps of allowing a user to define Buffer Recovery Percent (BRP) values that will be used as triggers for planning to Recover Time Buffer (RTB) and for taking actions to Recover Time Buffer (RTB)
Figure 18E:
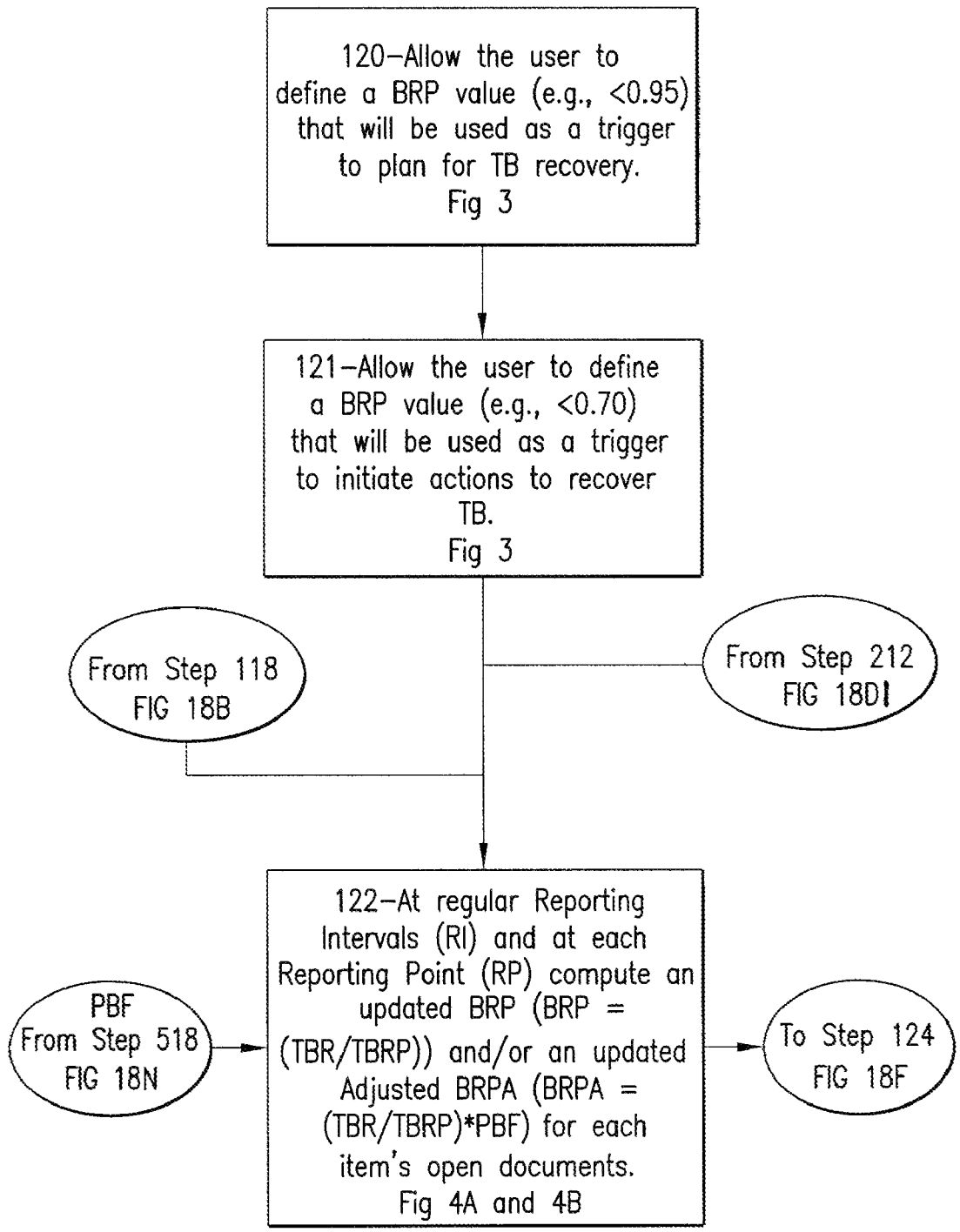

Referring to FIGS. 3 and 18E, step 120 allows the user to define a first Buffer Recovery Percent (BRP) value that is used as a trigger to plan to Recover Time Buffer (RTB). Step 121 allows the user to define a second Buffer Recovery Percent (BRP) value that is used as a trigger to initiate the plan to Recover Time Buffer (RTB). The user inputs the user defined first and second BRP values into computer system 14 via keyboard 16. The actual Buffer Recovery Percent (BRP) is computed by the formula:

$$BRP=TBR/TBRP,$$

wherein TBR is the actual Time Buffer Remaining and TBRP is the Planned Time Buffer Remaining. FIGS. 3 and 18E shows an example wherein the first user defined BRP value is less than the 0.95 but greater than 0.70, and the second user defined BRP value is less than 0.70. In FIG. 3, dotted line 600 represents the Time Buffer Remaining (TBR) when RP1 actually reported in as being complete. Rectangles 610, 620 and 630 represent three different examples of the amount of Time Buffer Remaining (TBR). Rectangle 610 shows that the amount of TBR remaining is greater than the Planned Time Buffer Remaining (TBRP) which would produce a BRP value greater than 1.0. Rectangle 620 shows the amount of Time Buffer Remaining (TBR) to be less than Planned Time Buffer Remaining (TBRP) and would yield a BRP value less than 0.95, but not less than 0.70. Rectangle 630 shows the Time Buffer Remaining (TBR) is much less than Planned Time Buffer Remaining (TBRP) which would yield a BRP value less than 0.70.

Figure 4A:
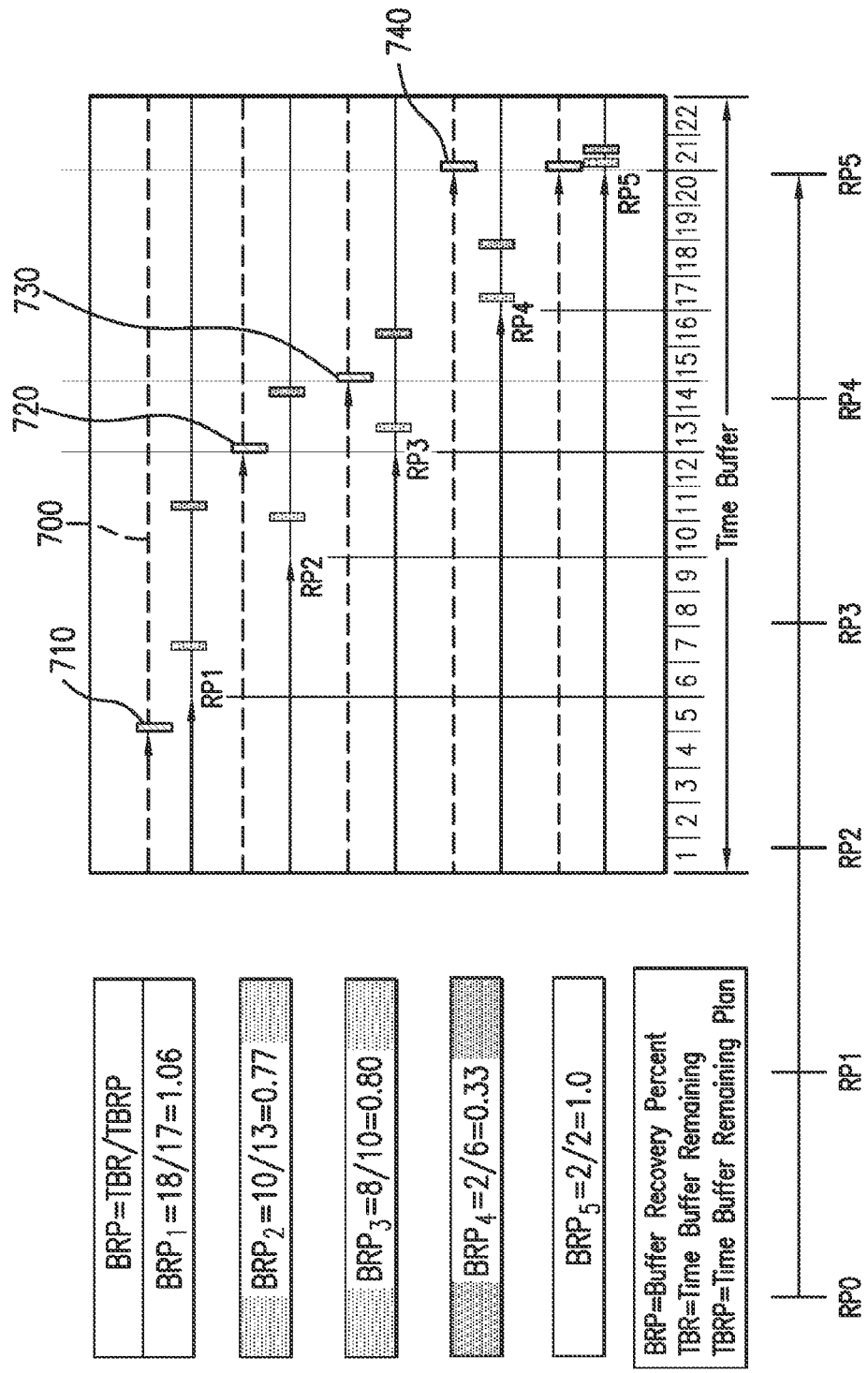
FIG. 4A is an exemplary graph illustrating several steps of the method of the present invention, including the steps of computing an updated Buffer Recovery Percent (BRP) at regular Reporting Intervals (RI) and Reporting Points (RP) for each item's Open Documents, and flagging those items with Buffer Recovery Percent (BRP) values that are less than the user defined values in order to plan and take actions to Recover Time Buffer (RTB)
Figure 4B:
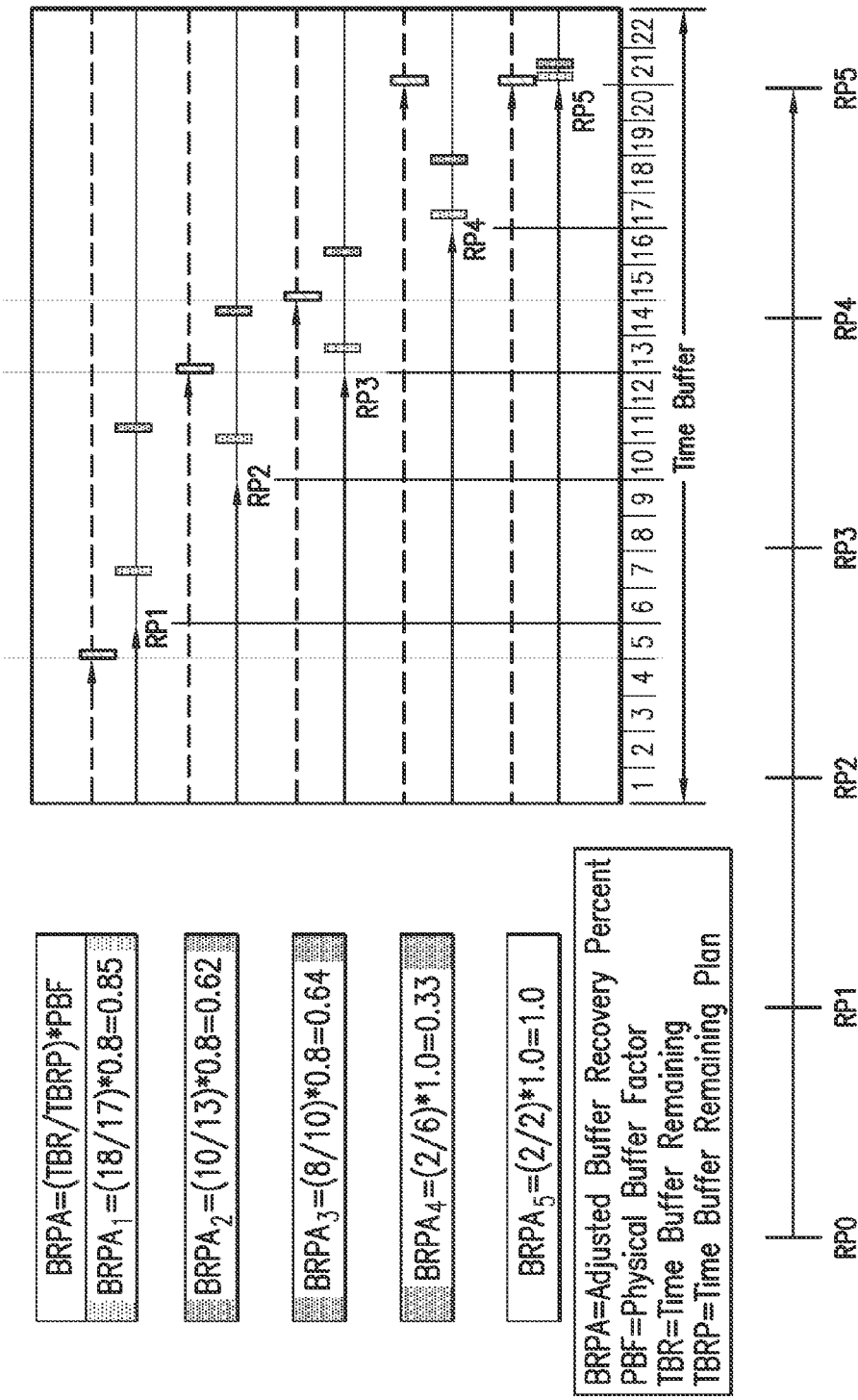
FIG. 4B is an exemplary graph illustrating several steps of the method of the present invention, including the steps of computing an updated Adjusted Buffer Recovery Percent (BRPA) based on Physical Buffer Factors (PBF) at regular Reporting Intervals (RI) and Reporting Points (RP) for each item's Open Documents, and flagging those items with Adjusted Buffer Recovery Percent (BRPA) values that are less than the user defined values in order to plan and take actions to Recover Time Buffer (RTB)

In step 122, an updated Buffer Recovery Percent (BRP) and/or an updated Adjusted Buffer Recovery Percent (BRPA) is computed at regular Reporting Intervals (RI) and at each Reporting Point (RP) for each selected item's Open Documents. The term "Open Documents", as used herein, is defined to be the real time history of the flow of the item through the predefined process flow. An example of this step is shown in FIGS. 4A and 4B. As described in the foregoing description, step 122 also receives data and information provided by steps 118 and 212. Step 122 also receives Physical Buffer Factor (PBF) information and data provided by step 518 which is described later in the ensuing description. The updated Buffer Recovery Percent (BRP) and the updated Adjusted Buffer Recovery Percent (BRPA) are computed by the following formula:

$$BRP=(TBR/TBRP), \text{ and}$$

$$BRPA=(TBR/TBRP)*PBF$$

Figure 18F:
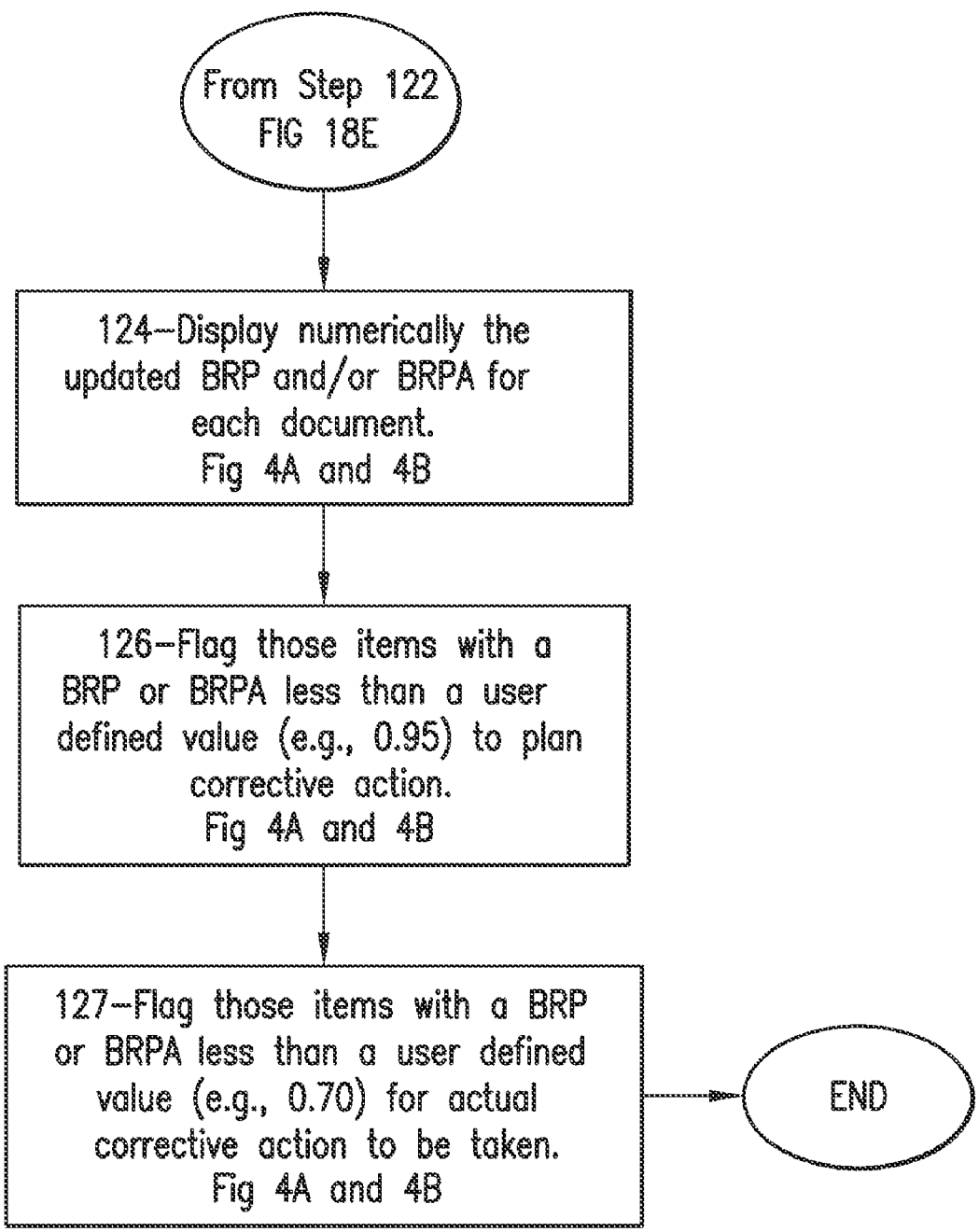

Referring to FIG. 18F, in step 124, the updated Buffer Recovery Percent (BRP) and/or the updated Adjusted Buffer Recovery Percent (BRPA) for each Open Document is displayed numerically on display device 20.

Step 126 flags those items with a computed Buffer Recovery Percent (BRP) or a computed Adjusted Buffer Recovery Percent (BRPA) that is less than the first user predefined BRP value (e.g., 0.95) to initiate the planning of corrective action to Recover Time Buffer (RTB). Step 127 flags those items with a computed BRP or a computed BRPA that is less than the second user defined BRP value (e.g., 0.70) so that actual corrective action can be taken to Recover Time Buffer (RTB). Examples of this step are shown in FIG. 4A. Dotted line 700 represents the Time Buffer Remaining (TBR) when RP1 actually reported in as complete. Rectangle 710 corresponds to when RP1 actually reported in as complete resulting in the Time Buffer Remaining (TBR) being greater than planned (TBRP) (i.e. 22−4=18) versus (22−5=17) and a $BRP_1$=1.06. Since 1.06 is greater than 0.95, this $BRP_1$ value is not flagged for planned corrective action or actual corrective action. Rectangle 720 identifies the time buffer consumed when RP2 was reported to be complete is twelve (12) and the corresponding Time Buffer Remaining (TBR) is ten (10) (i.e. 22−12=10). The Planned value for the Time Buffer Remaining (TBRP) at the reported completion of RP2 was thirteen (13) (i.e. 22−9=13) and therefore, $BRP_2$=10/13=0.77. Thus, the selected item having the Buffer Recovery Percent $BRP_2$=0.77 is flagged to plan corrective action to Recover Time Buffer (RTB). Rectangle 730 identifies the time buffer consumed when RP3 was reported to be complete as being fourteen (14) and the corresponding Time Buffer Remaining (TBR) is eight (8) (i.e. 22−14=8). The Planned value for the Time Buffer Remaining (TBRP) at the reported completion of RP3 was ten (10) (i.e. 22−12=10) and therefore, $BRP_3$=8/10=0.80 which is less than 0.95, but not less than 0.70. Thus, the selected item having a $BRP_3$=0.80 will be flagged for planned corrective action to Recover Time Buffer (RTB). Rectangle 740 identifies the time consumed when RP4 was reported to be complete as being twenty (20) and the corresponding Time Buffer Remaining (TBR) is two (2) (i.e. 22−20=2). The Planned value for the Time Buffer Remaining (TBRP) at the reported completion of RP4 was six (6) (i.e. 22−16=6) and therefore, $BRP_4$=2/6=0.33 which is less than 0.70. Therefore, the selected item having a $BRP_4$=0.33 are flagged for actual corrective action to Recover Time Buffer (RTB). The selected item having $BRP_5$=1.0 is not flagged for any planning of corrective action or actual corrective action since the BRP value is greater than the first user defined BRP value of 0.95.

In FIG. 4B, the TBR and TBRP values are the same as those used in FIG. 4A. Instead of computing the BRP value, an adjusted BRP value (BRPA) is now being computed. The BRPA value is the BRP value multiplied by a Physical Buffer Factor (PBF) to lower the BRP value and increase the priorities at certain times and at certain Reporting Points (RP). As shown in FIG. 4B, the selected item having the Adjusted Buffer Recovery Percent $BRPA_1$=0.85 is flagged to plan corrective action to Recover Time Buffer (RTB). The selected item having the Adjusted Buffer Recovery Percent $BRPA_2=0.62$ and the selected item having the Adjusted Buffer Recovery Percent $BRPA_3=0.64$ and the selected item having the Adjusted Buffer Recovery Percent $BRPA_4=0.33$ are all flagged for actual corrective action to Recover Time Buffer (RTB). The selected item having $BRP_5=1.0$ is not flagged for any planning of corrective action or actual corrective action since the BRP value is greater than the first user defined BRP value of 0.95. The portion of the method of the present invention that relates to BRP or BRPA ends at step 127. Step 230, as will now be described, commences the portion of the method of the present invention that relates to Estimated Buffer Consumption Ratio (BCRE).

Figure 5A:
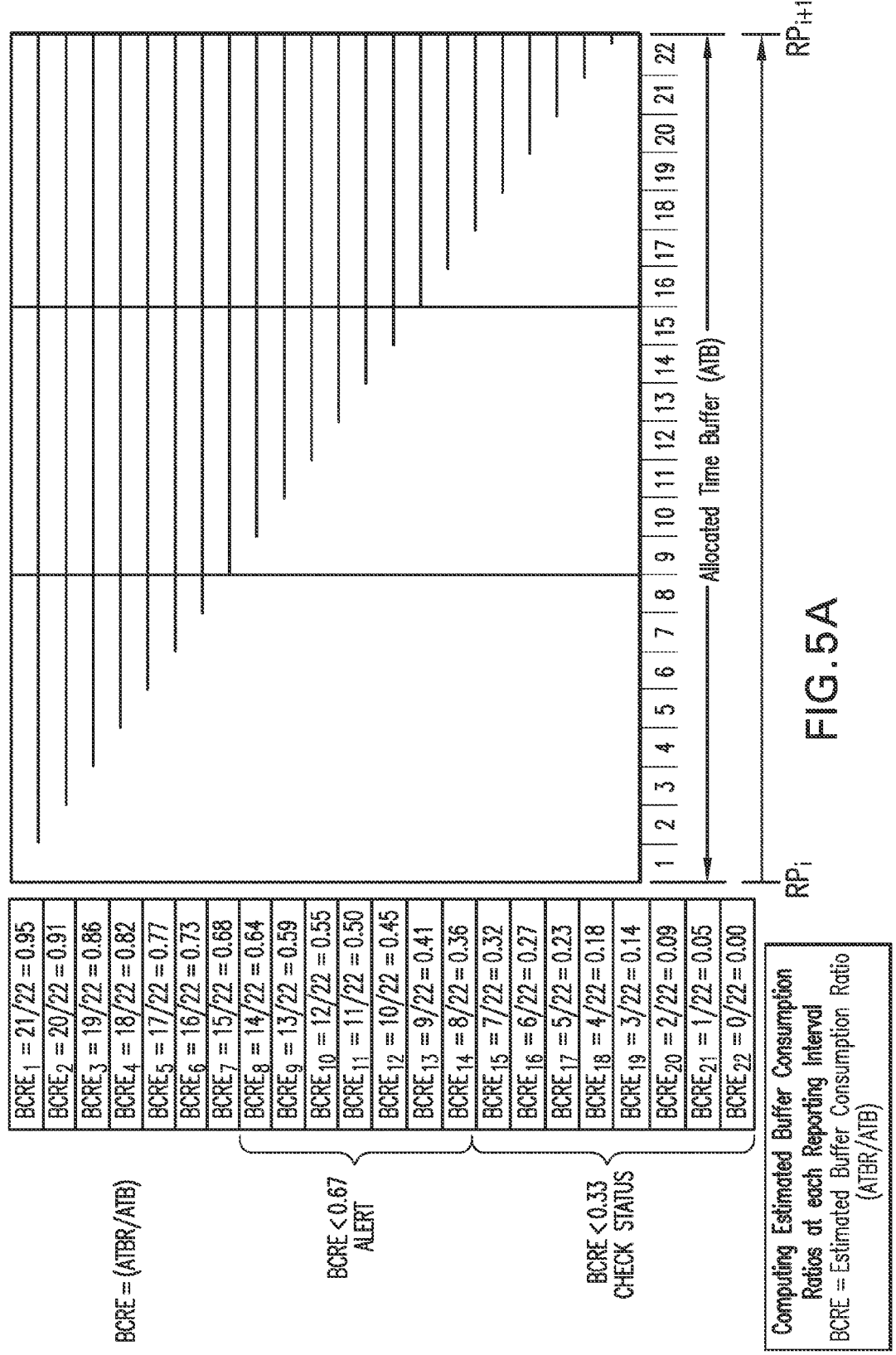
FIG. 5A is an exemplary graph illustrating the method steps of computing an Estimated Buffer Consumption Ratio (BCRE) for each item's Open Documents at regular Reporting Intervals (RI) between Reporting Points (RP)

Referring to FIGS. 5A and 18F1, step 230 provides the user with the option to receive information regarding an item's estimated movement between two Reporting Points (RP) using an Estimated Buffer Consumption Ratio (BCRE) whenever the ATB for any RP is greater than one-third of the total TB and/or the (RWC+ATB) for the RP is greater than (6) RIs. Step 231 allows the user to define a first Estimated Buffer Consumption Ratio (BCRE) value that is used to trigger an "Alert" to a possible delay in an item's movement from one Reporting Point ($RP_i$) to the next Reporting Point ($RP_{i+1}$). Step 232 allows the user to define a second Estimated Buffer Consumption Ratio (BCRE) value that is used as a trigger to "Check Status" of an item's movement from one Reporting Point ($RP_i$) to the next Reporting Point ($RP_{i+1}$).

In step 233, the Allocated Time Buffer Remaining (ATBR) is computed at each Reporting Point (RP) and at regular Reporting Intervals (RI) between Reporting Points (RP) for each selected item's Open Documents. The term "Open Documents", as used herein, is defined to be the real time history of the flow of the item through the predefined process flow. As described in the foregoing description, step 233 also receives data and information provided by steps 118 and 212. In step 234, the Estimated Buffer Consumption Ratio (BORE) is computed at regular Reporting Intervals (RI) between Reporting Points (RP) for each selected item's Open Documents. The user inputs the user defined first and second BORE values into computer system 14 via keyboard 16. The Estimated Buffer Consumption Ratio (BORE) is computed at each Reporting Interval (RI) by the formula:

$$BCRE=ATBR/ATB_{RPi+1}, \text{ and}$$

$$ATBR=TBR_{RPi}-TBRP_{RPi}+ATB_{RPi+1}-(\Sigma RI''_{i=0}\times((ATB_{RPi+1})/(RWC_{RPi+1}+ATB_{RPi+1}))), \text{ and}$$

n=the number of Reporting Intervals (RI) after $RP_i$ reported complete wherein the ATBR is incrementally reduced at each Reporting Interval (RI) by an amount of time equal to $(\Sigma RI''_{i=0}\times((ATB_{RPi+i})/(RWC_{RPi+1}+ATB_{RPi+1})))$. FIG. 5A and 18F1 shows an example wherein the first user defined BCRE value is less than the 0.67 but greater than 0.33, and the second user defined BRP value is less than 0.33.

Referring to FIG. 18F2, in step 240, the Estimated Buffer Consumption Ratio (BCRE) for each selected item's Open Document is displayed numerically on display device 20.

Step 241 flags those items with a computed BCRE that is less than the first user predefined BCRE value (e.g., 0.67) to "Alert" a possible delay in item movement. Step 242 flags those items with a computed BCRE that is less than the second user defined BRP value (e.g., 0.33) so that action can be taken to Check Status of the item's movement. As shown in FIG. 5A, the selected items having BCRE values less than 0.67 are flagged with an Alert and those items having BCRE values less than 0.33 are flagged with a Check Status. Step 250, as will now be described, commences the portion of the method of the present invention that relates to actual Buffer Consumption Ratio (BCR).

Figure 5B:
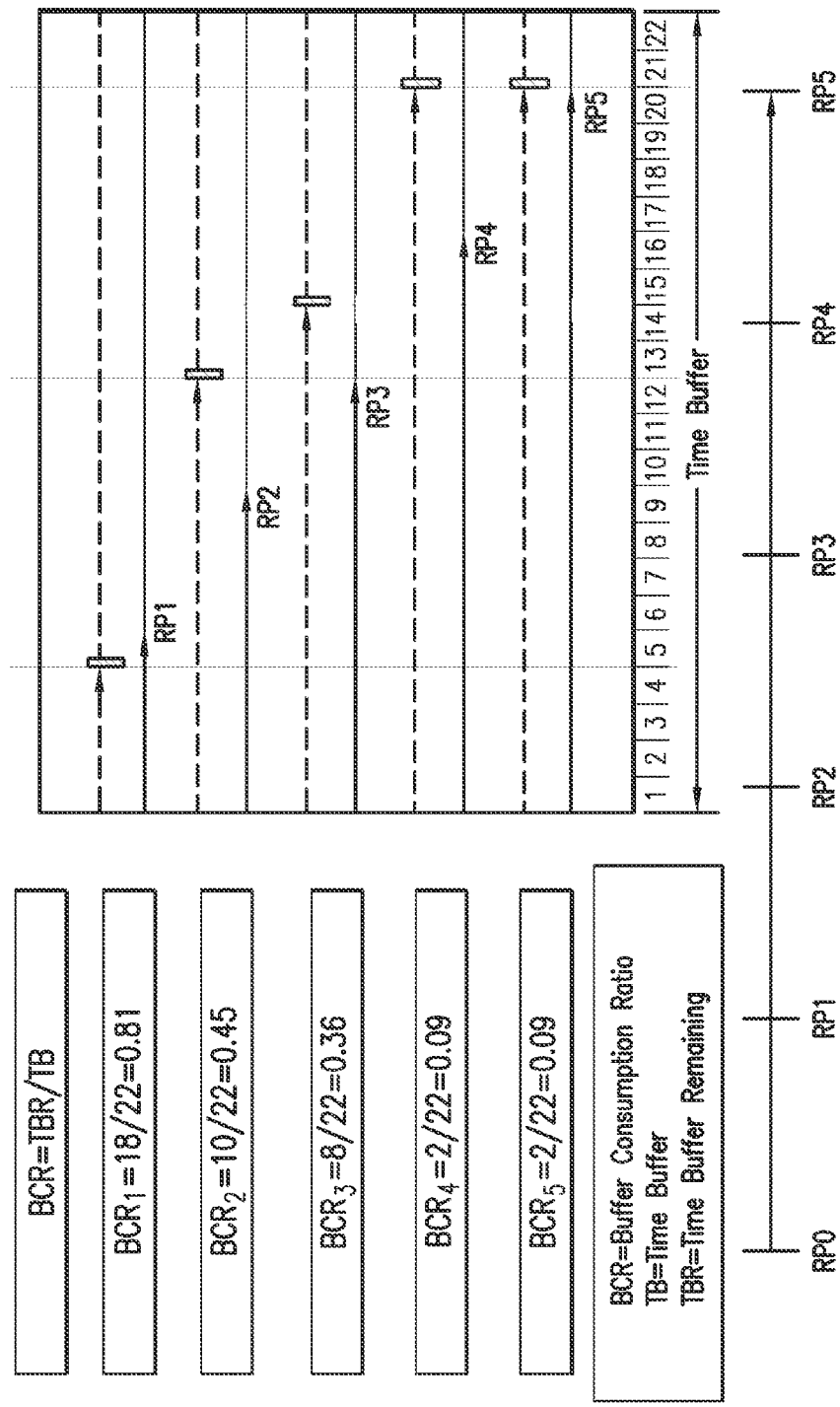
FIG. 5B is an exemplary graph illustrating the method steps of computing an actual Buffer Consumption Ratio (BCR) for each item's Open Documents at regular Reporting Intervals (RI) and at each Reporting Point (RP)
Figure 18G:
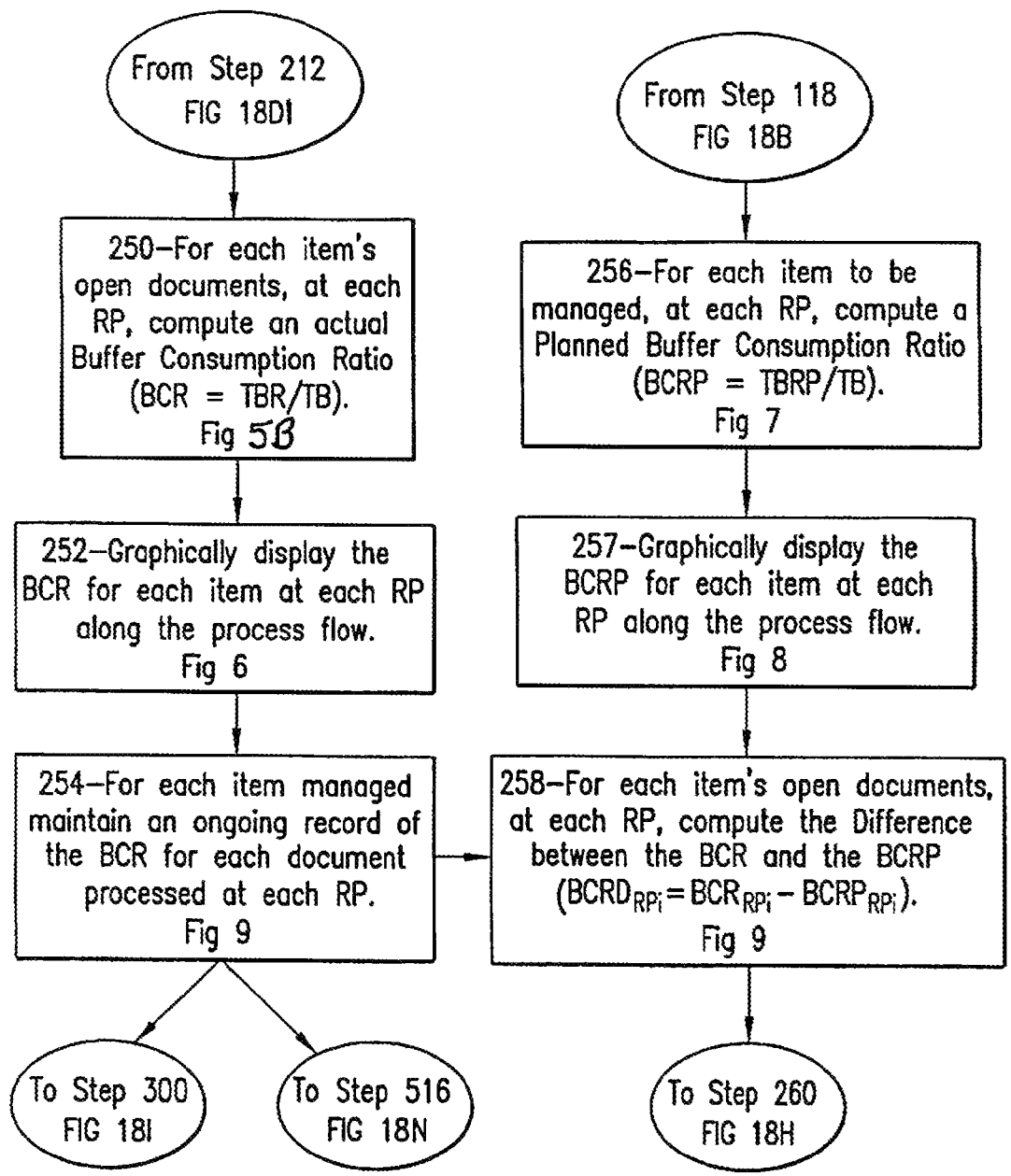

Referring to FIGS. 5B and 18G, step 250 computes, for each item's Open Documents and at each Reporting Point (RP), an actual Buffer Consumption Ratio (BCR). The BCR is computed in accordance with the formula:

$$BCR=TBR/TB.$$

The Buffer Consumption Ratio (BCR) uses the same information related to the Time Buffer Remaining (TBR) when each Reporting Point (RP) is reported in as complete and divides it by the total Time Buffer (TB) instead of the amount of Planned Time Buffer Remaining (TBRP). Exemplary results of step 250 are illustrated in FIG. 5B.

Figure 6:
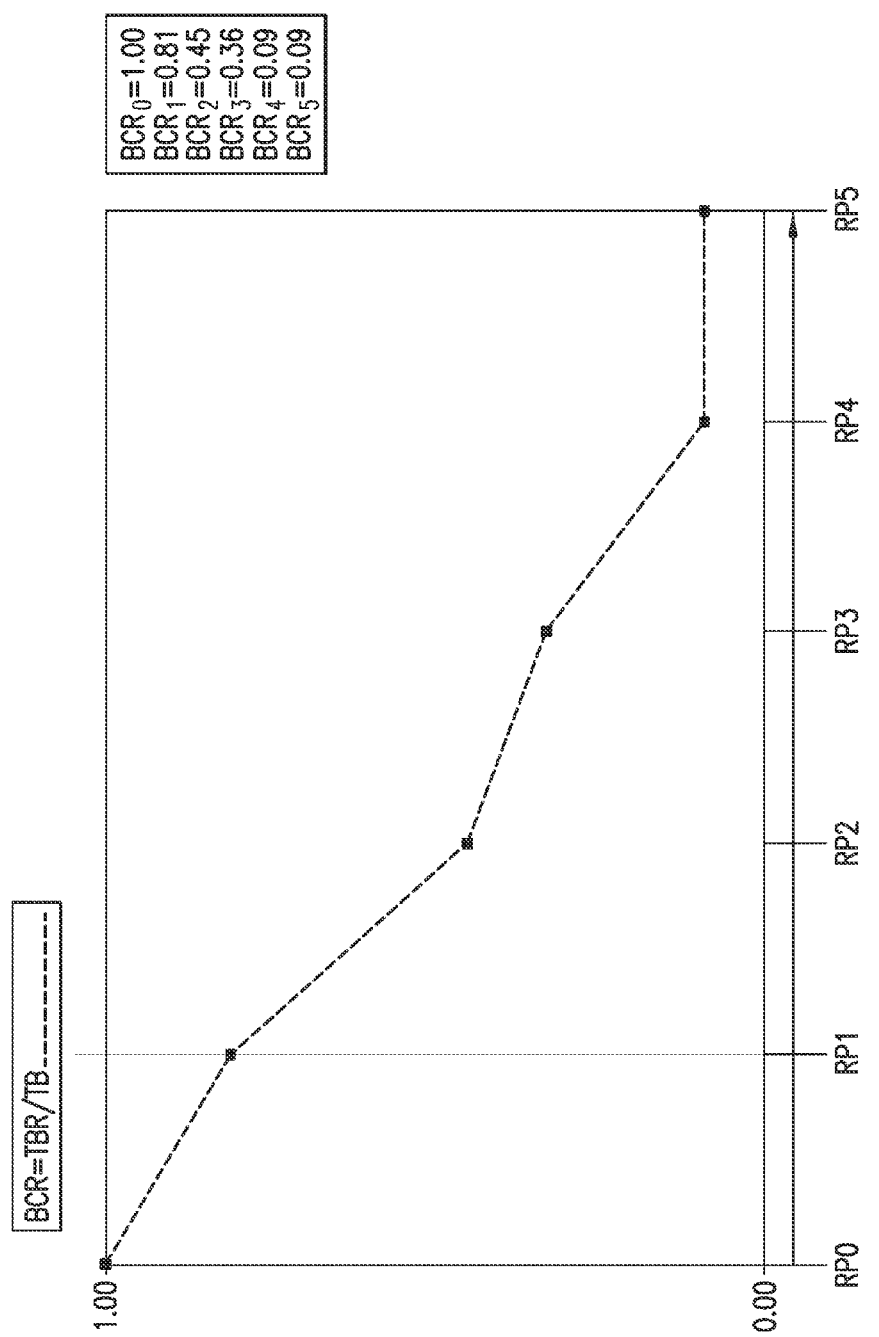
FIG. 6 is an exemplary graph illustrating the method steps of graphically displaying the computed Buffer Consumption Ratio (BCR) for each item at each Reporting Point (RP)

Step 252 graphically displays the Buffer Consumption Ratio (BCR) for each item at each Reporting Point (RP) along the predefined process flow. In this step, the BCR is displayed on display device 20. An example of the implementation of this step is shown in FIG. 6.

Step 254 maintains, for each item managed, an ongoing record of the Buffer Consumption Ratio (BCR) for each document processed at each Reporting Point (RP). After step 254, the method shifts simultaneously to steps 300 and 516. Steps 300 and 516 are discussed later in the ensuing description.

As described in the foregoing description, step 256 receives data and information provided by step 118. In step 256, for each item to be managed and at each Reporting Point (RP) associated with that item, a Planned Buffer Consumption Ratio (BCRP) is computed. The BCRP is found by the formula:

$$BCRP=TBRP/TB.$$

Figure 7:
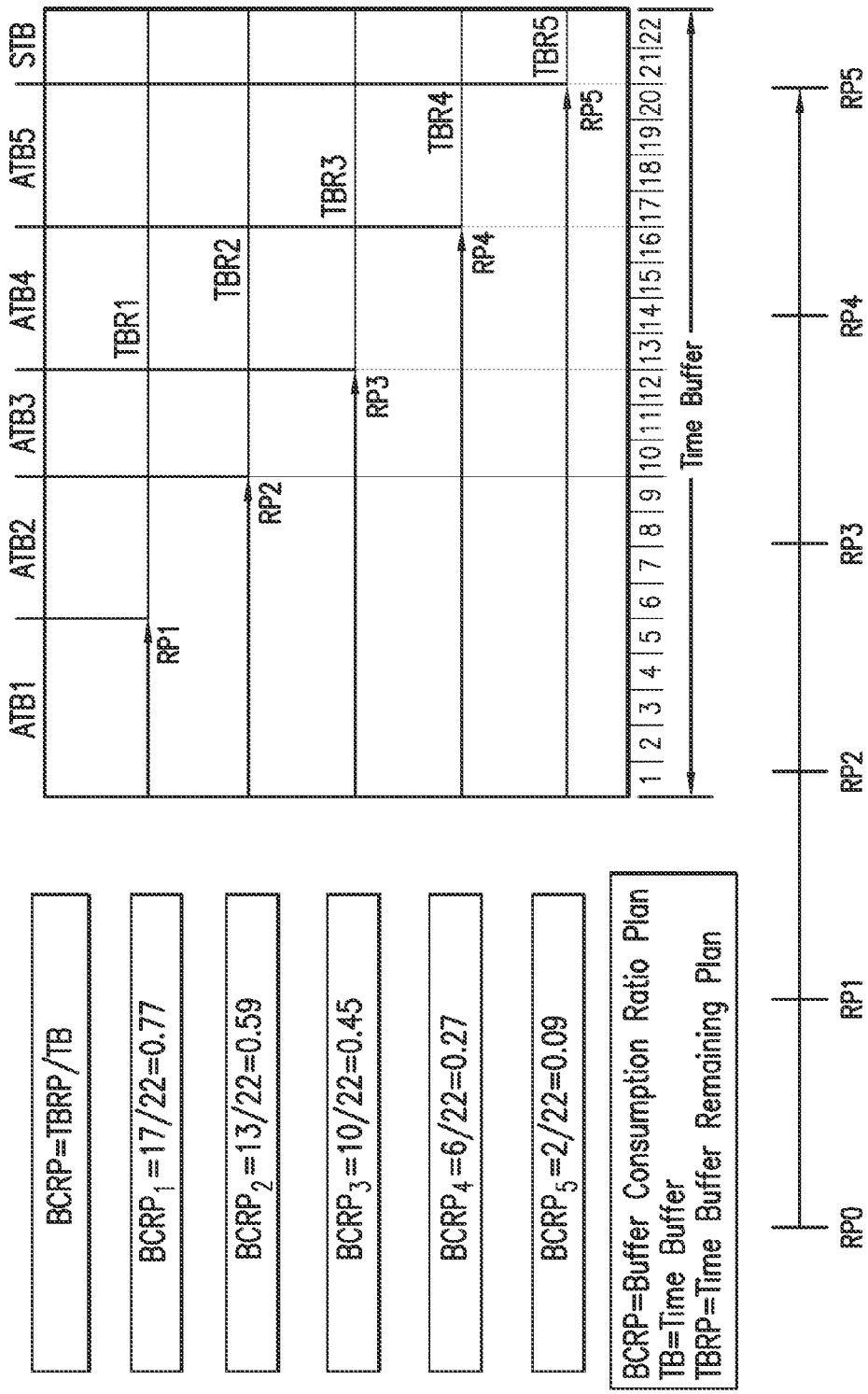
FIG. 7 is an exemplary graph illustrating the method steps of computing a is Planned Buffer Consumption Ratio (BCRP) for each item's Open Documents at regular Reporting Intervals (RI) and at each Reporting Point (RP)
Figure 8:
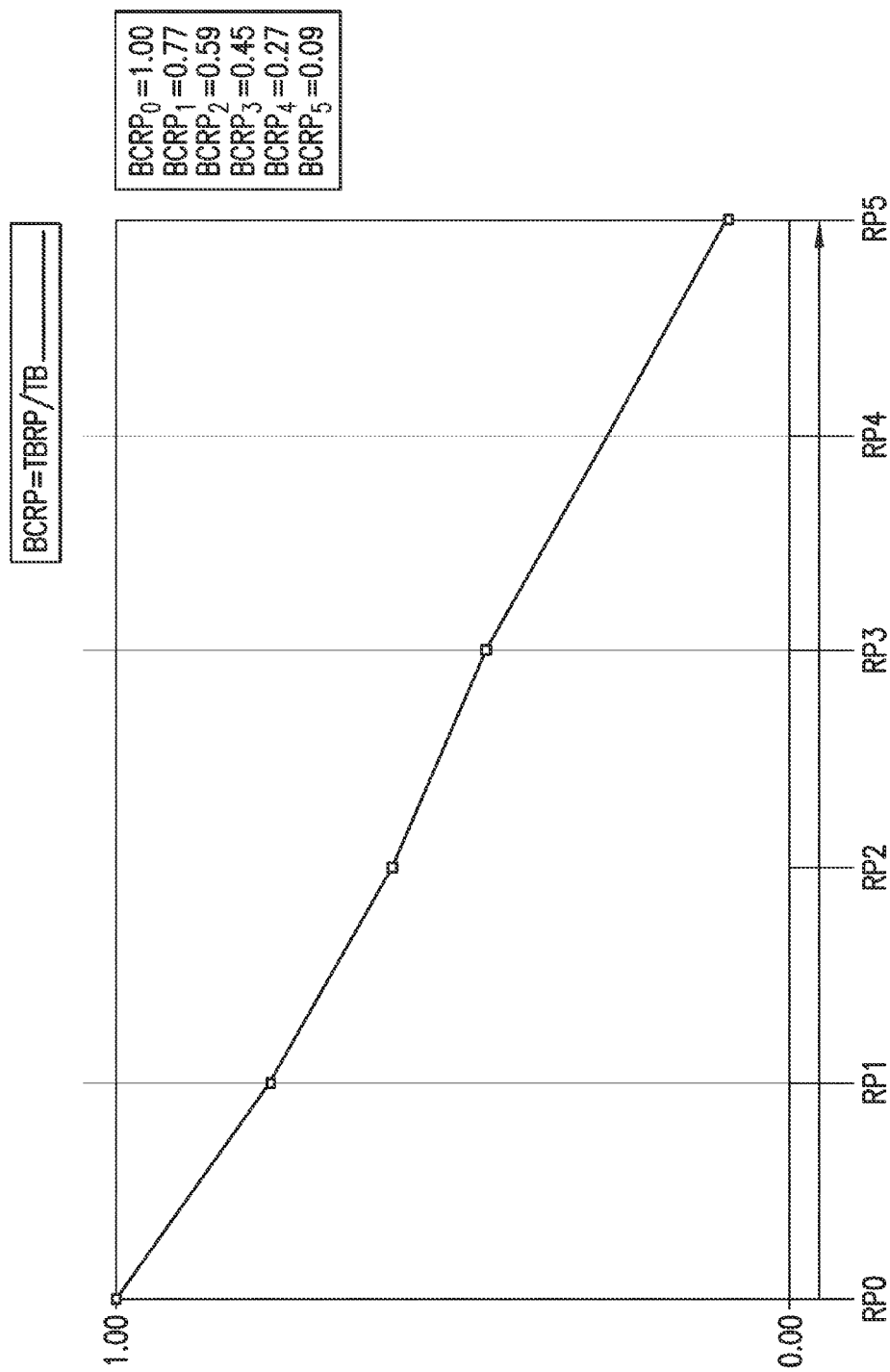
FIG. 8 is an exemplary graph illustrating the method steps of graphically displaying the computed Planned Buffer Consumption Ratio (BCRP) for each item at each Reporting Point (RP)

Exemplary results of step 256 are illustrated in FIG. 7. In step 257, the computed BCRP is displayed on display device 20. An example of the computation and display of the BCRP is illustrated in FIG. 8.

Figure 9:
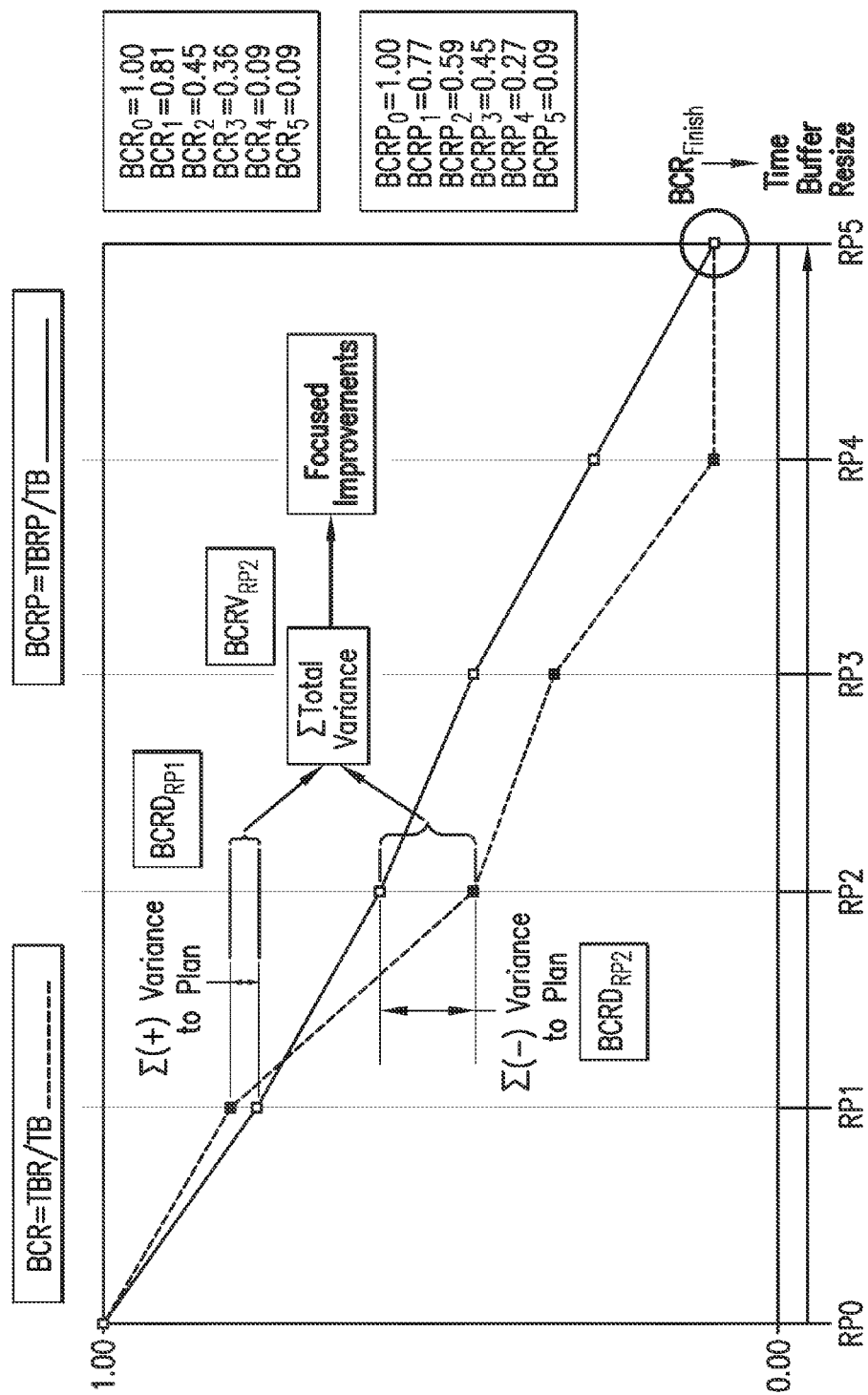
FIG. 9 is an exemplary graph illustrating the method step of, for each item's Open Documents, at each Reporting Point (RP), computing the Buffer Consumption Ratio Difference (BCRD) between the Buffer Consumption Ratio (BCR) and the Planned Buffer Consumption Ratio (BCRP); and computing the Buffer Consumption Ratio Variance (BCRV) as the difference in BCRDs from one Reporting Point (RP) to the next Reporting Point (RP); and recording the Buffer Consumption Ratio ($BCR_{Finish}$) as each item is completed.

Step 258 computes, for each item's Open Document and at each Reporting Point (RP) associated with that item, the difference between the Buffer Consumption Ratio (BCR) and the Planned Buffer Consumption Ratio (BCRP). This difference is computed by the formula:

$$BCRD_{RPi}=BCR_{RPi}-BCRP_{RPi}$$

wherein the $BCRD_{RPi}$ is the difference between the $BCR_{RPi}$ and $BCRP_{RPi}$. This to step also receives results of step 254 as described in the foregoing description. This difference is displayed on display device 20. An example of the results of this step is shown in FIG. 9. After step 258, the method proceeds to step 260.

Figure 18H:
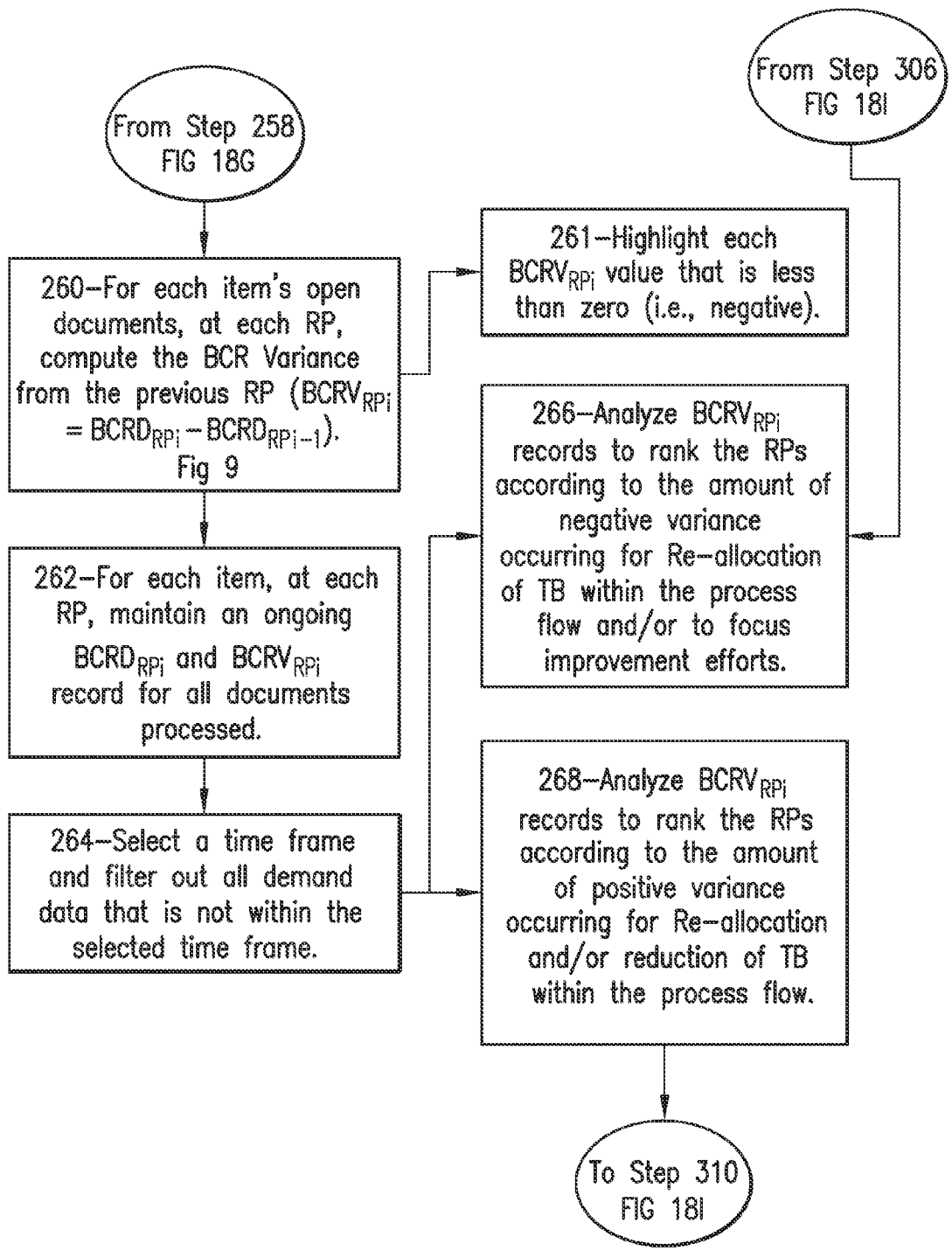

Referring to FIGS. 9 and 18H, step 260 computes, for each item's Open Document and at each Reporting Point (RP) associated with that item, the BCR Variance (BCRV) relative to the previous Reporting Point (RP). This $BCRV_{RPi}$ is computed by the following formula:

$$BCRV_{RPi}=BCRD_{RPi}-BCRD_{RPi-1}$$

FIG. 9 shows an example of the implementation of step 260. Step 261 receives data generated by step 260 and highlights each $BCRV_{RPi}$ value that is less than zero (i.e. negative) when graphically displaying the $BCRV_{RPi}$ values on display device 20.

The method proceeds to step 262 after step 260. Step 262 maintains, for each item and at each Reporting Point (RP) associated with that item, ongoing $BCRD_{RPi}$ and $BCRV_{RPi}$ records for all documents processed. The "BCRD$_{RPi}$" value is the difference between the BCR$_{RPi}$ and BCRP$_{RPi}$ which was computed in step 258. The "BCRV$_{PRi}$" value is the BCR variance which was computed in step 260.

Next, in step 264, the user selects a time frame and filters out all demand data that is not within the selected time frame. The user inputs data representing the selected time frame using keyboard 16.

Next, after step 264, steps 266 and 268 are performed simultaneously. Step 266 analyzes BCRV$_{RPi}$ records to rank the Reporting Points (RP) according to the amount of negative variance occurring for reallocation of the Time Buffer (TB) within the process flow and/or to focus improvement efforts. As described in the ensuing description, step 266 also receives data and information provided by is step 306. Step 266 results in the desired focused local improvements. In step 268, the BCRV$_{RPi}$ records are analyzed to rank the Reporting Points (RP) according to the amount of positive variance occurring for reallocation and/or reduction of TB within the process flow. The information and data generated in step 268 is provided to step 310 which is part of the Time-Buffer-Resizing segment of the method of the present invention which is described in the ensuing description.

Figure 18I:
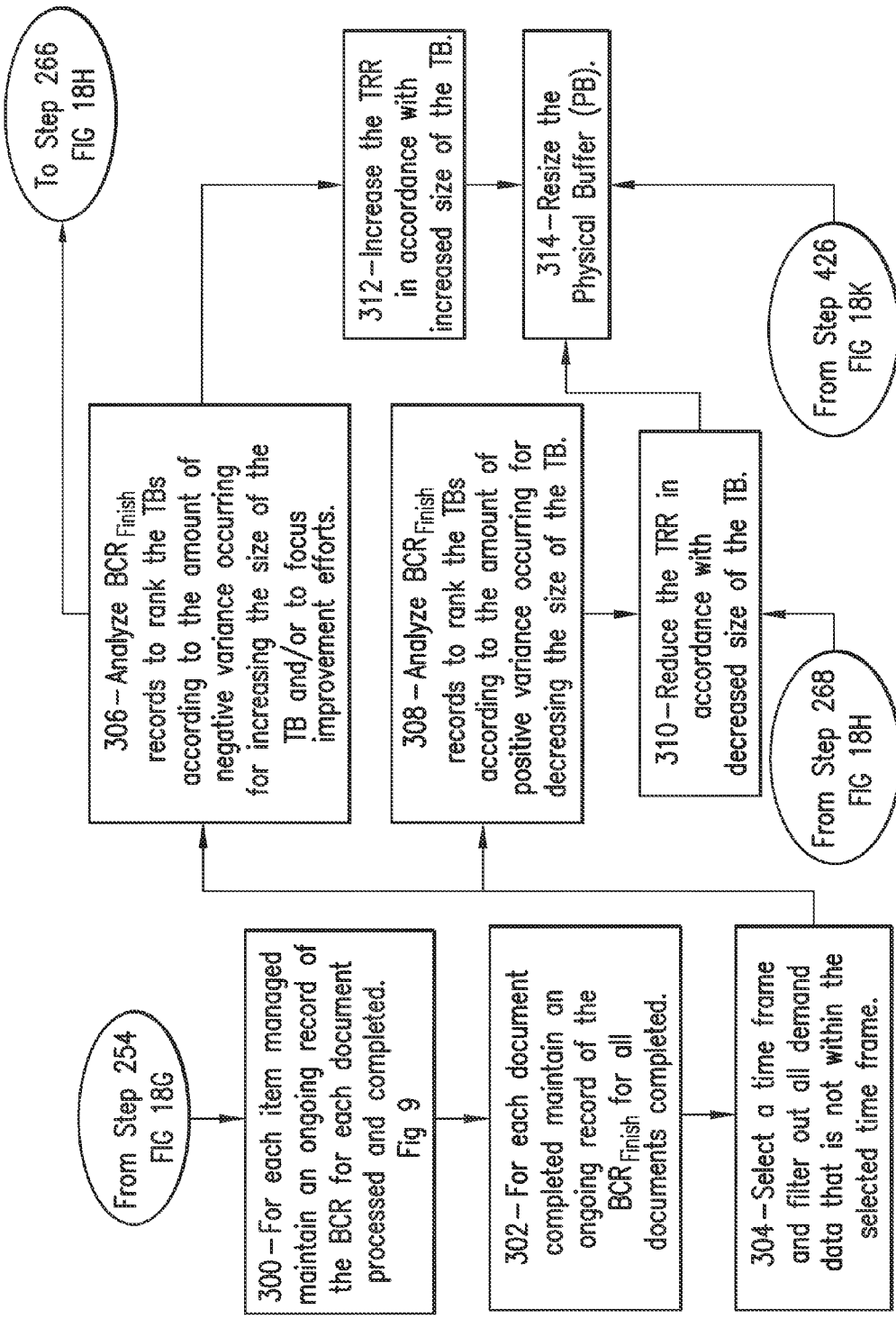

Steps 300-314 of the method of the present invention implement resizing of Time Buffers (TB) and Physical Buffers (PB). As described in the foregoing description, after completion of step 254, the method shifts to steps 258, 300 and 516 simultaneously. Step 258 and the subsequent method steps were already described in the foregoing description. Referring to FIG. 18I, in step 300, for each item managed, an ongoing record is maintained for the BCR for each document processed and completed.

Next, in step 302, for each document completed, an ongoing record of the BCR$_{FINISH}$ is maintained for all documents completed.

In step 304, the user selects a time frame that is used to filter out all demand data that is not within the selected time frame. The user inputs this selected time frame into computer system 14 via keyboard 16.

After step 304, the method shifts to steps 306 and 308 simultaneously. In step 306, the BCR$_{FINISH}$ records for each item are analyzed to rank the Time Buffer (TB) according to the amount of negative variance occurring for increasing the size of the Time Buffer (TB) and/or to focus improvement efforts. The information and data generated in step 306 is provided to step 266 which is part of the method for focused process improvement efforts which is describe in the foregoing description. The method then shifts to step 312 which increases the TRR in accordance with the increased size of the TB. After step 312, step 314 resizes the Physical Buffer (PB). In one embodiment, the method described in the aforesaid US Patent Application Publication No. 20060235734, entitled "Method and System for Determining Buffer Inventory Size", is used to resize the Physical Buffer (PB). The results, provided by step 314, are a desired focus of global improvements.

In step 308, the BCR$_{FINISH}$ records for each item are analyzed to rank the Time Buffer (TB) according to the amount of positive variance occurring for decreasing the size of the Time Buffer (TB).

Step 310 is the next step after step 308, and is also the next step after step 268 which was described in the foregoing description. Step 310 reduces the Time to Reliably Replenish (TRR) in accordance with the decreased size of the Time Buffer (TB). After step 310, the method shifts to step 314 which was described in the foregoing description.

Figure 10A:
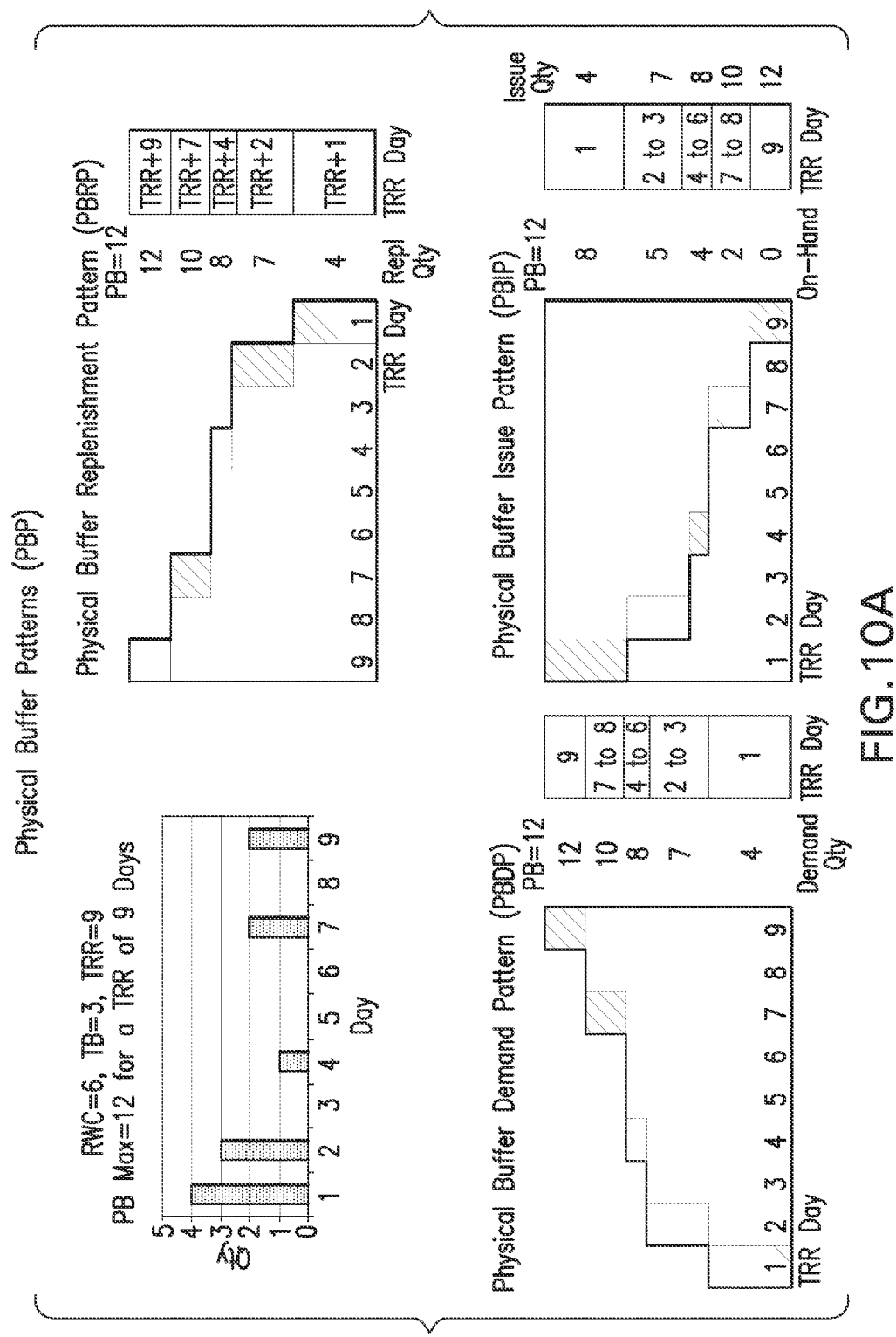
FIGS. 10A and 10B are exemplary graphs illustrating the method step of, for each item managed, establishing the Maximum expected Reporting Interval (RIM) Demand ($RID_{RIMax}$) for each Reporting Interval (RI) of the Time-To-Reliably-Replenish (TRR); and establishing a graphical display of the Physical Buffer Patterns (PBP) based on accumulating the Maximum Reporting Interval (RIM) Demand ($RID_{RIMax}$) for each Reporting Interval (RI) throughout the TRR as viewed from the perspectives of Demand (PBDP), Issue (PBIP) and Replenish (PBRP); and establishing a numerical representation of the Maximum Reporting Interval (RIM) Demand ($RID_{RIMax}$) build up throughout the Time-To-Reliably-Replenish (TRR)
Figure 10B:
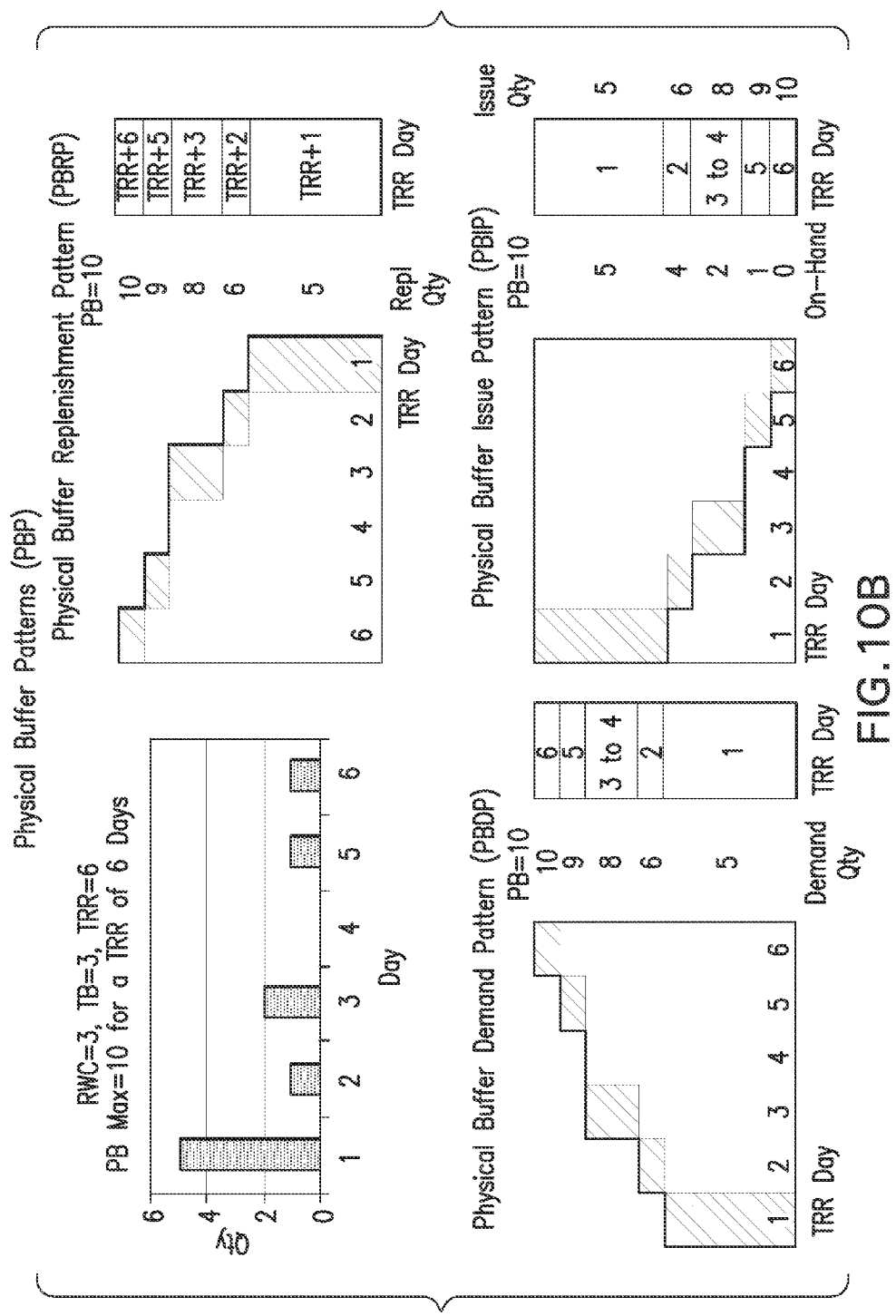
Figure 18J:
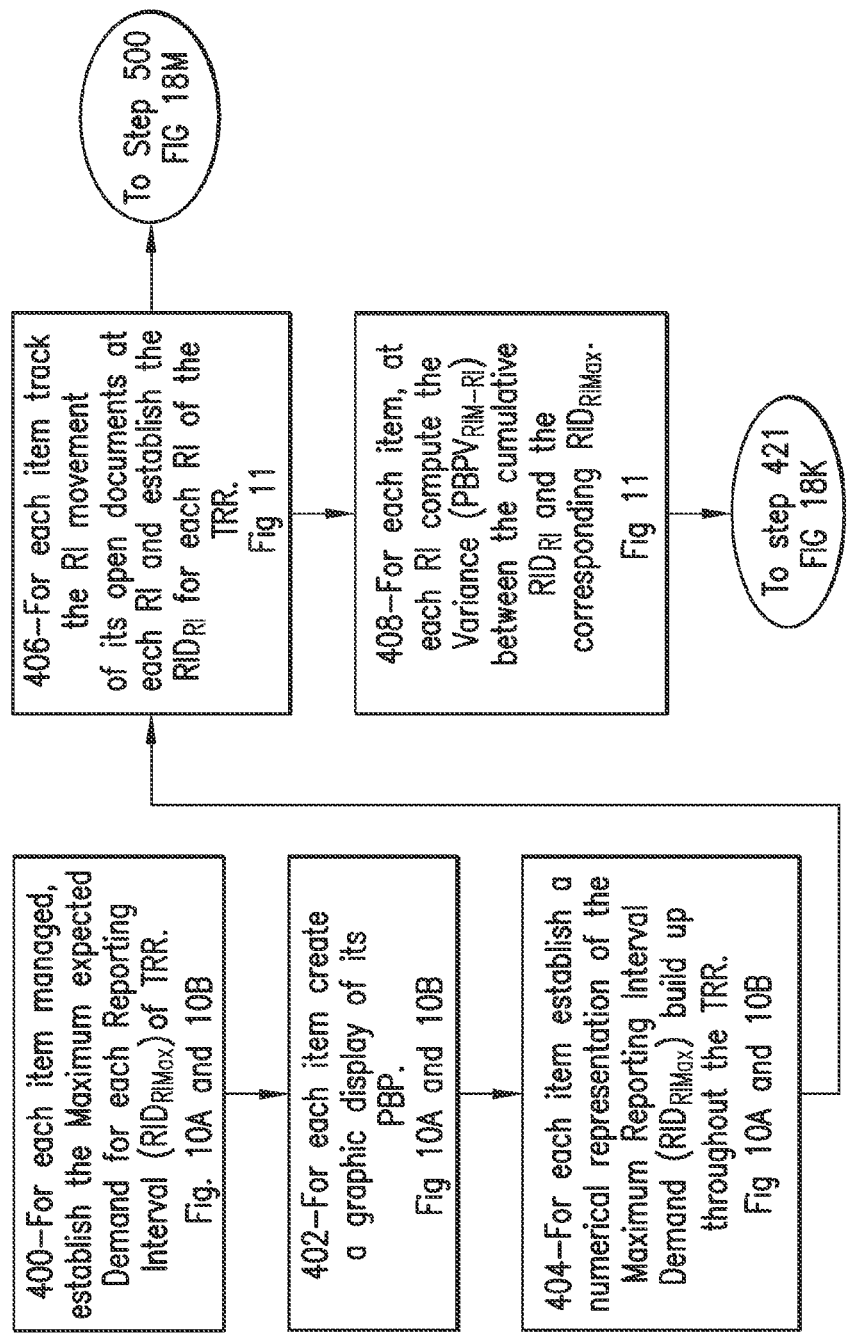

The method of the present invention also provides establishment, analysis and adjustment of an item's Physical Buffer Pattern (PBP). Such adjustments are made to the PBP in order maintain its effectiveness in identifying changes in an item's demand pattern as the item flows through the predefined process flow during a Time-To-Reliably Replenish (TRR). In order to accomplish these functions, steps 400-420, are implemented. These steps may be executed concurrently with the method steps described in the foregoing description. Referring to FIGS. 10A, 10B and 18J, step 400 establishes, for each item managed, a Maximum expected Demand for each Reporting Interval (RID$_{RIMax}$) of Time-To-Reliably Replenish (TRR). The aforesaid, commonly owned U.S. Patent Application Publication No. 20060235734 provides a technique by which a maximum demand for a Reporting Interval (RI) can be determined. However, other suitable methods may be used to establish the Maximum Demand for each Reporting Interval (RID$_{RIMax}$). In FIGS. 10A and 10B, the maximum expected demand during the TRR is represented by "PB Max" which is the "Maximum Physical Buffer Size". In FIG. 10A, PB Max=12 for a TRR of nine (9) days. In FIG. 10B, PB Max=10 for a TRR of six (6) days. Step 402 graphically displays, on display device 20, the Physical Buffer Patterns (PBP) which are shown in FIGS. 10A and 10B. In FIGS. 10A and 10B, step 404 establishes, for each item, a numerical representation of the Maximum Reporting Interval Demand (RID$_{RIMax}$) build-up throughout the TRR.

Figure 11:
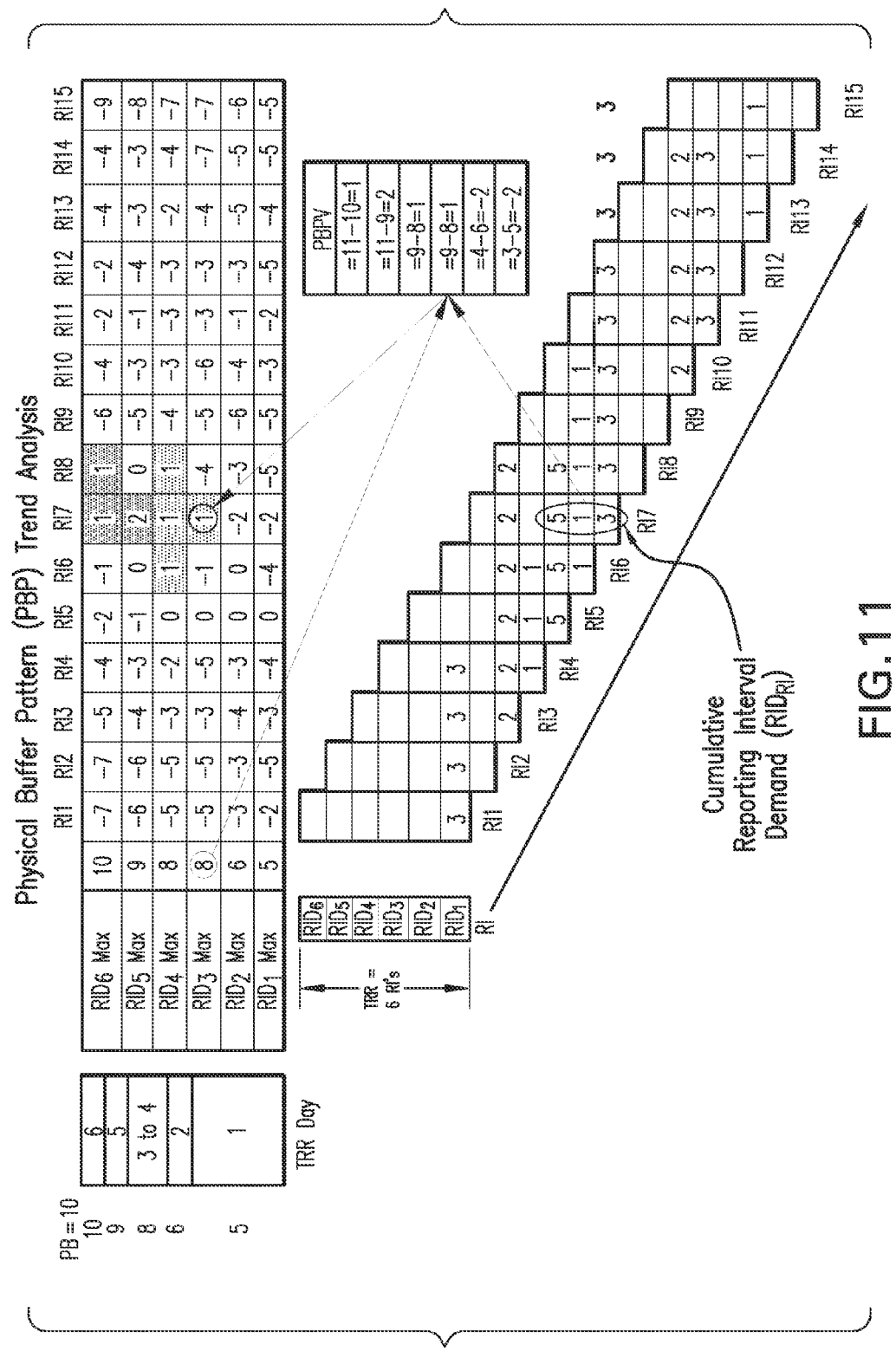
FIG. 11 is an exemplary graph illustrating the steps of, for each item, utilizing the numerical representation of the Maximum Reporting Interval (RIM) Demand ($RID_{RIMax}$) build up throughout the TRR, tracking the movement of the item's Open Documents at each Reporting Interval (RI), establishing the cumulative actual Reporting Interval Demand ($RID_{RIM-RI}$) for each Reporting Interval (RI) of the TRR, and, at each RI, computing the Physical Buffer Pattern Variance ($PBPV_{RIM-RI}$) between the cumulative actual Reporting Interval Demand ($RID_{RIM-RI}$) and the cumulative Maximum Reporting Interval (RIM) Demand ($RID_{RIMax}$)

FIG. 11 illustrates the implementation of steps 406 and 408 described in FIG. 18J. Step 406 tracks, for each item, the movement of its Open Documents at each Reporting Interval (RI) and establishes the actual Reporting Interval Demand (RID$_{RI}$) for each Reporting Interval (RI) of the TRR. The data and information generated at step 406 is provided to steps 408 and 500 simultaneously. Step 500 starts a subset of method steps that relate to a Physical Buffer Factor (PBF) and is described in the ensuing description. Step 408 computes the Variance (PBPV$_{RIM-RI}$) between the cumulative RID$_{RI}$ and the corresponding RID$_{RIMax}$ for each item, at each Reporting Interval (RI), using the following formula:

$$PBPV_{RIM-RI}=((\Sigma_1^{RIM}RID_i)_{RIM-RI}-(RID_{RIMax}))$$

wherein:
"RID" is the Reporting Interval Demand;
"RIM" is the Reporting Interval for each RID$_{RIMax}$ for which the PBPV$_{RIM-RI}$ is being calculated;
"RID$_{RIMax}$" is the Maximum Reporting Interval Demand—at each RIM throughout the TRR;
"PBPV$_{RIM-RI}$" is the variance between the cumulative RID$_{RI}$ and the corresponding RID$_{RIMax}$; and
"i" is the index used to compute the cumulative RID$_{RIM-RI}$ at each Reporting Interval (RI) by summing the individual RID's from to RID$_{i=1}$ to RID$_{i=RIM}$.

Figure 12:
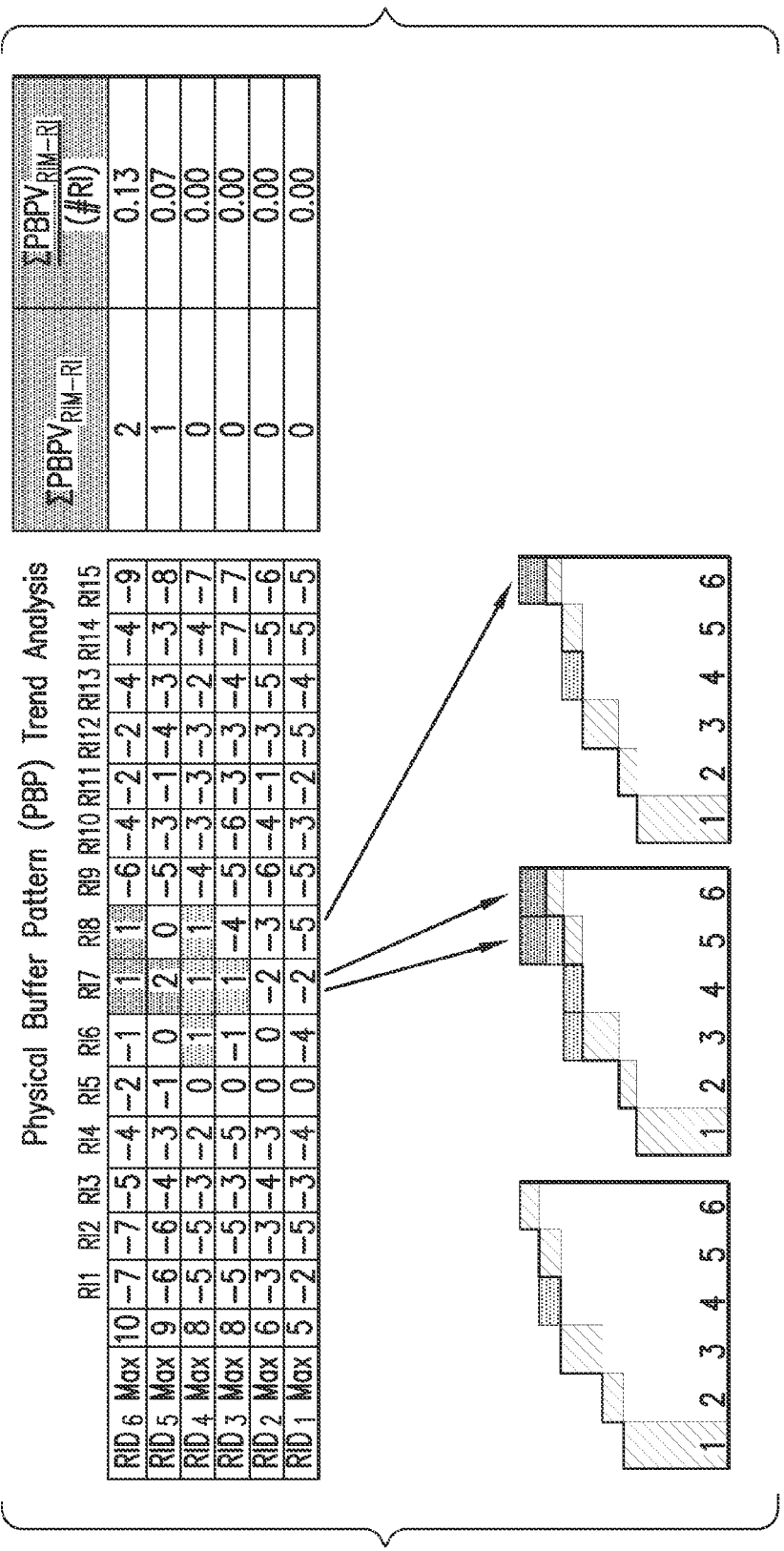
FIG. 12 is an exemplary graph illustrating the method steps of, for each item, recording the difference between the cumulative $RID_{RIM-RI}$ and the corresponding $RID_{RIMax}$, identifying each occurrence wherein the cumulative $RID_{RIM-RI}$ is greater than the corresponding $RID_{RIMax}$, maintaining an ongoing $PBPV_{RIM-RI}$ record for all documents processed, and analyzing the $PBPV_{RIM-RI}$ records to rank the $PBPV_{RIM-RI}$ according to the positive variance occurring in conjunction with ($RID_{RIMax}$+$PBPV_{RIM-RI}$) being greater than the Physical Buffer (PB), for increasing the size of the Physical Buffer Patterns (PB)
Figure 18K:
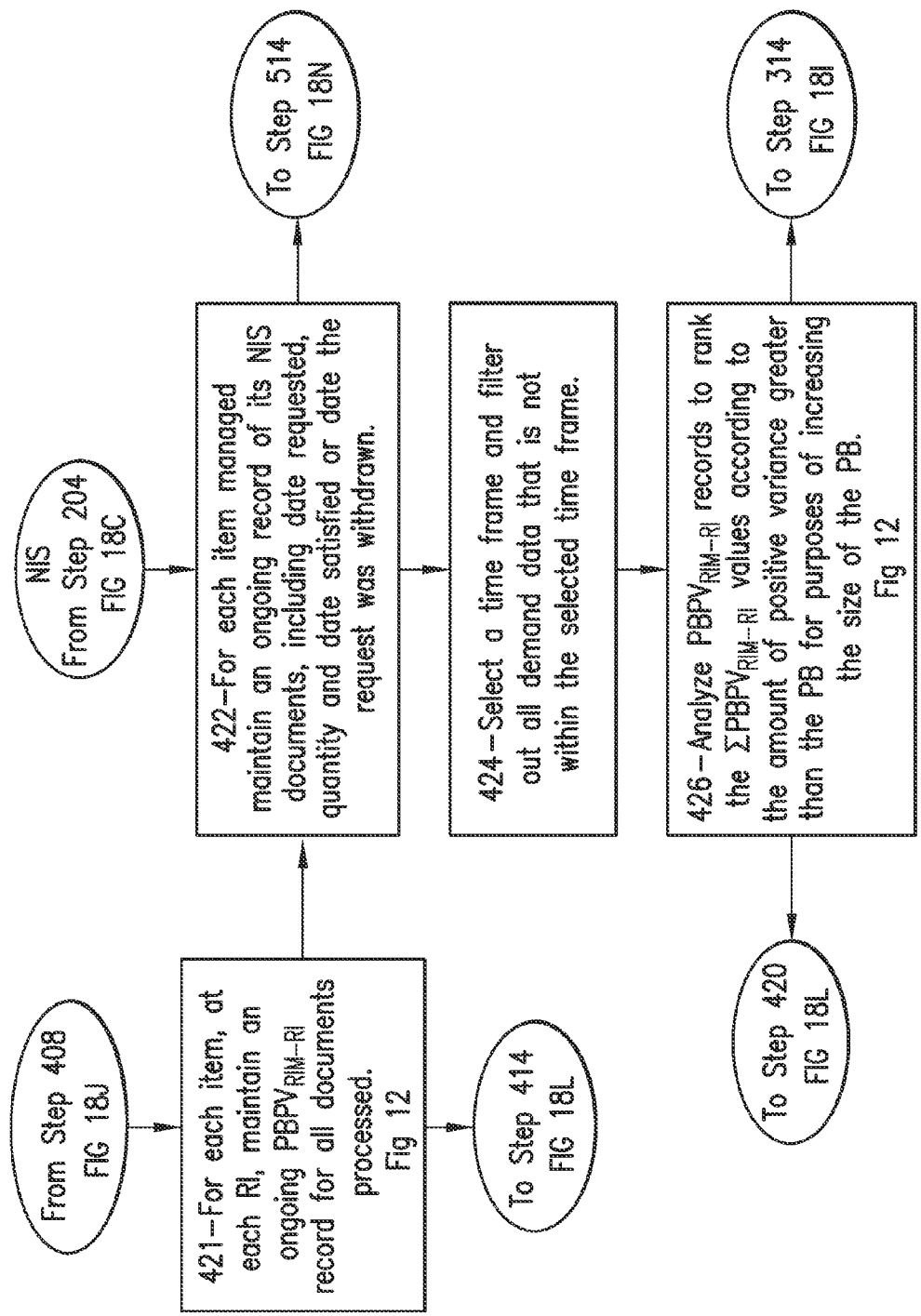
Figure 18L:
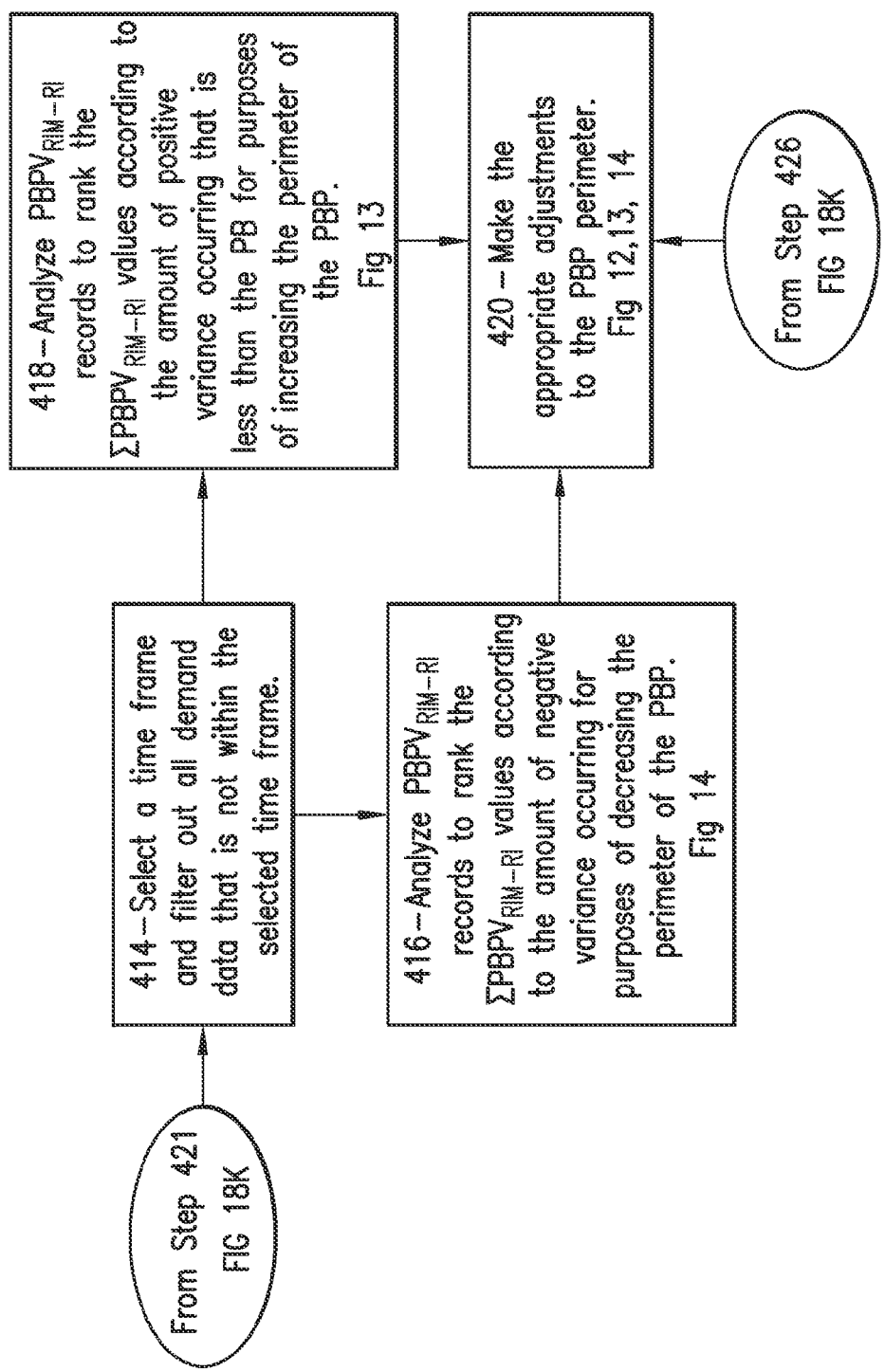

Referring to FIGS. 12 and 18K, step 421 maintains, for each item and at each Reporting Interval (RI), an ongoing PBPV$_{RIM-RI}$ record for all documents processed. The data and information generated at step 421 is provided to steps 422 and 414 simultaneously. Step 414 starts a subset of method steps that relate to adjusting the Physical Buffer Patterns (PBP) and is described in the ensuing description.

Step 422 maintains, for each item managed, an ongoing record of its NIS (Not-In-Stock) documents, including date requested, quantity and date satisfied, is or date the request was withdrawn. This step also receives data and information generated by step 204 which was discussed in the foregoing description.

After step 422, the method shifts to steps 424 and 514 simultaneously. Step 424 selects a time frame and filters out all demand data that is not within the selected time frame. In step 426, the $PBPV_{RIM-RI}$ records are analyzed to rank the $\Sigma PBPV_{RIM-RI}$ values according to the amount of positive variance occurring greater than the PB, in both magnitude and frequency of occurrence, for increasing the size of the PB in accordance with Not-In-Stock situations. The implementation of step 426 is illustrated in FIG. 12. After step 426, step 314 resizes the Physical Buffer (PB). In one embodiment, the method described in the aforesaid US Patent Application Publication No. 20060235734, entitled "Method and System for Determining Buffer Inventory Size", is used to resize the Physical Buffer (PB). The results, provided by step 314, are a desired focus of global improvements.

As described in the foregoing description, after step 421, the process shifts to steps 414 and 422 simultaneously. Step 422 and the steps subsequent thereto were described in the foregoing description. The ensuing description pertains to FIG. 18L and step 414 and the steps subsequent thereto. Step 414 selects a time frame and filters out all demand data that is not within the selected time frame. After step 414, steps 416 and 418 are executed simultaneously.

Figure 13:
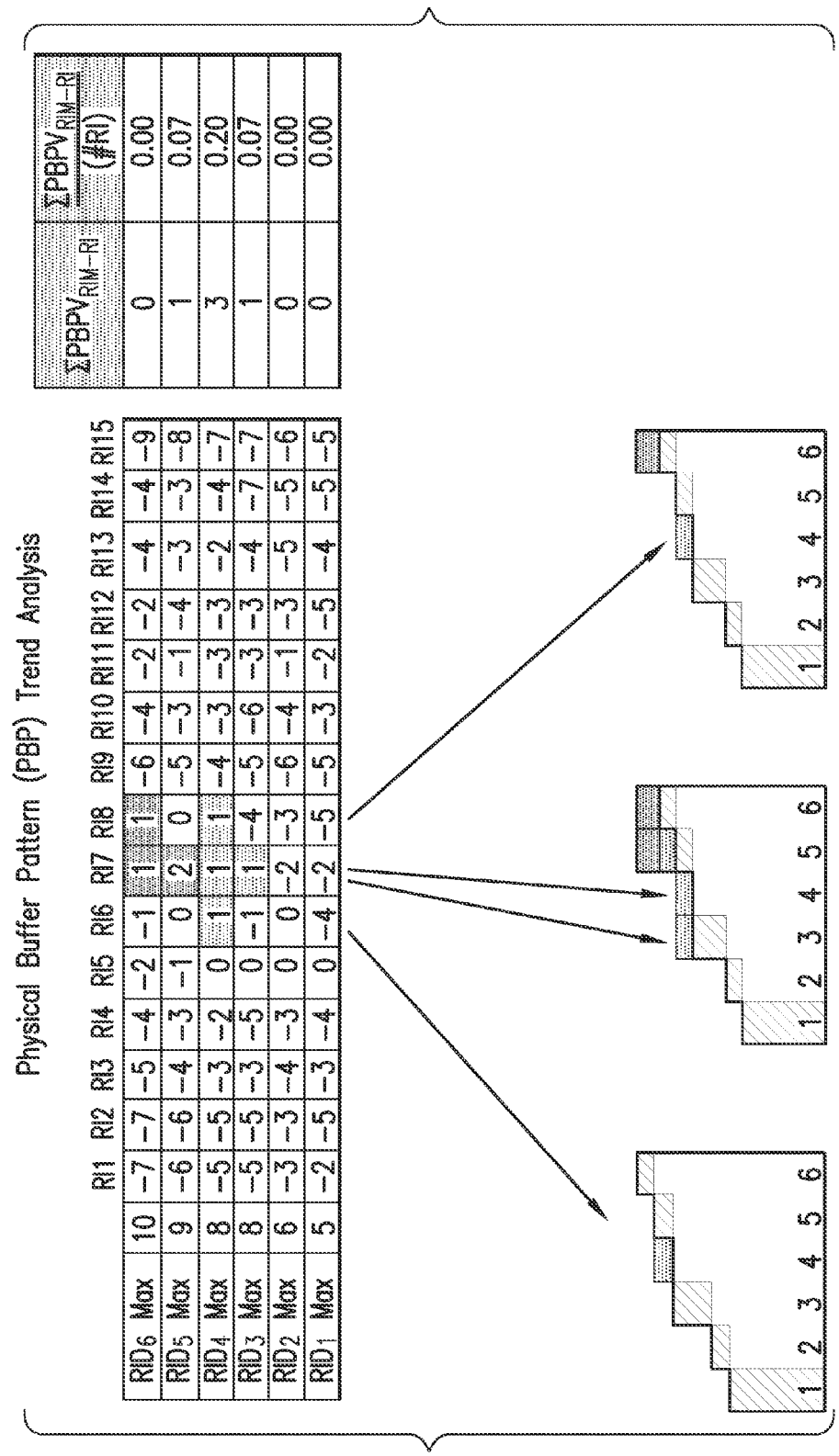
FIG. 13 is an exemplary graph illustrating the method steps of, for each item, recording the difference between the cumulative $RID_{RIM-RI}$ and the corresponding $RID_{RIMax}$, identifying each occurrence wherein the cumulative $RID_{RIM-RI}$ is greater than the corresponding $RID_{RIMax}$, maintaining an ongoing $PBPV_{RIM-RI}$ record for all documents processed, and analyzing the $PBPV_{RIM-RI}$ records to rank the $PBPV_{RIM-RI}$ values according to the positive variance occurring in conjunction with ($RID_{RIMax}$+$PBPV_{RIM-RI}$) being less than the Physical Buffer (PB), for increasing the perimeter of the Physical Buffer Patterns (PBP) and in particular the Physical Buffer Demand Pattern (PBDP)
Figure 14:
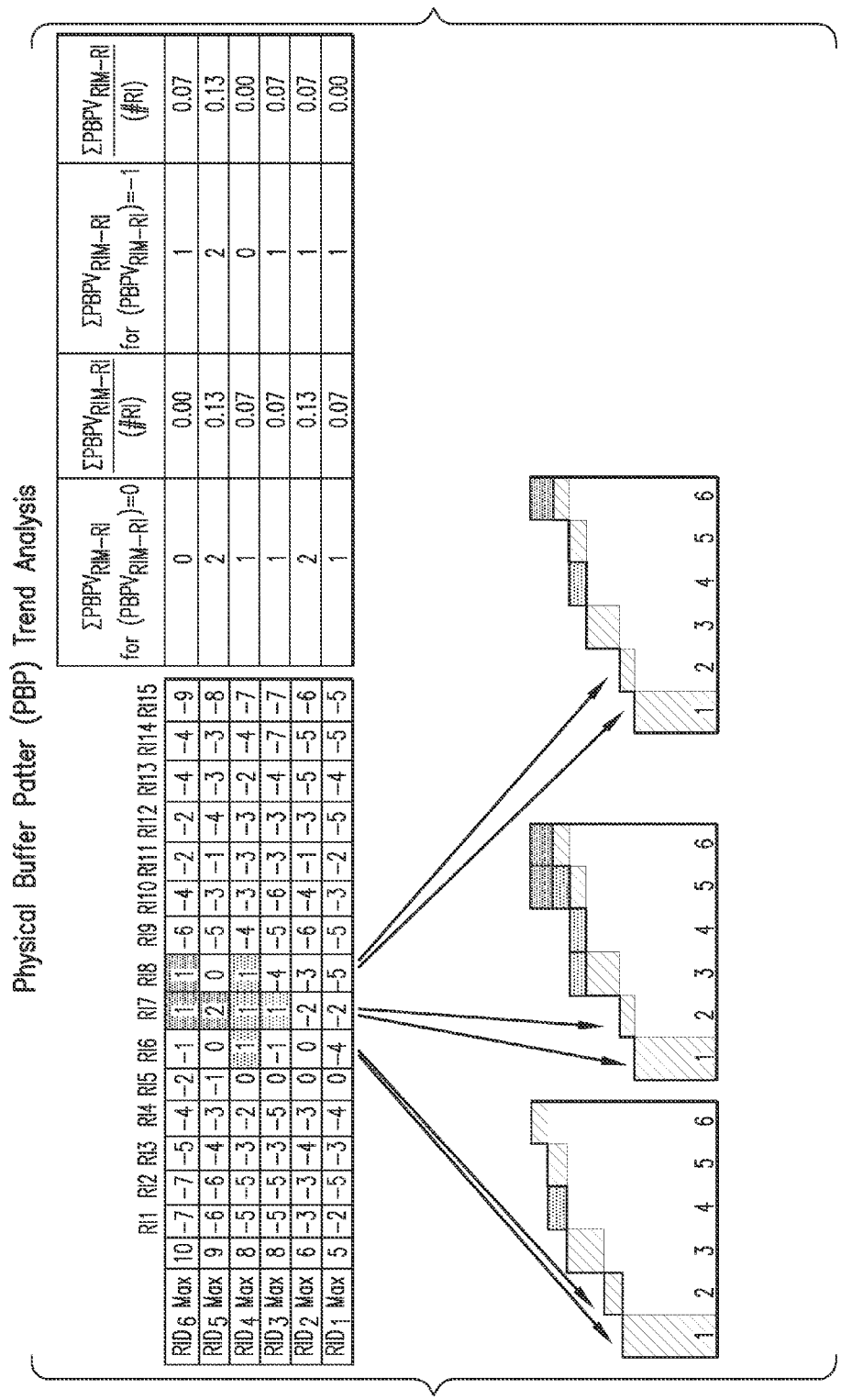
FIG. 14 is an exemplary graph illustrating the method steps of, for each item, recording the difference between the cumulative $RID_{RIM-RI}$ and the corresponding $RID_{RIMax}$, identifying each occurrence wherein the cumulative $RID_{RIM-RI}$ is less than the corresponding $RID_{RIMax}$, maintaining an ongoing $PBPV_{RIM-RI}$ record for all documents processed, and analyzing the $PBPV_{RIM-RI}$ records to rank the $PBPV_{RIM-RI}$ values according to the negative variance occurring, for decreasing the perimeter of the Physical Buffer Patterns (PBP) and in particular the Physical Buffer Demand Pattern (PBDP)

In step 416, the $PBPV_{RIM-RI}$ records are analyzed to rank the $PBPV_{RIM-RI}$ values according to the amount of negative variance occurring, both in magnitude and frequency of occurrence, for decreasing the perimeter of the Physical Buffer Pattern (PBP). In step 418, the $PBPV_{RIM-RI}$ records are analyzed to rank the $PBPV_{RIM-RI}$ according to the amount of positive variance occurring less than the PB, in both magnitude and frequency of occurrence, for increasing the perimeter of the PBP. The implementation of step 416 is illustrated in FIG. 14 and step 418 is illustrated in FIG. 13. After steps 426, 416 and 418, step 420 makes the appropriate adjustments to the PBP perimeter.

Figure 15:
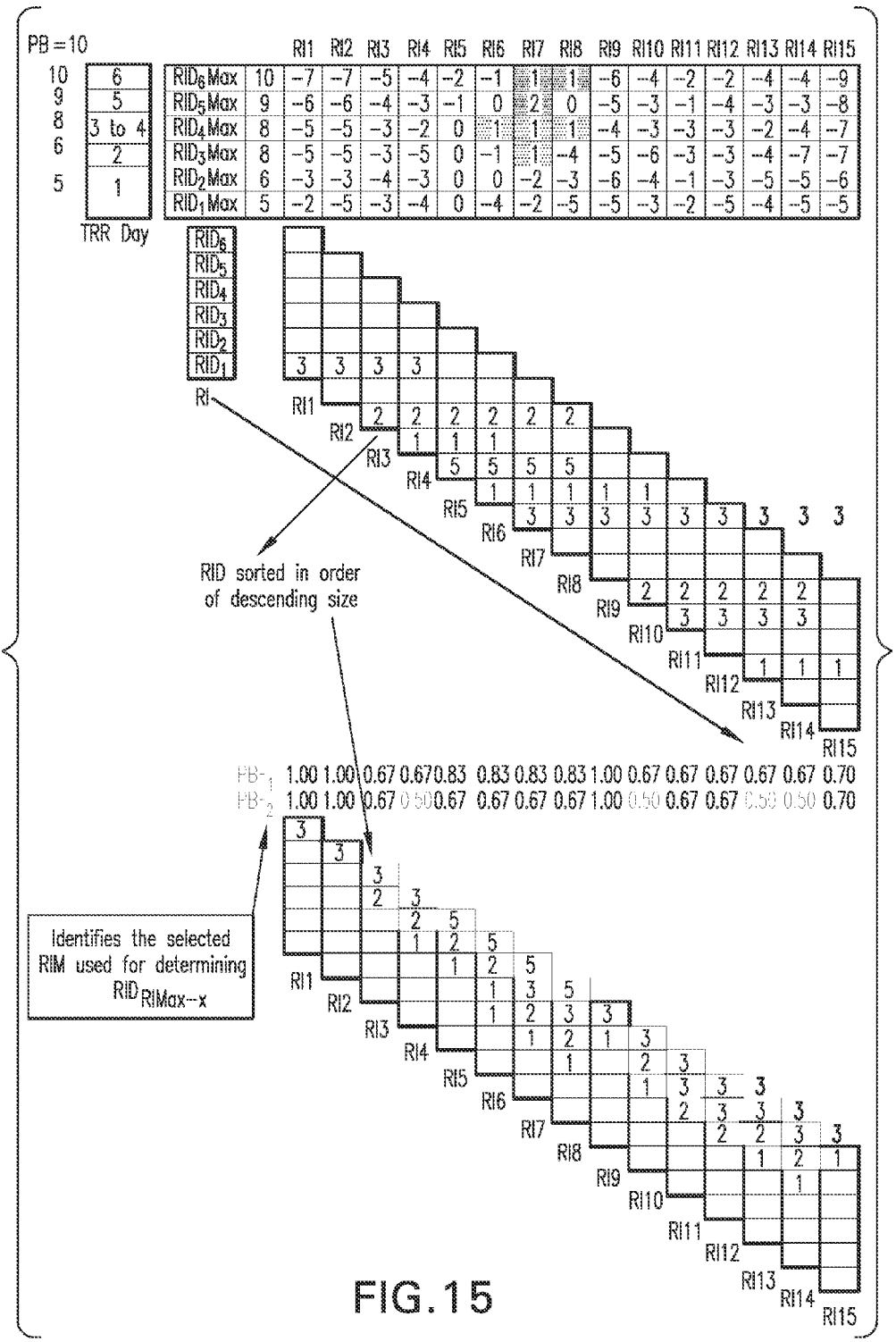
FIG. 15 is an exemplary graph illustrating the method steps related to the analysis and computation of the Physical Buffer Factor (PBF) based on the ratio of the number of Reporting Interval Demands (RID) required to produce a total demand quantity that is greater than or equal to the selected $RID_{RIMax-x}$, which is used to create an adjustment in the BRP of an item's Open Documents when the computed PBF decreases below a user defined level.
Figure 18M:
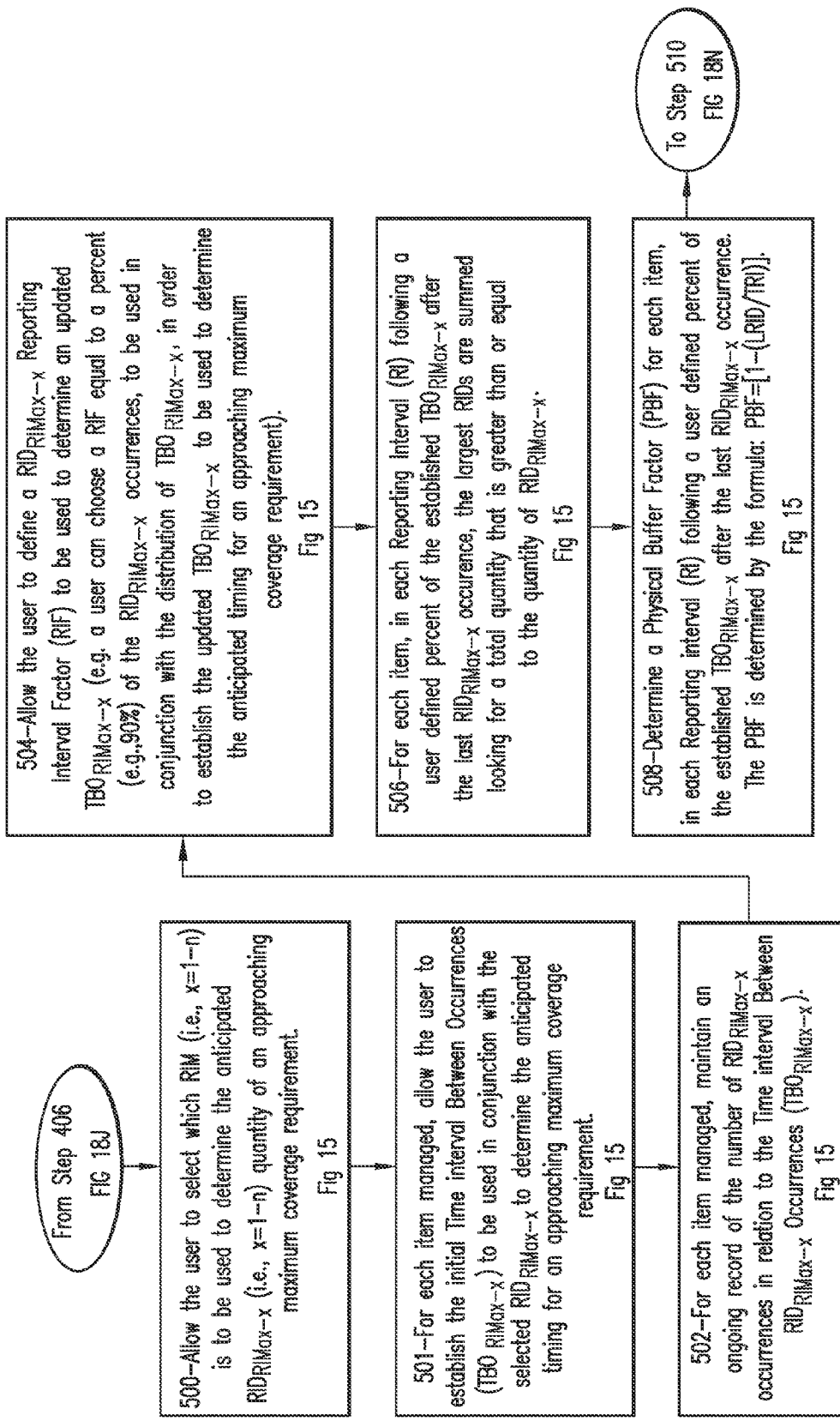
Figure 18N:
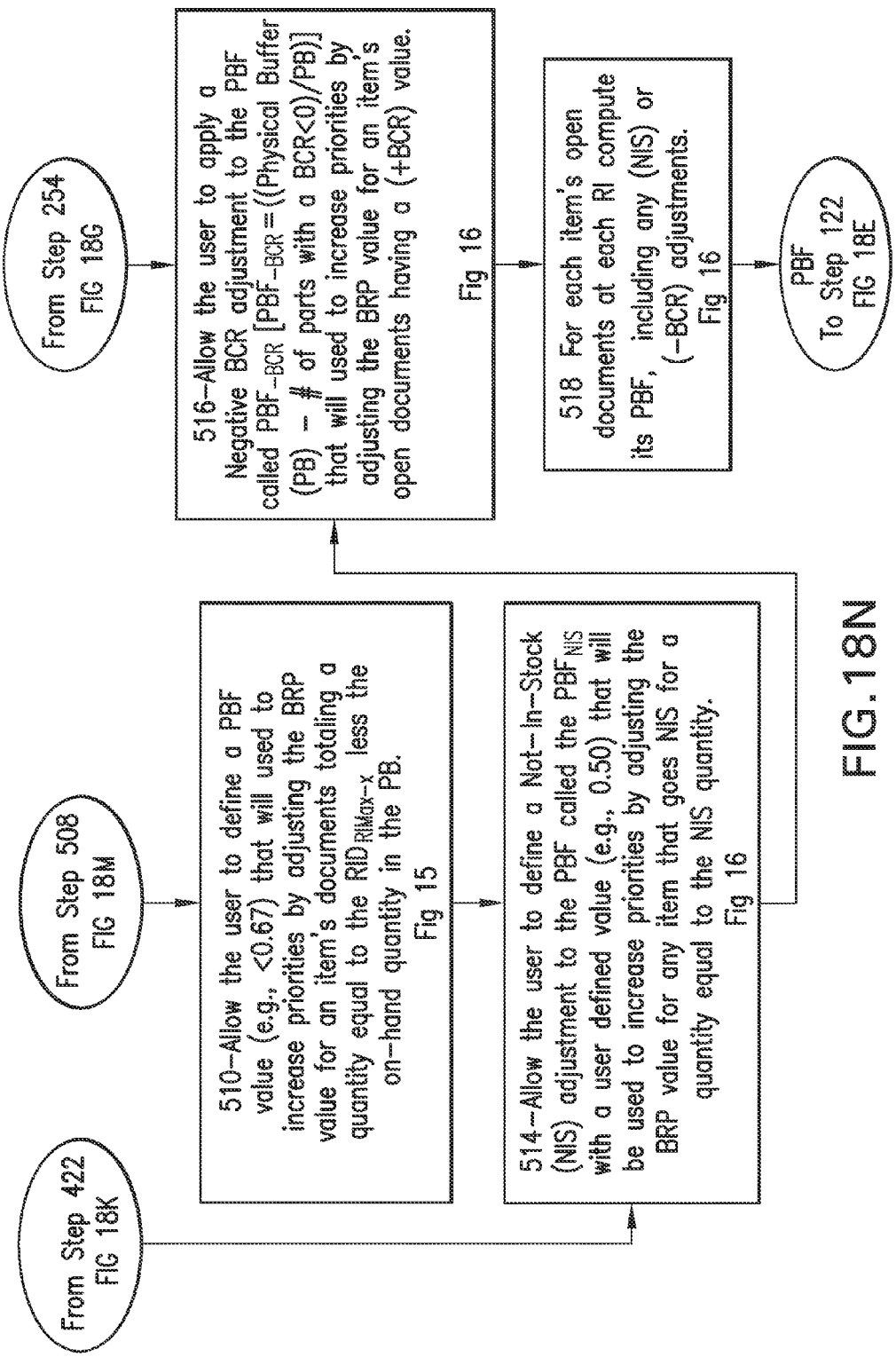

As described in the foregoing description, after step 406, the process shifts to steps 408 and 500 simultaneously. Step 408 and the steps subsequent thereto were described in the foregoing description. The ensuing description pertains to step 500 and the steps subsequent thereto. Step 500 is the first step in a series of steps that result in the computation of a Physical Buffer Factor (PBF). Steps 500-510 are shown in FIGS. 18M and 18N, and a graphical example of the implementation of steps 500-510 is shown in FIG. 15.

In step 500, the user is allowed to select which RIM (i.e. x=1-n) is to be used to determine the anticipated $RID_{RIMax-x}$ (i.e. x=1-n) quantity for an approaching maximum coverage requirement.

In step 501, for each item managed, the user is allowed to establish the initial Time interval Between Occurrences ($TBO_{RIMax-x}$) to be used in conjunction to with the selected $RID_{RIMax-x}$ to determine the anticipated timing for an approaching maximum coverage requirement. During implementation of the method described in the aforesaid, commonly owned U.S. Patent Application Publication No. 20060235734, particular data can be extracted for use in establishing the initial Time interval Between $RID_{RIMax-x}$ Occurrences ($TBO_{RIMax-x}$). However, other suitable techniques or methods may be used to establish the initial Time interval Between $RID_{RIMax-x}$ Occurrences ($TBO_{RIMax-x}$).

Step 502 maintains, for each item managed, an ongoing record of the number of $RID_{RIMax-x}$ occurrences in relation to the Time interval Between $RID_{RIMax-x}$ Occurrences ($TBO_{RIMax-x}$). In step 504, the user is allowed to define a $RID_{RIMax-x}$ Reporting Interval Factor (RIF) to be used to determine an updated $TBO_{RIMax-x}$. For example, the user can choose a RIF equal to a percent (e.g., 90%) of the $RID_{RIMax-x}$ occurrences, to be used in conjunction with the distribution of $TBO_{RIMax-x}$, in order to establish the updated $TBO_{RIMax-x}$ to be used to determine the anticipated timing for an approaching maximum coverage requirement.

In step 506, for each item, in each Reporting Interval (RI) following a user defined percent of the established $TBO_{RIMax-x}$ after the last $RID_{RIMax-x}$ occurrence, the largest RIDs are summed looking for a total quantity that is greater than or equal to the quantity of $RID_{RIMax-x}$.

Step 508 determines a Physical Buffer Factor (PBF) for each item, in each Reporting Interval (RI) following a user defined percent of the established $TBO_{RIMax-x}$ after the last $RID_{RIMax-x}$ occurrence. The PBF is determined by the following formula:

$$PBF=[1-(LRID/TRI)]$$

wherein:
"PBF" is the Physical Buffer Factor;
"LRID" is the number of largest RIDs required to arrive at a quantity greater than or equal to $RID_{RIMax-x}$; and
"TRI" is the total number of RIs in the TRR.

The next step, step 510, allows the user to define a PBF threshold value (e.g. <0.67) that will be used to trigger increases in priorities by adjusting the BRP value for an item's Open Documents totaling a quantity equal to the $RID_{RIMax-x}$ less the on-hand quantity in the Physical Buffer (PB).

Figure 16:
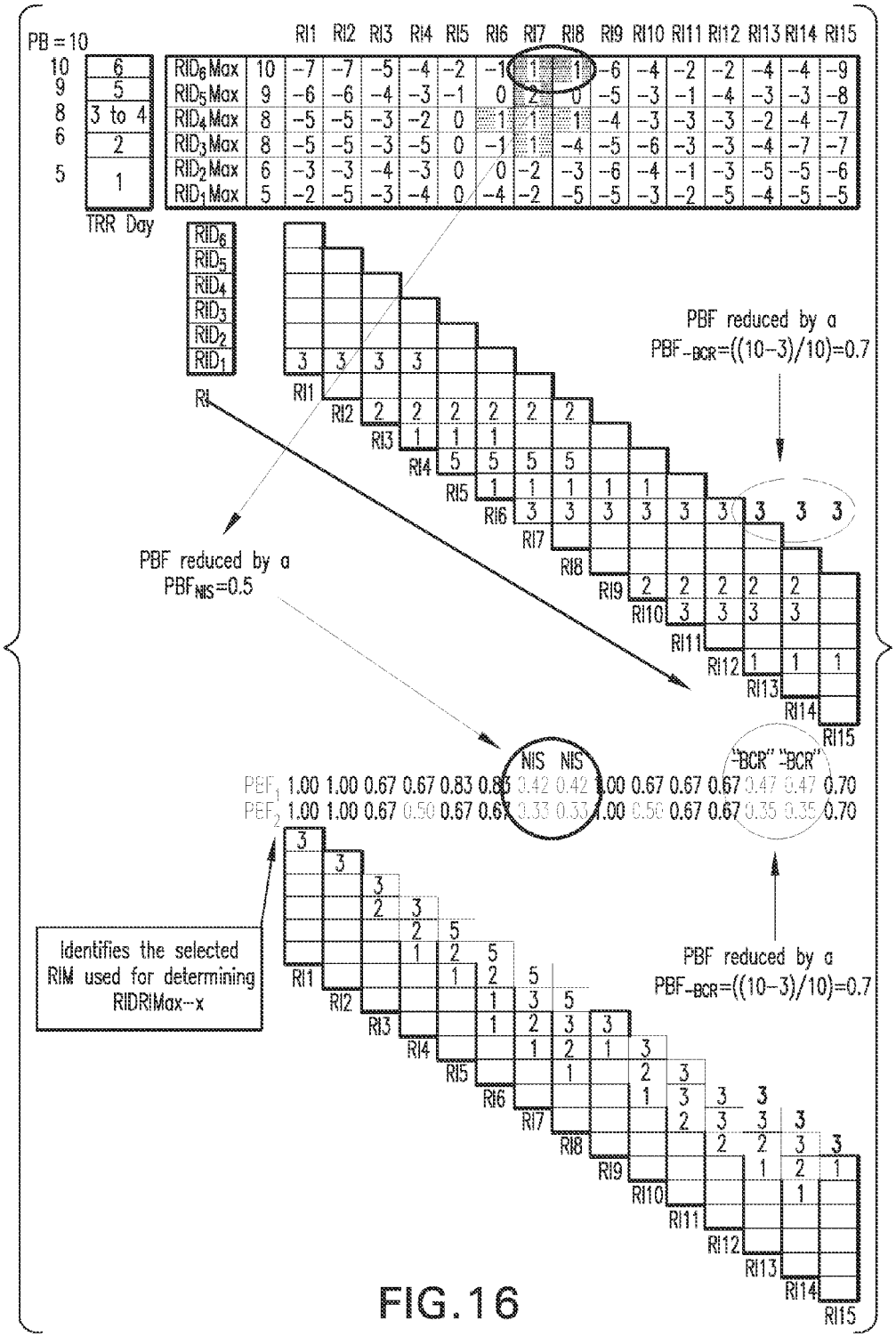
FIG. 16 is an exemplary graph illustrating the method steps related to the analysis and computation of additional modifications to the Physical Buffer Factor (PBF) based on a user defined Not-In-Stock Physical Buffer Factor ($PBF_{NIS}$), and a negative BCR value ($PBF_{-BCR}$) computed based on the quantity of a given item's Open Documents that are experiencing excessive delays while in work.

In step 514, the user is allowed to define a Not-In-Stock (NIS) adjustment to the PBF, referred to as $PBF_{NIS}$, with a user defined value (e.g. 0.50) that will be used to increase priorities by adjusting the BRP value for any item that becomes NIS for a quantity equal to the NIS quantity. FIG. 16 illustrates the implementation of step 514.

After step 514, step 516 is implemented. As described in the foregoing description, after the implementation of steps 254, the method shifts simultaneously to step 516. In step 516, the user is allowed to apply a Negative Buffer Consumption Ratio (BCR) adjustment to the PBF, referred to as $PBF_{-BCR}$, that will be used to increase priorities by adjusting the BRP value for an item's Open Documents having a positive BCR. The $PBF_{-BCR}$ value is found by the following formula:

$$PBF_{-BCR}=(((PB)-(QBCR<0))/PB)$$

wherein:
"$PBF_{-BCR}$" is the negative BCR adjustment to the PBF;
"QBCR" is the number of parts with a BCR<0; and
"PB" is the current Physical Buffer size.
FIG. 16 illustrates the implementation of step 516.

Step 518 computes, for each item's Open Documents and at each Reporting Interval (RI), the PBF, including any (NIS) or (-BCR) adjustments.

FIG. 16 also illustrates the implementation of this step.

After step 518, the computed PBF is made available to step 122 which was described in the foregoing description and shown in FIG. 18E.

While the present invention has been described in the context of a fully functioning data processing system and method, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disc drive, RAM, and CD-ROMs as well as transmission-type media such as digital and analog communication links.

The principles, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations and changes may be made by those skilled in the art without departing from the spirit of the invention. In any case, because the scope of the invention is much broader than any particular embodiment, the foregoing detailed description should not be construed as a limitation of the present invention, which is limited only by the claims appended hereto.

What is claimed is:

1. A method for determining the relative priority of in-process work and focusing process improvements, comprising the steps of:
   providing a computer system comprising a processor, a memory device, an input for receiving data from a data source, and a user interface;
   utilizing the user interface to select a particular item that is in a predefined process flow;
   identifying all process steps in the predefined process flow through which a selected item passes;
   identifying each Reporting Point (RP) in each selected item's predefined process flow;
   identifying an amount of Allocated Time Buffer (ATB) assigned to each Reporting Point (RP) to account for variability in the time required to complete a Required Work Content (RWC) through each Reporting Point (RP);
   utilizing the processor to determine the Required Work Content (RWC) to completely perform all process steps in the overall process;
   utilizing the processor to determine a total amount of time $T_{TOTAL}$ required to complete all process steps;
   utilizing the processor to determine a total planned Time Buffer (TB) for the movement of the selected item through each Reporting Point (RP) along the predefined process flow and storing said determined total planned Time Buffer (TB) in said memory device;
   utilizing the total amount of $T_{TOTAL}$ in conjunction with the total Time Buffer (TB) to determine a Time-To-Reliably-Replenish for completing the Required Work Content (RWC);
   utilizing transaction data that relates to the particular item and its movement through the predefined process flow;
   utilizing the processor to extract from the transaction data particular transaction data that was captured at a regular Reporting Intervals (RI) and Reporting Points (RP);
   providing data that represents a planned movement of the selected item along the predefined process flow and storing said provided data in said memory device;
   utilizing the processor to process the extracted transaction data to determine the selected item's actual movement along the predefined process flow and comparing the actual movement of the selected item to the planned movement of the selected item through the predefined process flow;
   utilizing the processor to determine a variance between the actual movement of the selected item and the planned movement of the selected item;
   utilizing the processor to process the determined variance to compute an actual amount of downstream Time Buffer Remaining (TBR) in relation to the total planned Time Buffer (TB);
   utilizing the processor to compute a Planned Time Buffer Remaining (TBRP) at each Reporting Point (RP);
   utilizing the processor to compare the actual amount of downstream Time Buffer Remaining (TBR) to the Planned amount of downstream Time Buffer Remaining (TBRP) at each Reporting Point (RP) and computing a ratio TBR/TBRP wherein said ratio yields a Buffer Recovery Percent (BRP) for the selected item; and
   utilizing the processor to determine a Buffer Recovery Percent (BRP) for every item as it moves in a predefined process flow from one Reporting Point (RP) to another Reporting Point (RP) and setting relative priorities to all the items wherein the item with the lowest Buffer Recovery Percent (BRP) has the highest priority.

2. The method according to claim 1 further comprising the step of utilizing the processor to compute a time Buffer Consumption Ratio (BCR) based on the actual amount of downstream Time Buffer Remaining (TBR) and the total planned Time Buffer (TB).

3. The method according to claim 1 further comprising the step of utilizing the processor to compute an Estimated time Buffer Consumption Ratio (BCRE) based on an estimated amount of downstream Allocated Time Buffer Remaining (ATBR) at each Reporting Interval (RI) between Reporting Points (RP) and the Allocated Time Buffer (ATB).

4. The method according to claim 1 further comprising the step of utilizing the processor to compute a Planned Buffer Consumption Ratio (BCRP) based on the Planned amount of downstream Time Buffer Remaining (TBRP) in relation to the total planned Time Buffer (TB).

5. The method according to claim 1 wherein the step of utilizing the transaction data for the selected item comprises the steps of:
   monitoring the selected item as it moves along the predefined process flow;
   utilizing transaction data that represents the selected item's movement along the predefined process flow; and
   storing the transaction data in the memory device.

6. The method according to claim 5 wherein the computer system further comprises a display device.

7. The method according to claim 5 further comprising the step of displaying on the display device the determined variance between the actual movement of the selected item and the planned movement of the selected item.

8. The method according to claim 5 further comprising the step of displaying on the display device the total planned Time Buffer (TB) and the actual amount of downstream Time Buffer Remaining (TBR).

9. The method according to claim 5 further comprising the step of displaying on the display device the ratio TBR/TBRP as the Buffer Recovery Percent (BRP).

10. The method according to claim 1 further comprising the steps of, for each selected item:
   utilizing the user interface to retrieve a document start time for each selected item that enters the process flow;
   utilizing the processor to compute, for each selected item's Open Documents, the duration of time $T_D$ within which it is scheduled to be completed, a duration of time $T_D$ being equal to the item's start time plus the Time-to-Reliably Replenish (TRR) associated with the selected item;
   retrieving, for each selected item's Open Documents, a time it was completed at each Reporting Point (RP); and
   utilizing the processor to determine, for each selected item's Open Documents, a Time Buffer Remaining (TBR) at each Reporting Point (RP).

11. The method according to claim 10 wherein the step of utilizing the processor to determine the Time Buffer Remaining (TBR) at each Reporting Point (RP) comprises the steps of:

establishing for each process step and Reporting Point (RP) a Daily Work Calendar (DWC) which is used for assigning Required Work Content (RWC) and Allocated Time Buffer (ATB);

utilizing the processor to sum up the Required Work Content (RWC) for all process steps leading into and including the Reporting Point (RP);

establishing a planned start date-time and planned finish date-time for each Reporting Point (RP) in accordance with each item's open documents scheduled start time, and each Reporting Point's (RP) Daily Work Calendar (DWC), summed up Required Work Content (RWC) and summed up Allocated Time Buffer (ATB);

utilizing the processor to determine for each Reporting Point (RP) that is completed, if the Reporting Point (RP) completion date-time is before its planned start date-time, between its planned start date-time and planned finish date-time, after its planned finish date-time and before the document planned finish date-time, or after the document planned finish date-time;

utilizing the processor to compute the Time Buffer Remaining (TBR), for each RP that is completed before its planned start date-time, between its planned start date-time and planned finish date-time, after its planned finish date-time and before the document planned finish date-time, by summing from the RP's actual completion date-time the remaining unused planned time for RWC, ATB and STB; and utilizing the processor to compute a negative Time Buffer Remaining (TBR), for each RP that is completed after the document planned finish date-time, by summing the number of available Daily Work Calendar (DWC) days from the document's planned completion date-time to the RP's actual completion date-time and any remaining RWC for those RPs not yet completed.

12. The method according to claim 11 further comprising the step of utilizing the processor to compute the Allocated Time Buffer Remaining (ATBR) at each Reporting Interval (RI) between two Reporting Points (RP), said step of computing said Allocated Time Buffer Remaining (ATBR) comprising the steps of:

utilizing the processor to sum the Allocated Time Buffer (ATB) of the succeeding Reporting Point (RP) with the difference between the Time Buffer Remaining (TBR) and the Planned Time Buffer Remaining (TBRP) of the preceding Reporting Point (RP); and utilizing the processor to subtract, for each Reporting Interval (RI), an estimated amount of time buffer consumption in proportion to the ratio of Allocated Time Buffer (ATB) of the succeeding Reporting Point (RP) to the sum of Required Work Content (RWC) and the Allocated Time Buffer (ATB) of the succeeding Reporting Point (RP) and the number of Reporting Intervals (RI) required to equal that summation of Required Work Content (RWC) and Allocated Time Buffer (ATB) of the succeeding Reporting Point (RP).

13. The method according to claim 11 further comprising the step of utilizing the processor to process the Time Buffer Remaining (TBR) and the Time Buffer (TB) to provide a Buffer Consumption Ratio (BCR).

14. The method according to claim 12 further comprising the step of utilizing the processor to process the Allocated Time Buffer Remaining (ATBR) of the preceding Reporting Point (RP) and the Allocated Time Buffer (ATB) of the succeeding Reporting Point (RP) to provide an Estimated Buffer Consumption Ratio (BCRE).

15. The method according to claim 13 wherein the step of utilizing the processor to process the Time Buffer Remaining (TBR) and the Time Buffer (TB) to provide a Buffer Consumption Ratio (BCR) comprises the step of implementing in a processing resource a mathematical operation BCR =TBR/TB.

16. The method according to claim 14 wherein the step of utilizing the processor to process the Allocated Time Buffer Remaining (ATBR) of the preceding Reporting Point (RP) and the Allocated Time Buffer (ATB) of the succeeding Reporting Point (RP) to provide an Estimated Buffer Consumption Ratio (BCRE) comprises the step of implementing in the processor a mathematical operation BCRE=ATBR/ATB.

17. The method according to claim 10 further comprising the step of maintaining, for each selected item, an ongoing record of the Buffer Consumption Ratio (BCR) for each document processed at each Reporting Point (RP).

18. The method according to claim 1 further comprising the step of utilizing the processor to compute, for each selected item and at each Reporting Point (RP) associated with the selected item, a Planned Buffer Consumption Ratio (BCRP).

19. The method according to claim 18 wherein the step of utilizing the processor to compute the Planned Buffer Consumption Ratio (BCRP) comprises the step of implementing in the processor a mathematical operation BCRP=TBRP/TB.

20. The method according to claim 19 further comprising the step of utilizing the processor to compute, for each selected item's Open Documents and at each Reporting Point (RP) associated with that selected item, a difference between the Buffer Consumption Ratio (BCR) and the Planned Buffer Consumption Ratio (BCRP).

21. The method according to claim 20 wherein the step of utilizing the processor to compute the difference between the Buffer Consumption Ratio (BCR) and the Planned Buffer Consumption Ratio (BCRP) comprises the step of implementing in the processing resource a mathematical operation $$BCRD_{RPi} = BCR_{RPi} - BCRP_{RPi}$$

wherein:

"$BCR_{RPi}$" is the Buffer Consumption Ratio computed at each Reporting Point "i";

"$BCRP_{RPi}$" is the Planned Buffer Consumption Ratio computed at each Reporting Point "i"; and "$BCRD_{RPi}$" is the difference, at each Reporting Point "i" between the $BCR_{RPi}$ and $BCRP_{RPi}$.

22. The method according to claim 21 further comprising the steps of utilizing the processor to compute, for each selected item's Open Documents and at each Reporting Point (RP) associated with that selected item, a Buffer Consumption Ratio Variance (BCRV) relative to the previous Reporting Point in accordance with the formula $$BCRV_{RPi} = BCRD_{RPi} - BCRD_{RPi-1}$$

wherein:

"$BCRD_{RPi}$" is the difference, at each Reporting Point "i" between the $BCR_{RPi}$ and $BCRP_{RPi}$;

"$BCRD_{RPi-1}$" is the difference, at each previous Reporting Point "i-1" between the $BCR_{RPi-1}$ and $BCRP_{RPi-1}$; and "$BCRV_{RPi}$" is the Buffer Consumption Ratio Variance at each Reporting Point "i".

23. The method according claim 22 further comprising the step of maintaining, for each selected item and at each Reporting Point (RP) associated with the selected item, ongoing $BCRD_{RPi}$, and $BCRV_{RPi}$ records for all documents processed.

24. The method according to claim 23 further comprising the steps of:
   analyzing $BCRV_{RPi}$ records to rank the Reporting Points (RP) according to the amount of negative variance occurring for reallocation of the Time Buffer (TB) within the process flow and/or to focus improvement efforts; and
   analyzing $BCRV_{RPi}$ records to rank the Reporting Points (RP) according to the amount of positive variance occurring for reallocation and/or reduction of Time Buffer (TB) within the process flow.

25. The method according to claim 24 further comprising the steps of:
   maintaining, for each selected item, an ongoing record for the Buffer Consumption Ratio (BCR) for each document processed and finished ($BCR_{FINISH}$); and
   maintaining, for each completed document, an ongoing record of the Buffer Consumption Ratio (BCR) for each document processed and finished ($BCR_{FINISH}$).

26. The method according to claim 25 further comprising the steps of:
   analyzing the $BCR_{FINISH}$ records for each item to rank the Time Buffer (TB) according to the amount of negative variance occurring for increasing the size of the Time Buffer (TB) and/or to focus improvement efforts;
   increasing the Time-to-Reliably Replenish (TRR) in accordance with the increased size of the Time Buffer (TB);
   resizing the Physical Buffer (PB) in accordance with the increased Time-to-Reliably Replenish (TRR) and the increased Time Buffer (TB); and
   analyzing the $BCR_{FINISH}$ records for each item in conjunction with negative $BCRV_{RPi}$ records from each Reporting Point (RP) to further focus local improvement efforts in terms of global outcomes.

27. The method according to claim 26 further comprising the steps of:
   analyzing the $BCR_{FINISH}$ records for each item to rank the Time Buffer (TB) according to the amount of positive variance occurring for decreasing the size of the Time Buffer (TB);
   decreasing the Time-to-Reliably Replenish (TRR) in accordance with the decreased size of the Time Buffer (TB); and
   resizing the Physical Buffer (PB) in accordance with the decreased Time-to-Reliably Replenish (TRR) and the decreased Time Buffer (TB).

28. A method for determining the relative priority of in-process work and focusing process improvements, comprising the steps of:
   providing a computer system comprising a processor, a memory device, an input for receiving data from a data source, and a user interface;
   utilizing the user interface to select a particular item that is in a predefined process flow;
   utilizing transaction data that relates to the particular item and its movement through the predefined process flow;
   utilizing the processor to extract from the transaction data particular transaction data that was captured at a regular Reporting Intervals (RI) and Reporting Points (RP);
   providing data that represents a planned movement of the selected item along the predefined process flow and storing said provided data in said memory device;
   utilizing the processor to process the extracted transaction data to determine the selected item's actual movement along the predefined process flow and comparing the actual movement of the selected item to the planned movement of the selected item through the predefined process flow;
   utilizing the processor to determine a variance between the actual movement of the selected item and the planned movement of the selected item;
   providing a total planned Time Buffer (TB) for the movement of the selected item along the predefined process flow and storing said provided total planned Time Buffer (TB) in said memory device;
   utilizing the processor to process the determined variance to compute the actual amount of downstream Time Buffer Remaining (TBR) in relation to the total planned Time Buffer (TB);
   utilizing the processor to compare the actual amount of downstream Time Buffer Remaining (TBR) to the Planned amount of downstream Time Buffer Remaining (TBRP) at each Reporting Point (RP) and computing a ratio TBR/TBRP wherein said ratio yields a Buffer Recovery Percent (BRP) for the selected item;
   utilizing the processor to determine a Buffer Recovery Percent (BRP) for every item as it moves in a predefined process flow from one Reporting Point (RP) to another Reporting Point (RP) and setting relative priorities to all the items wherein the item with the lowest Buffer Recovery Percent (BRP) has the highest priority;
   establishing, for each item managed, a Maximum expected Demand for each Reporting Interval ($RID_{RIMax}$) during the Time-to-Reliably Replenish (TRR);
   establishing, for each selected item, a numerical representation of the Maximum Reporting Interval Demand ($RID_{RIMax}$) build-up throughout the Time-to-Reliably Replenish (TRR); and
   tracking, for each selected item, a movement of the selected item's Open Documents at each Reporting Interval (RI) and establishing the actual Reporting Interval Demand ($RID_{RI}$) for each Reporting Interval (RI) of the Time-to-Reliably Replenish (TRR).

29. The method according to claim 28 further comprising the step of utilizing the processor to compute, for each item to be managed and at each Reporting Interval (RI), a Physical Buffer Pattern Variance ($PBPV_{RIM-RI}$) between the cumulative Reporting Interval Demand ($RID_{RI}$) and the corresponding Maximum Reporting Interval Demand ($RID_{RIMax}$).

30. The method according to claim 29 further comprising the step of maintaining, for each selected item and at each Reporting Interval (RI), the computed Physical Buffer Pattern Variance ($PBPV_{RIM-RI}$).

31. The method according to claim 30 further comprising the step of maintaining, for each item managed, an ongoing record of its NIS (Not-In-Stock) documents.

32. The method according to claim 31 further comprising the steps of:
   analyzing the computed Physical Buffer Pattern Variances ($PBPV_{RIM-RI}$) to rank the computed Physical Buffer Pattern Variances ($PBPV_{RIM-RI}$) according to the amount of positive variances occurring greater than the Physical Buffer (PB), in both magnitude and frequency of occurrences, for increasing the size of the Physical Buffer (PB) in accordance with the corresponding Not-In-Stock Situation; and
   thereafter, resizing the current Physical Buffer (PB).

33. The method according to claim 32 further comprising the steps of:
   analyzing the computed Physical Buffer Pattern Variances ($PBPV_{RIM-RI}$) to rank the computed Physical Buffer Pattern Variances (PBPV$_{RIM-RI}$) according to the amount of negative variance occurring, in both magnitude and frequency of occurrences, for decreasing a perimeter of the Physical Buffer Pattern (PBP);

analyzing the computed Physical Buffer Pattern Variances (PBPV$_{RIM-RI}$) to rank the computed Physical Buffer Pattern Variances (PBPV$_{RIM-RI}$) according to the amount of positive variance occurring less than the Physical Buffer (PB), in both magnitude and frequency of occurrences, for increasing the perimeter of the Physical Buffer Pattern (PBP); and thereafter, adjusting the Physical Buffer Pattern (PBP) perimeter.

34. A method for determining the relative priority of in-process work and focusing process improvements, comprising the steps of:

providing a computer system comprising a processor, a memory device, an input for receiving data from a data source, and a user interface;

utilizing the user interface to select a particular item that is in a predefined process flow;

utilizing transaction data that relates to the particular item and its movement through the predefined process flow;

utilizing the processor to extract from the transaction data particular transaction data that was captured at a regular Reporting Intervals (RI) and Reporting Points (RP);

providing data that represents a planned movement of the selected item along the predefined process flow and storing said provided data in said memory device;

utilizing the processor to process the extracted transaction data to determine the selected item's actual movement along the predefined process flow and comparing the actual movement of the selected item to the planned movement of the selected item through the predefined process flow;

utilizing the processor to determine a variance between the actual movement of the selected item and the planned movement of the selected item;

providing a total planned Time Buffer (TB) for the movement of the selected item along the predefined process flow and storing said provided total planned Time Buffer (TB) in said memory device;

utilizing the processor to process the determined variance to compute an actual amount of downstream Time Buffer Remaining (TBR) in relation to the total planned Time Buffer (TB);

utilizing the processor to compare an actual amount of downstream Time Buffer Remaining (TBR) to the Planned amount of downstream Time Buffer Remaining (TBRP) at each Reporting Point (RP) and computing a ratio TBR/TBRP wherein said ratio yields a Buffer Recovery Percent (BRP) for the selected item;

utilizing the processor to determine a Buffer Recovery Percent (BRP) for every item as it moves in a predefined process flow from one Reporting Point (RP) to another Reporting Point (RP) and setting relative priorities to all the items wherein the item with the lowest Buffer Recovery Percent (BRP) has the highest priority;

establishing, for each item managed, a Maximum expected Demand for each Reporting Interval (RID$_{RIMax}$) during the Time-to-Reliably Replenish (TRR);

providing for a number (e.g., x) of Reporting Intervals (RI) of Maximum Reporting Interval Demand (RID$_{RIMax-x}$) to be used in order to determine the anticipated quantity for an approaching maximum coverage requirement;

providing for an initial Time interval Between RID$_{RIMax-x}$ Occurrences (TBO$_{RIMax-x}$) to be used in conjunction with the selected RID$_{RIMax-x}$ in order to determine the anticipated timing for an approaching maximum coverage requirement;

utilizing the user interface and the processor to record, for each selected item, the Time interval Between RID$_{RIMax-x}$ Occurrences (TBO$_{RImax-x}$); and providing a RID$_{RIMax-x}$ Reporting Interval Factor (RIF) for determining an updated Time interval Between RID$_{RIMax-x}$ Occurrences (TBO$_{RIMax-x}$), the RIF being a percent of the RID$_{RIMax-x}$ occurrences, to be used in conjunction with the distribution of TBO$_{RIMax-x}$, in order to establish the updated TBO$_{RIMax-x}$ to be used to determine the anticipated timing for an approaching maximum coverage requirement since the last RID$_{RIMax-x}$ occurred.

35. The method according to claim 34 further comprising the step of, for each selected item and in each Reporting Interval (RI) following a user defined percent of the established TBO$_{RIMax-x}$ after the last RID$_{RIMax-x}$ occurrence, utilizing the processor to sum the Largest Reporting Interval Demands (LRIDs) to obtain a total quantity that is greater than or equal to the quantity of RID$_{RImax-x}$.

36. The method according to claim 35 further comprising the steps of:

utilizing the processor to determine the Total number of Reporting Intervals (TRIs) in the Time-to-Reliably Replenish (TRR);

utilizing the processor to determine the total number of Largest Reporting Interval Demands (LRIDs) required to arrive at a quantity greater than or equal to the RID$_{RIMax-x}$ during the Time-to-Reliably Replenish (TRR); and utilizing the processor to process the TRI and LRID to generate a Physical Buffer Factor (PBF).

37. The method according to claim 36 wherein the step of processing the TRI and LRID comprises the step of utilizing the processor to implement a mathematical operation PBF=[1−(LRID/TRI)].

38. The method according to claim 37 further comprising the step of providing a Physical Buffer Factor (PBF) threshold factor for use in triggering increases in priorities by adjusting the Buffer Recovery Percent (BRP) value for an item's Open Documents totalling a quantity equal to the RID$_{RIMax-x}$ less the on-hand quantity in the Physical Buffer (PB).

39. The method according to claim 38 further comprising the steps of:

maintaining, for each item managed, an ongoing record of its NIS (Not-In-Stock) documents; and providing a Not-In-Stock (NIS) adjustment value to the Physical Buffer Factor (PBF$_{NIS}$) for use in increasing priorities by adjusting the BRP value for any item that becomes Not-In-Stock for a quantity equal to the Not-In-Stock (NIS) quantity.

40. The method according to claim 39 further comprising the step of utilizing the processor to apply a negative Buffer Consumption Ratio (BCR) adjustment to the Physical Buffer Factor that is used to increase priorities by adjusting the BRP value for a selected item's Open Documents having a positive Buffer Consumption Ratio (BCR).

41. The method according to claim 40 further comprising the steps of:

providing the current Physical Buffer (PB);

utilizing the processor to determine a Buffer Consumption Ratio (BCR) for the items managed;

utilizing the processor to determine the number of items managed having a

Buffer Consumption Ratio (BCR)<0; and utilizing the processor to process data representing the current Physical Buffer (PB) and the determined number of items managed having a Buffer Consumption Ratio (BCR)<0 to yield a Negative Buffer Consumption Ratio adjustment value.

42. The method according to claim 40 wherein the step of utilizing the processor to process data representing the current Physical Buffer (PB) and the determined number of items managed having a Buffer Consumption Ratio (BCR)<0 comprises the step of utilizing the processor to execute a mathematical operation:

$$PBF_{-BCR}=(((PB)-(QBCR<0))/PB);$$

wherein "$PBF_{-BCR}$" is the negative BCR adjustment to the PBF;

wherein "QBCR" is the number of parts with a BCR<0; and wherein "PB" is the current Physical Buffer.

43. The method according to claim 41 further comprising the step of utilizing the processor to compute, for each selected item and at each Reporting Interval (RI), a Physical Buffer Factor (PBF) that includes any Not-In-Stock or negative BCR adjustments.

44. An electronic data processing system for determining the relative priority of in-process work and focusing process improvements, comprising:

a processor to execute computer program instructions, a user interface, a data input interface to receive data from an external source, a display device, and a memory to store computer program instructions executable by the processor, for performing the steps of:

selecting a particular item that is in a predefined process flow;

identifying all process steps in the predefined process flow through which a selected item passes;

identifying each Reporting Point (RP) in each selected item's predefined process flow;

identifying an amount of Allocated Time Buffer (ATB) assigned to each Reporting Point (RP) to account for variability in the time required to complete a Required Work Content (RWC) through each Reporting Point (RP);

determining the Required Work Content (RWC) to completely perform all process steps in the overall process;

determining a total amount of time $T_{TOTAL}$ required to complete all process steps;

determining a total planned Time Buffer (TB) for the movement of the selected item through each Reporting Point (RP) along the predefined process flow and storing said determined total planned Time Buffer (TB) in said memory device;

utilizing the total amount of $T_{TOTAL}$ in conjunction with the total Time Buffer (TB) to determine a Time-To-Reliably-Replenish for completing the Required Work Content (RWC);

utilizing transaction data that relates to the particular item and its movement through the predefined process flow;

extracting from the transaction data particular transaction data that was captured at a regular Reporting Intervals (RI) and Reporting Points (RP);

providing data that represents a planned movement of the selected item along the predefined process flow;

processing the extracted data to determine the selected item's actual movement along the predefined process flow and comparing the actual movement of the selected item to the planned movement of the selected item through the predefined process flow;

determining a variance between the actual movement of the selected item and the planned movement of the selected item;

processing the determined variance to compute an actual amount of downstream Time Buffer Remaining (TBR) in relation to the total planned Time Buffer (TB);

computing a Planned Time Buffer Remaining (TBRP) at each Reporting Point (RP);

comparing the actual amount of downstream Time Buffer Remaining (TBR) to the Planned amount of downstream Time Buffer Remaining (TBRP) at each Reporting Point (RP) and computing a ratio TBR/TBRP wherein said ratio yields a Buffer Recovery Percent (BRP) for the selected item; and determining the Buffer Recovery Percent (BRP) for every item as it moves in a predefined process flow from one Reporting Point (RP) to another Reporting Point (RP) and setting relative priorities to all the items wherein the item with the lowest Buffer Recovery Percent (BRP) has the highest priority.

45. A computer-executable program product for determining the relative priority of in-process work and focusing process improvements, the computer-executable program product comprising computer executable instructions tangibly embodied on a computer readable medium that when executed by the computer perform the method steps comprising:

selecting a particular item that is in a predefined process flow;

identifying all process steps in the predefined process flow through which a selected item passes;

identifying each Reporting Point (RP) in each selected item's predefined process flow;

identifying an amount of Allocated Time Buffer (ATB) assigned to each Reporting Point (RP) to account for variability in the time required to complete a Required Work Content (RWC) through each Reporting Point (RP);

determining the Required Work Content (RWC) to completely perform all process steps in the overall process;

determining the total amount of time $T_{TOTAL}$ required to complete all process steps;

determining a total planned Time Buffer (TB) for the movement of the selected item through each Reporting Point (RP) along the predefined process flow and storing said determined total planned Time Buffer (TB) in said memory device;

utilizing the total amount of $T_{TOTAL}$ in conjunction with the total Time Buffer (TB) to determine a Time-To-Reliably-Replenish for completing the Required Work Content (RWC);

utilizing transaction data that relates to the particular item and its movement through the predefined process flow;

extracting from the transaction data particular transaction data that was captured at a regular Reporting Intervals (RI) and Reporting Points (RP);

providing data that represents a planned movement of the selected item along the predefined process flow;

processing the extracted data to determine the selected item's actual movement along the predefined process flow and comparing the actual movement of the selected item to the planned movement of the selected item through the predefined process flow;

determining a variance between the actual movement of the selected item and the planned movement of the selected item;

processing the determined variance to compute a actual amount of downstream Time Buffer Remaining (TBR) in relation to the total planned Time Buffer (TB);

computing a Planned Time Buffer Remaining (TBRP) at each Reporting Point (RP);

comparing the actual amount of downstream Time Buffer Remaining (TBR) to the Planned amount of downstream Time Buffer Remaining (TBRP) at each Reporting Point (RP) and computing a ratio TBR/TBRP wherein said ratio yields a Buffer Recovery Percent (BRP) for the selected item; and determining a Buffer Recovery Percent (BRP) for every item as it moves in a predefined process flow from one Reporting Point (RP) to another Reporting Point (RP) and setting relative priorities to all the items wherein the item with the lowest Buffer Recovery Percent (BRP) has the highest priority.

* * * * *